US007327481B2

(12) United States Patent
Such et al.

(10) Patent No.: US 7,327,481 B2
(45) Date of Patent: Feb. 5, 2008

(54) OPEN COVENTURING IN A REMOTE HARDCOPY PROOFING SERVICE, WITH PRESERVED CLIENTELE, THROUGH INTERFACE SHARING

(75) Inventors: Alberto Such, Barcelona (ES); Andrew Mackenzie, Barcelona (ES); Andres Gonzalez, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 1031 days.

(21) Appl. No.: 10/124,667

(22) Filed: Apr. 16, 2002

(65) Prior Publication Data

US 2002/0181017 A1 Dec. 5, 2002

Related U.S. Application Data

(60) Provisional application No. 60/316,945, filed on Aug. 31, 2001, provisional application No. 60/294,925, filed on May 30, 2001.

(51) Int. Cl.
*G06F 15/00* (2006.01)
*H04N 1/00* (2006.01)

(52) U.S. Cl. .................................... 358/1.15; 358/1.18

(58) Field of Classification Search ............... 358/1.15, 358/1.9, 1.18; 347/129; 382/167; 345/589
See application file for complete search history.

(56) References Cited

U.S. PATENT DOCUMENTS

| | | | | |
|---|---|---|---|---|
| 5,107,332 | A * | 4/1992 | Chan | 358/518 |
| 5,493,321 | A * | 2/1996 | Zwadlo | 347/131 |
| 6,943,915 | B1 * | 9/2005 | Teraue | 358/1.9 |
| 6,957,418 | B2 * | 10/2005 | Batcha et al. | 717/124 |
| 2002/0145750 | A1 * | 10/2002 | Honda et al. | 358/1.15 |
| 2002/0156853 | A1 * | 10/2002 | Hyakutake et al. | 709/206 |
| 2003/0072031 | A1 * | 4/2003 | Kuwata et al. | 358/1.15 |

* cited by examiner

*Primary Examiner*—Gabriel Garcia
(74) *Attorney, Agent, or Firm*—Peter I. Lippman

(57) ABSTRACT

Conventional obstacles to entry and survival of small graphic-arts service providers are softened—particularly for those businesses that operate as computerized "ASP" enterprises involving wide-area networks—by encouraging small operators to coexist effectively in use of a pivotal network-based service. One key mechanism promoting this capability is a system of optionally mutual links between the pivotal service and the ASPs. The service also counteracts a tendency in the industry to favor wastefully redundant vertical integration. On the other hand, the system also implements the prerogatives of an enterprise (such as a printing-broker ASP) that has an established customer, to closely channel the attention of that customer—but subject, importantly, to being overruled by the customer. Ideally the system is carefully tuned to enable such customer action without unduly pressing the option upon the customer.

52 Claims, 26 Drawing Sheets

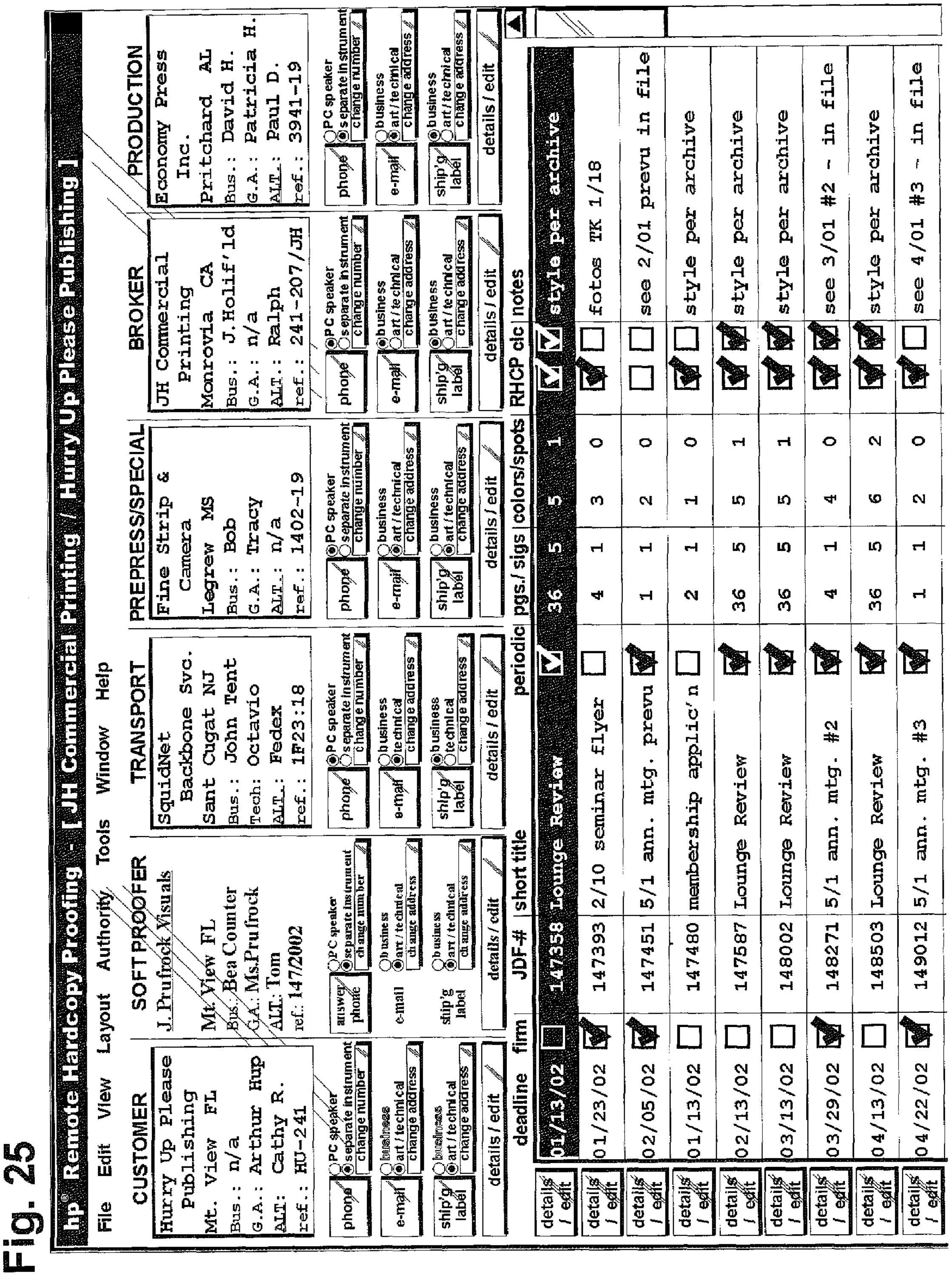

Fig. 25

| | | | | | | | |
|---|---|---|---|---|---|---|---|
| deadline | firm | JDF-# | short title | periodic | pgs./ | sigs | colors/spots | RHCP clc notes | | style per archive |
| 01/13/02 | | 147358 | Lounge Review | ✓ | 36 | 5 | 5 | 1 | | ✓ | fotos TK 1/18 |
| 01/23/02 | | 147393 | 2/10 seminar flyer | | 4 | 1 | 3 | 0 | | | |
| 02/05/02 | | 147451 | 5/1 ann. mtg. prevu | | 1 | 1 | 2 | 0 | | | see 2/01 prevu in file |
| 01/13/02 | | 147480 | membership applic'n | | 2 | 1 | 1 | 0 | | | style per archive |
| 02/13/02 | | 147587 | Lounge Review | | 36 | 5 | 5 | 1 | | | style per archive |
| 03/13/02 | | 148002 | Lounge Review | | 36 | 5 | 5 | 1 | | | style per archive |
| 03/29/02 | | 148271 | 5/1 ann. mtg. #2 | | 4 | 1 | 4 | 0 | | | see 3/01 #2 - in file |
| 04/13/02 | | 148503 | Lounge Review | | 36 | 5 | 6 | 2 | | | style per archive |
| 04/22/02 | | 149012 | 5/1 ann. mtg. #3 | | 1 | 1 | 2 | 0 | | | see 4/01 #3 - in file |

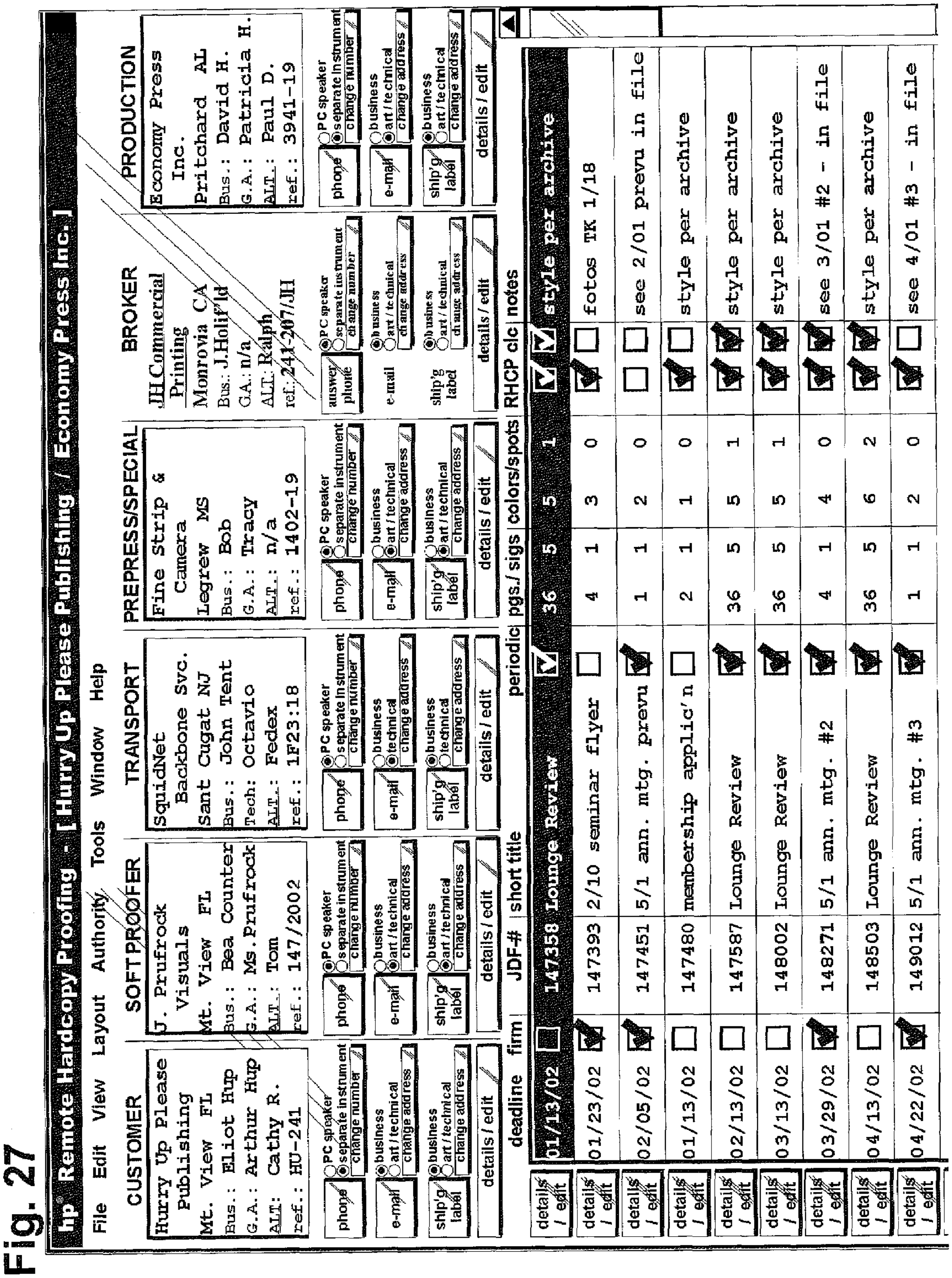

Fig. 27

| | | hp® Remote Hardcopy Proofing - [Hurry Up Please Publishing / Economy Press Inc.] | | | |
|---|---|---|---|---|---|
| | | File Edit View Layout Authority Tools Window Help | | | |
| CUSTOMER | SOFTPROOFER | TRANSPORT | PREPRESS/SPECIAL | BROKER | PRODUCTION |
| Hurry Up Please Publishing<br>Mt. View FL<br>Bus.: Eliot Hup<br>G.A.: Arthur Hup<br>ALT: Cathy R.<br>ref.: HU-241 | J. Prufrock Visuals<br>Mt. View FL<br>Bus.: Bea Counter<br>G.A.: Ms. Prufrock<br>ALT: Tom<br>ref.: 147/2002 | SquidNet Backbone Svc.<br>Sant Cugat NJ<br>Bus.: John Tent<br>Tech: Octavio<br>ALT: Fedex<br>ref.: 1F23:18 | Fine Strip & Camera<br>Legrew MS<br>Bus.: Bob<br>G.A.: Tracy<br>ALT: n/a<br>ref.: 1402-19 | JH Commercial Printing<br>Monrovia CA<br>Bus.: J.Holi'ld<br>G.A.: n/a<br>ALT: Ralph<br>ref.: 241-207/JH | Economy Press Inc.<br>Pritchard AL<br>Bus.: David H.<br>G.A.: Patricia H.<br>ALT: Paul D.<br>ref.: 3941-19 |
| phone ○PC speaker ○separate instrument / change number | phone ○PC speaker ○separate instrument / change number | phone ○PC speaker ○separate instrument / change number | phone ○PC speaker ○separate instrument / change number | answer/phone ○PC speaker ○separate instrument / change number | phone ○PC speaker ○separate instrument / change number |
| e-mail ○business ●art/technical change address | e-mail ○business ●art/technical change address | e-mail ○business ●technical change address | e-mail ○business ●art/technical change address | e-mail ○business ●art/technical change address | e-mail ○business ●art/technical change address |
| ship'g label ○business ●art/technical change address | ship'g label ○business ●art/technical change address | ship'g label ○business ●technical change address | ship'g label ○business ●art/technical change address | ship'g label ○business ●art/technical change address | ship'g label ○business ●art/technical change address |
| details/edit | details/edit | details/edit | details/edit | details/edit | details/edit |

| | deadline firm | JDF# | short title | periodic | pgs./ | sigs | colors/spots | RHCP clc notes | style per archive |
|---|---|---|---|---|---|---|---|---|---|
| details/edit | 01/13/02 ☐ | 147358 | Lounge Review | ☑ | 36 | 5 | 5 | 1 | ☑ |
| details/edit | 01/23/02 ☐ | 147393 | 2/10 seminar flyer | ☐ | 4 | 1 | 3 | 0 | ☐ fotos TK 1/18 |
| details/edit | 02/05/02 ☐ | 147451 | 5/1 ann. mtg. prevu | ☐ | 1 | 1 | 2 | 0 | ☐ see 2/01 prevu in file |
| details/edit | 01/13/02 ☐ | 147480 | membership applic'n | ☐ | 2 | 1 | 1 | 0 | ☐ style per archive |
| details/edit | 02/13/02 ☐ | 147587 | Lounge Review | ☑ | 36 | 5 | 5 | 1 | ☑ style per archive |
| details/edit | 03/13/02 ☐ | 148002 | Lounge Review | ☑ | 36 | 5 | 5 | 1 | ☑ style per archive |
| details/edit | 03/29/02 ☐ | 148271 | 5/1 ann. mtg. #2 | ☐ | 4 | 1 | 4 | 0 | ☐ see 3/01 #2 - in file |
| details/edit | 04/13/02 ☐ | 148503 | Lounge Review | ☑ | 36 | 5 | 6 | 2 | ☑ style per archive |
| details/edit | 04/22/02 ☐ | 149012 | 5/1 ann. mtg. #3 | ☐ | 1 | 1 | 2 | 0 | ☐ see 4/01 #3 - in file |

OPEN COVENTURING IN A REMOTE HARDCOPY PROOFING SERVICE, WITH PRESERVED CLIENTELE, THROUGH INTERFACE SHARING

RELATED PATENT DOCUMENTS

Closely related documents are other, coowned U.S. utility-patent applications filed in the U.S. Patent and Trademark Office—and hereby incorporated by reference in their entirety into this document. Two are copending U.S. provisional applications of Such et al., Ser. No. 60/294,925, filed May 30, 2001 and Ser. No. 60/316,945, filed Aug. 31, 2001, whose priority benefit is hereby claimed. A third is in the names of Jodra et al., application Ser. No. 09/832,638, later issued as U.S. Pat. No. 6,607,258. A fourth is in the names of Vilanova et al., application Ser. No. 09/945,492, later U.S. Pat. No. 7,134,737. A fifth is in the names of Soler et al., application Ser. No. 09/919,260, later U.S. Pat. No. 7,023, 581—together with references cited therein. A sixth is in the names of Subirada et al., application Ser. No. 09/919,207, later U.S. Pat. No. 7,027,185. A seventh is application Ser. No. 10/176,563 in names of Gonzalez et al., titled "REMOTE HARDCOPY PROOFING SERVICE ADAPTIVELY ISOLATED FROM THE INTERNET", in preparation concurrently herewith, and later U.S. Pat. No. 7,016, 085. Also potentially of interest and wholly incorporated herein are U.S. Pat. Nos. 6,043,909 and 6,157,735 of Richard A. Holub.

FIELD OF THE INVENTION

This invention relates generally to remote hardcopy proofing; and more particularly to integration of business systems and procedures for remote hardcopy proofing of printing jobs including color images. Preferred embodiments include integrated features for incorporating the efficiencies and consumer benefits of electronic commerce and advanced technology into buying, soft proofing and data transfer for such printing jobs. Preferred embodiments are especially effective in association with closed-loop-color proofing.

BACKGROUND OF THE INVENTION (a) Classical relationships in the industry—Classical participants in the printing or so-called "graphic arts" industry generally fell into these categories:

a primary customer or client—i.e., a publisher or other entity that wished to have printed goods for its own purposes, ranging from advertising to fiction, technical data or poetry;

a printing house, which physically produced the final printed goods—and which could vary from a neighborhood family "instant printer" business to a giant international producer of fine-quality books and magazines;

a prepress entity, which could be a free-standing business serving small printing houses or could be a department or makeready room within a large printing house—and whose function was to receive camera-ready copy and sometimes raw text copy (manuscript) to be typeset, and from these materials to generate printing negatives and plates for use in actual printing production;

a graphic artist or advertising agency, which could be a free-standing business or could be associated with either the primary customer or the prepress entity—and whose function was to generate, from a customer's instructions and other inputs, the camera-ready copy which would then become the prepress entity's input materials;

a customer-service representative, ordinarily an individual associated with the printing or prepress house (often the proprietor or manager of that entity), who typically met at that entity's makeready room, or conference room, with the artist's or customer's representative to "show proof"—i.e., personally take from the makeready-room job bins and hand to that representative, for discussion, a preproduction specimen of the job, based on negatives (or plates) that had been readied for production of the finished piece;

a courier, who simply carried the specimen physically from the prepress or printing house to the artist's or customer's representative in event the latter did not wish to travel to the prepress or printing facilities; and a buyer, who once again could be either a free-standing business (sometimes denominated a "printing broker"), or who could be associated with the primary customer or with the graphic artist or ad agency—and whose function was to select and negotiate with, most commonly on behalf of the primary customer, suitable printing and prepress institutions for the kind and scope of job to be printed.

Most of these classical categories of participants survive to the present day. Sea changes, however, have arrived with the electronic age—more specifically with its character as a so-called "information age", and especially with the advent of wide-area networks in general and the Internet in particular, and the WorldWide Web, and the now-familiar concept of a "website".

(b) Websites, and other FTP sites—As is well known in this field, the acronym "FTP" means "file transfer protocol". FTP is a standard procedure for operation of two computers, commonly but not necessarily remote from each other, to copy a computer file from one of the machines to the other.

The data may pass through the Internet, or through another type of network such as but not necessarily a private network. Alternatively FTP data may pass through a peer-to-peer telephone connection—or even simply a direct cable—between the two computers.

People skilled in this field will understand that an FTP site or in particular a website enables a user in control of the connection to copy data in one direction or the other, or possibly in both directions. A website is in essence a special case of an FTP site, namely one to which connection is made through the Internet, using its WorldWide Web capabilities.

A website or other FTP site ordinarily encompasses some sort of user interface, but this may be of a very primitive type—for example, responding only to simple typed-in FTP syntax as through a DOS or Unix console application. Thus for purposes of the present document such a site does not necessarily provide GUI interactions, or even full-screen DOS or Unix data-reading and data-entry functions, although modernly a GUI format is extremely common and popular.

FTP sites are usually automatic—that is, in normal operation largely free from human intervention. For present purposes, however, most such sites require some level of security, authentication etc. All of that, if present, is considered part of the well-known infrastructure of the FTP site and associated network connections.

(c) The printing-broker ASP—One way in which the electronic age naturally modified the classical system was to undermine the position of the buyer or broker. The broker's major role was as a purveyor of accumulated information and wisdom about printing and prepress—in other words, as a guide and shepherd who conducted primary customers, in relative safety and surefootedness, to suitable production people.

The guide, however, extracted a relatively sizable toll (commission) for the guidance, which was a mixture of interpersonal skills with basic information about the industry. In an information age it has been natural for money to seek an alternative route.

Thus some computer-wise buyers or brokers undertook to gain an economic advantage over other buyers and brokers by automating the process. The familiar introductions, questions, answers and contractual arrangements were easy to convert into text, checkboxes and "FAQS" (frequently asked question-and-answer lists) in websites, and through use of this mechanism a single industry-experienced broker could easily service perhaps an order of magnitude greater clientele, at far lower cost to each customer.

Great variation in skill, communication, pricing and overall effectiveness is inevitable in such efforts, and many brokers and agents doubtless continue to operate in the classical manner. Their function has given way, however, to a new niche in the industry: a broker/agent "application service provider" or "ASP". (The acronym and therefore the terminology are likely derived, in that order, by analogy to the better-known "ISP", or Internet service provider—who simply receives telephone calls and automatically connects the callers to high-speed optic-fiber or cable Internet ports.)

This printing-broker ASP, or transactional ASP, or by abbreviation transASP serves a function very much akin to the traditional broker/agent function—but does so by inviting customers and printshops alike to come on-line electronically. While on-line they meet, negotiate, and do business with one another through a website intermediary and user interface (e.g., a graphical user interface, "GUI") protocol rather than through personally guided introductions and personally conducted negotiations.

(d) The proofer ASP—Another natural modification of the classical scheme arose from the classical industry custom called "showing proofs" (preproduction approximate samples of print jobs)—and the viewing and approving of those proofs. The earlier-mentioned Jodra patent document discusses this function at length, pointing out in particular that it is a central function related to the economics of allocating costs of error or disagreement.

At the same time, however, classically the viewing of hardcopy proofs itself generated very substantial costs—in travel by people whose time was expensive, and in delay, and even in additional disagreements. This process of showing proofs accordingly became another sensitive high-pressure point in the flow of money and other resources through the graphic-arts industry.

Various computerized proof-related workflow models have rapidly evolved in the natural seeking of lower impedances to the flow of work, time and cash. Since it is now common for customers to supply original artwork in the form of a computer data file, it is natural for a graphic artist, prepress or printing house to want to send back some kind of picture of how the finished job will appear.

The easiest way to do this is in the form of a set of image data files that can be displayed on a computer screen or monitor, showing with varying degrees of roughness how the makeready work has progressed. Such a file in many cases can be simply sent by e-mail to the customer or agent.

An incidental benefit has been to reduce the need for commitment of time and talent by the classical customer-service representative mentioned above. Much of what that individual typically did can now be reduced, once again, to carefully drafted text and checkboxes in a website. With care, a personal touch can be maintained at this critical point, while both the enterprise and its customer enjoy improved efficiency and economics—without adverse effects on quality or competition, or survival of the small business entity.

Already a great deal of convention has grown up around this approach, in the nature of somewhat standardized image-presentation formats (e.g. the "portable document file" or "PDF" introduced by the Adobe company), and likewise somewhat standardized transaction summary formats (e.g. the "job definition file" or "JDF"). Printing out a PDF image on a computer printer is quite commonplace, but introduces myriad complications and still further sources of disagreement—and therefore many operators have focused on the far more straightforward process of showing proof on a computer monitor.

Since no hardcopy proof is involved, this type of proof is called a "soft proof" or sometimes even a "virtual proof". It is understood that in many ways what appears on the monitor is intrinsically different from what will appear eventually on some printing medium (such as paper), but such are the pressures of the industry that many participants are glad to accept such variations as a sufficient approximation.

In fact it is possible that the intrinsic differences are so obvious and striking that they actually defuse a large part of the complication that can arise in showing proofs. For example, the customer may perhaps be warned that "of course" colors and even proportions may appear "very" different from the finished product, and the proof is being shown only to give the customer a "rough" idea that the job is being assembled correctly.

Because of the very plain intrinsic differences of the self-luminous screen display with its vivid additive primaries and the purely reflective printed matter, rendered in subtractive primaries, customers and artists undoubtedly tend to discount and overlook relatively major differences. In this way, interestingly, many of the most difficult confrontations between printer/prepress and artist/customer may be simply sidestepped. Also interestingly, for many customers and even many artists this is sufficient.

Soft proofing is particularly useful and adequate at an earlier stage of project development when an artist or advertising agency is showing a concept proof to a customer or buyer. Here it is understood that the final colors, proportions, papers etc. are all only a matter of fine detail; and what is being shown is an original creative idea, fresh from the artistic mind and just first reduced to a tentative wording and layout. It is also usually understood that the final product will be subject to showing of a hardcopy proof.

In any event the preparation of even a virtual or soft proof is not without its hazards, and this stage of work has engendered another kind of application service provider: the proofing ASP. Such an entity is likely to start off in business with preparation and transmission of soft proofs, and negotiations over them—but perhaps in the nature of the business a proofing ASP tends to gravitate into preparation of hardcopy proofs as well, as customers inquire whether the ASP cannot provide something more permanent and more satisfying.

The proofing ASP typically enjoys an advantage of having a business outlet with geographical proximity to the primary customer or artist, and by dint of experience and professionalism can do a reasonably creditable job of making a hardcopy proof look generally similar to the anticipated eventual production piece. At this point, however, what is being shown is a printed item on a piece of printing medium that can be held in the hand—and not incidentally can be kept for comparison with what is later delivered.

Accordingly the customer and artist are much less willing to accept significant variations. The greater capability actually ups the ante as to what is demanded.

(e) The e-transport ASP—The Internet, although initially it may have sparked much of the computer revolution in the graphic-arts industry, was neither the first nor the last computer network. Furthermore it was neither the first nor last service operated by most of its primary users over telephone connections—examples of particularly successful such services being in the field of legal caselaw research.

It is also natural that many users have found the Internet unsatisfactory for industrial purposes. The medium was almost pristine in its academic atmosphere as recently as fifteen years ago, but since its invasion by the Windows-driven general public the Internet has now become susceptible to excessive congestion and dropped connections. Particularly for relatively unsophisticated computer users in small businesses, the Internet is also now susceptible to massive proliferation of advertising, junk mail and other distractions from a businesslike procedure. Fast lines (digital service lines or cable) are not available everywhere.

Offering an escape from all such annoyances—and also offering ancillary services such as large-volume website storage, software escrow, and delivery follow-up—is the private-network ASP. This type of business focuses primarily upon maintaining and operating a reliable fast optic-fiber/coax-cable backbone between major hubs.

These capabilities are rapidly replacing the classical courier service. The trend is natural since what is to be moved from one place to another is already information in digital form; and the transportation of physical mass (e.g. paper) is fundamentally irrelevant to the transport of image information.

Some such businesses offer ample dial-up telephone numbers, as do the familiar ISPs. Some offer a customer an on-site termination directly, or almost directly, to the backbone.

Through various migrations some private-net ASPs have become associated with one or another industry. The graphic-arts industry is one natural magnet for such association, since it supports a very large and steady flow of very large (megabyte and even gigabyte) files.

(f) ASP hybridization—Some ASPs in and servicing the graphic-arts industry have tended to acquire complementary ASP activities. For example, a private-network ASP may begin to offer specific soft-proofing support services—perhaps because of a bad experience with a graphic-arts customer who went down the street to visit a broker or soft proofer one day, discovered that the broker or proofer had a good deal with another network, and never came back.

Similarly a printing-industry transASP (e-broker) may begin to offer some limited form of proofing for its customers. The quieter reason may be to keep its customers from straying out of the fold to local graphic artists or local prepress shops that may have convenient proofing capabilities—but who may also want to divert the middleman function to their own channels.

Analogously a virtual-proofing ASP may begin to offer the so-called "digital asset management" more naturally expected of the private-net ASP. Once again the underlying motivation may be to offer the most comprehensive service possible, with an eye to minimizing a customer's motivation to wander out into the digital-asset-management marketplace and perhaps inadvertently stumble into a cheaper virtual-proof ASP.

Of course it is not intended to suggest that all ASP hybrids have developed from such protective instincts or specific negative experiences. Some are simply a matter of natural business expansion—into areas, for example, of inquiry from existing customers.

Nevertheless the phenomenon of vertical expansion among these ASP functions is surely driven in significant part by wariness. Time, talent and even money devoted to cultivating a good customer can evaporate quickly and devastatingly in the maximally competitive, extremely volatile and minimally loyal printing industry.

One may question, however, the overall efficiency and the primary-customer benefits of such integration. A first impact of this trend appears to be greater redundancy for each of the functions involved—and then an even-more-heightened competitiveness, in an industry already marked by low margins and a frenetic work ethic. In the end a resulting trend is to squeeze out small operators, who have traditionally tended to preserve the primary customer's options for diversity, enduring economy, and personal service.

Although a certain amount of copartnering is seen among some successful graphic-arts ASP enterprises, the cautionary character of the printing-business mind tends to deter full and fruitful exploitation of this healthy alternative to vertical expansion. This limited degree of copartnering may be seen as a significant problem in the printing industry.

Another deterrent, adding to the same problem in the industry, is a lack of full interoperability between different service ASPs. A certain degree of effort to build standards for linking various printing ASPs has been proposed in the trade, as for example in the PrintTalk Consortium, but this thrust has not been successful—at least not yet.

Furthermore it appears to focus most on e-commerce aspects, rather than technical aspects, of coventuring. That is, PrintTalk defines basically a protocol to perform print-job brokering—request for quote, quote, order and so forth.

Implementation of such proposals for interASP integration is strongly hindered by the present state of the art. The reason for this is that diverse so-called "job models"—or "life cycles", or "workflow management" designs—are barriers to interoperability. These terms are all in essence synonymous, and refer to the basic functions of knowing and changing either the status of a job (whether or not a proof is involved) or actions that can be taken in relation to a job.

For example, a remote-hardcopy-proofing ASP may not have a job model that supports closed-loop color proofing in which colors on the printing medium are objectively measured and checked. As another example, in order to job-out a single client's work to two different remote proofing ASPs, a transASP would have to somehow integrate different remote-proofing workflows with different job models.

These barriers are problematic. Increased copartnering would benefit not only the consumer (by fostering a healthy form of efficiency and a healthy degree of competition while deterring more-savage aspects of competition), but also the smaller operators in the field—by enabling them to compete more effectively without resorting to cutthroat strategies. Therefore, enhancement of stimuli to such coventuring efforts among complementary ASPs would be beneficial across the board.

An example of what is basically a graphic-arts transactional ASP is the company known as PrintCafe. Examples of businesses whose primary focus has been service as a virtual-proof ASP are RealTime Proof and the former Vio. An example of the private-net ASP is Wam!net.

Each of these three businesses has moved into aspects of the graphic-arts industry that overlap with the primary functions of one or both of the other two businesses.

(g) The hardcopy proofing service—Into the classical picture of the graphic-arts industry, the previously mentioned patent document of Jodra introduced a new blend of technology and business relationships. One key characteristic of that new blend was a novel directionality of proofing-data flow between a prepress or printing house and a buyer or primary customer: the prepress/printing entity prepared a proofing data file containing not only image data as such but also embedded information about the production press on which the job was to be printed.

Remote proofing is also the topic of U.S. Pat. Nos. 6,043,909 and 6,157,735 of Richard A. Holub—though it seems with primary emphasis upon soft proofing. His patents focus on the mathematics of color science.

Holub recounts the known facts that it is possible to characterize the color-rendering details of proofing devices (and production printers as well) in a way that is perceptually based and mathematically general. He also reminds his readers that it is possible to invert such characterizations so that a proofing device can generate perceptually standardized, or nearly standardized, color appearances.

By simply aggregating such known methods Holub outlines how to operate production and proofing systems over a broad network so that color variations between proofs and production runs are minimized, and production of the same job at widely separated plants produces near-identical output. By virtue of this essentially conventional scheme, multiple production facilities can run duplicate portions of a very large, geographically disparate press-run to minimize shipping distances, delays and costs.

Holub, however, says little about the dynamic of interplay between complementary enterprises, or of competition, within the printing business. Although the Jodra approach represented an important refinement of relationships among the classical participants in the industry, it too stopped short of dealing fully with the newly evolved application service providers discussed above.

(h) Software application interentity menu sharing—Another known technology, not heretofore associated with remote hardcopy proofing services for the printing industry, is the modification of application menus of one business entity's user software, to incorporate menu items of another entity's complementary programs. Due to the modularity of modern programming, particularly in the graphical user interface (GUI) environment, such incorporation is usually straightforward and without disruption to operation of the host application. Below are commercially important examples relating to the extremely popular Word-Perfect® word-processing software.

A user of WordPerfect software who installs Lexis® legal-research software in the user's computer will find that certain Lexis program icons and dropdown menus thereafter appear within the WordPerfect menu—simplifying extraction of Lexis search results into WordPerfect documents. If a WordPerfect user installs MathType® software for generating mathematical equation images, subsequently a MathType program icon and dropdown menu appear in the user's WordPerfect menu to facilitate embedding MathType equation images into WordPerfect documents.

After installation of AddressMate® software, which operates a dedicated small serial printer for printing individual address labels, an AddressMate icon and dropdown menu then appear in the WordPerfect menu. Thereafter when the user drafts a coverletter for a package, the AddressMate software automatically undertakes to find the recipient address in that coverletter and copy it into a label format for automatic addressing of a corresponding package label on the attached serial printer.

Analogous installation of HotDocs® software, and automatic incorporation of a HotDocs® icon into WordPerfect menus enables a user to quickly and semiautomatically embed a HotDocs form commercial lease—or employment contract, or promissory note, or other legal form—into a WordPerfect document. In some cases these two-application integrations are by permission of the publisher of the preexisting host application (i.e. in the foregoing examples the publisher of the WordPerfect application) and perhaps even collaborative—being facilitated by assistance from the host publisher with necessary source code and programming recommendations to facilitate and optimize the integration.

Such collaborations sometimes prove so popular that the host publisher may include the satellite program (as with e.g. MathType) into later editions of the host application. In other cases such integrations may be essentially parasitic, a relatively benign form of commercial piracy—perhaps quietly overlooked by the host publisher when it appears that the incursion is beneficial to users and therefore garners additional profitable business for the host publisher.

For present purposes it is instructive to contrast the mutually beneficial commercial symbiosis of all such incorporations with the recent well-known struggle between legitimate and arguably illegitimate publishers in a wholly different industry: the music business. There the piracy of the seemingly renegade "Napster" enterprise undertook to convert and disperse the established value of thousands of copyrights with no benefit whatever to the original creative artists or their legitimate successors. Thus in the present context, though it is desirable to stimulate complementary ASP activities for the remote hardcopy-proofing art, it would be undesirable to do so by any mechanism that could facilitate piracy or like efforts to make off with the value of talented people and industrious enterprises.

(i) Conclusion—Accordingly, the prior art in the remote hardcopy-proofing field has failed to show the way to effectively integrating the efforts of complementary ASPs, particularly in ways healthy for competition and consumers. This failing has continued to impede achievement of uniformly excellent remote proofing. Thus important aspects of the technology and business structures used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a remote proofing computer system. The system includes a closed-loop-color remote hardcopy proofing service (RHCPS).

The service provides an RHCPS user interface having data about a printing job to be hardcopy-proofed. From this phrasing, "having data about", people skilled in this field will understand that such an interface enables a user to read such data, or to enter such data—or possibly both, as appropriate.

The interface is not necessarily a Windows®-style or McIntosh®-style graphical user interface ("GUI"), although this may be preferred for its marketing advantages. Rather the interface may take any of a great variety of forms, especially including DOS- or Unix-style control screens with multiple data-display or -entry fields (but no icons or other elaborate graphics)—in the typical style of a classical DOS or Unix application.

The system also includes a graphic-arts application service provider (ASP). The ASP provides a remotely accessible ASP FTP site or website having data about its service—meaning, again, that such data can be copied to the site, or from it, or in appropriate cases both.

The RHCPS interface includes an RHCPS link to the ASP data, when an RHCPS user is also a user of the ASP. Thus, whether or not the FTP site or website itself provides a GUI or other high-level interface, when dealing with data transfers to or from the ASP the user typically (but not necessarily) enjoys the benefit of some formatting and interactivity provided by the RHCPS interface.

The foregoing may represent a description or definition of the first aspect or facet of the invention in its broadest or most general form. Even as couched in these broad terms, however, it can be seen that this facet of the invention importantly advances the art.

In particular, this aspect of the invention as just described provides a key feature that enables and facilitates solutions to the problem of effective and smooth cooperation or coventuring of complementary graphic-arts enterprises. As will be seen, this aspect of the invention tends to soften or remove coventuring barriers discussed earlier and ranging from distrust to simple interoperability mismatches. With these obstacles minimized, small and large enterprises alike—and consumers as well—benefit from a simpler and more efficient way of doing business that is thereby created.

Although the first major aspect of the invention thus significantly advances the art, nevertheless to optimize enjoyment of its benefits preferably the invention is practiced in conjunction with certain additional features or characteristics. In particular, preferably the closed-loop-color RHCPS is based on a printer device that prints and reads a calibration pattern, and that returns a calibration report to a user who is in a different location from that printer device.

Another preference is that the RHCPS link to the ASP data appear only if the ASP is an established copartner with the RHCPS. Still another basic preference is that, for each user, the link to the ASP data includes a visible tabulation of that user's graphic-arts jobs with the ASP. (As suggested earlier, the ASP interface as considered at this particular point need not be a GUI or even a multi-field DOS/Unix screen for input and output, provided only that data elements within the ASP computer system are subject to reading or manipulation through control screens of the RHCPS.)

If the latter preference (i.e. a visible tabulation of the user's jobs with the ASP) is observed, then preferably the tabulation includes an active graphic-arts dialog window for addition or modification of that user's own graphic-arts jobs. In this case, then another preference in turn is that the modification in the graphic-arts dialog window include an option of deleting that user's own graphic-arts jobs.

Another subpreference to the basic visible-tabulation feature is that the RHCPS maintain data linking each RHCPS user to each ASP which has such a remotely accessible FTP site or website, and with which that user is registered. In this case, then—also preferably for each user—the RHCPS interface link to the ASP data appears only for an ASP with which that user is registered. A still-further subpreference, if this registration constraint is implemented, is that—for each particular job that a user has associated with an ASP—the RHCPS automatically routes proof reports and related details to the user through that ASP rather than to the user directly, unless the user specifically instructs the RHCPS to the contrary.

Another basic preference, i.e. applicable directly to the first main aspect of the invention, is that the ASP's FTP site or website include a user interface with the data about the ASP services. In this case, a subpreference is that the ASP interface include a link to the RHCPS interface when an ASP user is also an RHCPS user. In other words, this is a link going in the reverse direction relative to the previously discussed link from RHCPS to ASP.

If this reverse-link preference is put into effect, then a hierarchy of further subpreferences is applicable: first, in the ASP interface, the link to the RHCPS interface preferably appears only if the RHCPS is an established copartner with the ASP. In this case then further preferably—for each user—the ASP interface link to the RHCPS interface includes a visible tabulation of that user's jobs that are subject to remote hardcopy proofing. If this is so, then in turn it is further preferable that the tabulation include an active remote-hardcopy-proofing (RHCP) dialog window for addition or modification of that user's own RHCP jobs. Yet further preferably, this modification in the dialog window includes an option of deleting that user's own RHCP jobs.

If the reverse-direction link is present, then in another hierarchy of preferences the ASP preferably maintains data linking that ASP's users to the RHCPS. In this case then also preferably for each user the RHCPS interface link to the ASP data appears only for an ASP with which that user is registered. If this is so, then also preferably for each particular job that a user has associated with the RHCPS, the ASP automatically routes proofing jobs from the user to the RHCPS rather than to another proofing entity, unless the user specifically instructs the ASP to the contrary.

Some additional basic preferences relate to types of users and other participants. First, preferably the RHCPS user interface and the ASP's FTP site or website are for operation by:

- a primary customer, including but not limited to a publisher, printing customer, or printing client; or
- a buyer representing a primary customer; or
- a graphic artist; or
- a printing broker; or
- a user that is any hybrid of two or more of the preceding four user types.

An alternative basic preference, focusing instead on ASP types, is that the ASP is preferably:

- a printing-brokerage ASP; or
- a soft-proofing ASP; or
- a private-network ASP; or
- an ASP that is any hybrid of two or more of the preceding three ASP types.

In this ASP-type case, the RHCPS link to the ASP data also preferably includes access to further service of the ASP other than RHCPS procedures. If this is so, then further preferably the further service includes:

- if the ASP is a printing-brokerage ASP (transASP) or hybrid thereof, service relating particularly to transactional matters;
- if the ASP is a soft-proofing ASP or hybrid thereof, service relating particularly to generation, checking or approval of a soft proof; and if the ASP is a private-network ASP or hybrid thereof, service relating particularly to data transmission or storage.

Other preferences, relative to the ASP-type basic preference, include these: if an RHCPS user is not an established user of any particular ASP (of any one type of the three ASP types or a hybrid thereof), then the RHCPS interface preferably includes an RHCPS link to data of all ASPs— which are established copartners with the RHCPS; or of that one type or hybrid, which are established copartners with the RHCPS.

In preferred embodiments of its second major independent facet or aspect, the invention is a computerized remote proofing method. It includes the step of operation, by a user, of a closed-loop-color remote hardcopy proofing service (RHCPS) user interface, to gain access to data about a printing job to be hardcopy-proofed.

It also includes the step of granting, by a graphic-arts application service provider (ASP), of access to data about the ASP's service. This step is in response to the user's activation of a link, within the RHCPS interface, to a user interface of the ASP. The RHCPS user is also a user of the ASP.

The foregoing may represent a description or definition of the second aspect or facet of the invention in its broadest or most general form. Even as couched in these broad terms, however, it can be seen that this facet of the invention importantly advances the art.

In particular, this aspect of the invention calls for complementary behavior, on part of the ASP, to system establishment and operation of the RHCPS itself. More specifically this is a first one of two distinctly different kinds of complementary function provided by the ASP—this first kind being simple access, for an ASP user, to the ASP's own data (but through the RHCPS).

As suggested earlier, for purposes of this first kind of ASP cooperation, the ASP's interface can be very simple, even limited to type-in console-application syntax. That is because this mode of operation can depend on the RHCPS to provide for a nice presentation. On the other hand, as will be seen in the "DETAILED DESCRIPTION" section, this minimalist arrangement is not a requirement; i.e. the ASP if desired may provide the data preformatted in the ASP's own customized GUI or multifield-DOS/Unix presentation, which may be as elaborate as desired.

Although the second major aspect of the invention thus significantly advances the art, nevertheless to optimize enjoyment of its benefits preferably the invention is practiced in conjunction with certain additional features or characteristics. In particular, preferably the operating step includes actions supporting preparation of a remote closed-loop-color hardcopy proof, by a printer device that prints and reads a calibration pattern and returns a calibration report to an entity in a different location from that printer device.

Another basic preference is that the granting step occur only if the ASP is an established copartner with the RHCPS. Yet another is that the granting step include presenting to the user a visible tabulation of that user's graphic-arts jobs with the ASP.

As in the first main aspect of the invention, if this visible-tabulation preference is met then it is further preferable that the presenting step include opening an active graphic-arts dialog window for the user's addition or modification of that user's own graphic-arts jobs. If this is done, then it is also preferable in turn that the opening step include permitting the user to delete that user's own graphic-arts jobs, by means of the dialog window.

Another subpreference to the visible-tabulation feature is to include the step of maintenance, by the RHCPS, of data linking each RHCPS user to each ASP with which that user is registered. In this case it is further preferable that, for each user, the granting step be performed only by an ASP with which that user is registered. If this registration constraint is in effect, then preferably the method further includes—for each particular job that a user has associated with a particular ASP—automatic routing, by the RHCPS, of proof reports and related details to the user through that ASP rather than to the user directly. This automatic routing, however, is not performed if the user specifically instructs the RHCPS to the contrary.

In preferred embodiments of its third major independent facet or aspect, the invention is a computerized remote proofing method. It includes the step of operation, by a user, of a graphic-arts ASP user interface, to gain access to data about the ASP's service.

It also includes the step of granting, by a closed-loop-color remote hardcopy proofing service (RHCPS), of access to data about the RHCPS. This granting is in response to the user's activation of a link, within the ASP interface, to a user interface of the RHCPS—i.e. a reverse link as mentioned earlier. The ASP user is also a user of the RHCPS.

The foregoing may represent a description or definition of the third aspect or facet of the invention in its broadest or most general form. Even as couched in these broad terms, however, it can be seen that this facet of the invention importantly advances the art.

In particular, this aspect of the invention highlights a second kind of complementary behavior, on the part of the ASP, to system establishment and operation of the RHCPS. Here a greater burden is placed on the characteristics of the ASP's interface.

The ASP's interface now is assumed to be sufficiently user friendly for its customers' purposes—whether an elaborate GUI or a type-in console-application syntax or anything in between (multifield reading/entry etc.). For some sophisticated operators, type-in syntax is quite sufficient, although for most at least a multifield control screen is preferable.

In this reverse-link environment, the RHCPS interface may or may not be invoked: here it is the ASP interface that may, if preferred, be allocated all the tasks of formatting and presenting the RHCPS data. As will be understood, for most ASPs there will be no adequate motivation to provide this extra service.

Some ASPs, however, may want to distinguish themselves over their competitors by providing a more-helpful interface; or may want to provide a richer look and feel; or simply may wish to obscure, for their customers, the fact that the service is available through other arrangements. All of these variations and also all of these motivations are within the overall flexibility, and also within the individuality- and competition-enhancing objectives, of the present invention.

Although the third major aspect of the invention thus significantly advances the art, nevertheless to optimize enjoyment of its benefits preferably the invention is practiced in conjunction with certain additional features or characteristics. In particular, preferably the granting step occurs only if the RHCPS is an established copartner with the ASP.

When this is so, then for each user the granting step preferably includes displaying a visible tabulation of that user's jobs that are subject to remote hardcopy proofing. If so, then the displaying step preferably includes opening an active remote-hardcopy-proofing (RHCP) dialog window for addition or modification of that user's own RHCP jobs.

This opening step in turn preferably includes enabling the user to delete that user's own RHCP jobs. Other preferences described above in relation to the reverse-link preference for the first aspect of the invention are applicable here as well.

In preferred embodiments of its fourth major independent facet or aspect, the invention is a method of operating a closed-loop color remote hardcopy proofing service (RHCPS). The method includes the step of making available a computerized, network-based RHCPS operated through at least one user interface.

Another step is, for each project of the RHCPS, establishing functioning computerized relationships among the RHCPS and entities that include at least a primary customer and a printshop. Yet another step is enabling any of those entities to initiate a project—and thereby define default operating conditions that determine which of the entities sees, in the at least one user interface, each other one of the entities respectively.

A still further step is—regardless of which of the entities initiates the project and defines the default relationships—reserving to at least one of the entities (i.e., a participant other than the RHCPS) an option of redefining operating conditions to override the default conditions.

The foregoing may represent a description or definition of the fourth aspect or facet of the invention in its broadest or most general form. Even as couched in these broad terms, however, it can be seen that this facet of the invention importantly advances the art.

In particular, this aspect of the invention as just described provides another key feature that balances features associated with the earlier facets. One element that is especially helpful here is the preservation of a specified participant's control over the relationships. As will be seen, selection of the most appropriate participant to hold this role may perfect this aspect of the invention.

Although the fourth major aspect of the invention thus significantly advances the art, nevertheless to optimize enjoyment of its benefits preferably the invention is practiced in conjunction with certain additional features or characteristics. In particular, preferably the "at least one of the entities"—i.e., the entity that can override the default conditions—includes the primary customer.

Thus, whereas any of the vendor entities may facilitate establishment of the relationships, fundamentally it is the customer who drives the economics of the entire situation and should usually be entitled to reconfigure those relationships. A further preference is that the method include the step of making available to the primary customer information about the option: it would be a hollow privilege if the customer didn't know about it.

One preferred way of making the information available is including in an RHCPS user interface seen by the primary customer a link to terms of the RHCPS, which include the information about the option. Mere presence of such a visible link does not itself unduly press upon the customer—particularly a satisfied one—the availability of the option. Plainly these principles are somewhat in tension, and their proper balance is a matter to be carefully considered in configuring the wording, graphics and general level of conspicuousness of the link and of the customer-override terms, in the RHCPS user interface.

Another, more-specific preference is that the reserving step include enabling the primary customer to redefine which of the entities the primary customer can see. By operation of this fourth facet of the invention, together with these several preferences, the method stimulates competition—while tending to deter redundancy—among enterprises in the printing industry.

Previously described preferences, particularly relating to the types of entities involved, are applicable for this fourth aspect of the invention too. As noted earlier, the several independent aspects of the invention are most advantageously all practiced together.

In preferred embodiments of its fifth major independent facet or aspect, the invention is a method of operating a closed-loop color remote hardcopy proofing service (RHCPS) that stimulates competition while tending to deter redundancy, among enterprises in the printing industry. This method includes the step of making available a computerized, network-based RHCPS operated through at least one user interface.

Another step is, for each project of the RHCPS, establishing functioning computerized relationships among the RHCPS and entities that include at least a primary customer and a printshop. Still another step is enabling any of the entities to initiate a project and thereby define default operating conditions that determine which of the entities sees, in the at least one user interface, each other of the entities respectively.

Yet another step is—regardless of which of the entities initiates the project and defines the default relationships—reserving to the primary customer an option of redefining operating conditions to override the default conditions. A further step is making available to the primary customer information about the option, by including the information in the at least one user interface or in separate communications to the primary customer.

The foregoing may represent a description or definition of the fifth aspect or facet of the invention in its broadest or most general form. Even as couched in these broad terms, however, it can be seen that this facet of the invention importantly advances the art by expressly preserving a proper position of the primary as in control, while allowing vendors great latitude in individual style and character of operation—as long as, basically, the primary feels well treated. Preferences here are closely related to those introduced earlier.

In preferred embodiments of its sixth major independent facet or aspect, the invention is a user interface for a closed-loop color remote hardcopy proofing service (RHCPS). The interface includes RHCPS input/output elements for gaining access to a computerized, network-based RHCPS. These input/output elements are also for entering data and instructions into the RHCPS, or reading data and status from the RHCPS—or both.

The interface also includes application service provider (ASP) input/output elements for each project of the RHCPS. These elements reflect functioning computerized relationships among entities that include the RHCPS and at least one ASP.

The foregoing may represent a description or definition of the sixth aspect or facet of the invention in its broadest or most general form. Even as couched in these broad terms, however, it can be seen that this facet of the invention importantly advances the art.

In particular, this interface provides a basic building-block mechanism for accomplishing the several advances discussed in relation to the first five aspects. Preferences are closely identifiable with preferences for those earlier-introduced aspects.

As mentioned earlier in connection with the first independent aspect of the invention, the interface is not necessarily a graphical user interface ("GUI"), although this may be preferred for some types of users. Rather the interface may take any of a great variety of forms, especially including the classical DOS- or Unix-style control screens with multiple data-display or -entry fields but no icons or other elaborate graphics. As is well known, such forms are orders of magnitude more efficient in terms of using computer resources—particularly including considerations of speed, storage, and reliability.

All of the foregoing operational principles and advantages of the present invention will be more fully appreciated upon consideration of the following detailed description, with reference to the appended drawings, of which:

BRIEF DESCRIPTION OF THE DRAWINGS

FIG. 25 is a picture like FIGS. 23 and 24, but for use by the proofing ASP if participating;

FIG. 27 is a picture like FIGS. 23 through 26, but for use by the transaction ASP.

DETAILED DESCRIPTION OF THE PREFERRED EMBODIMENTS

1. Open Coventuring, with Preserved Clientele

Figure 1:
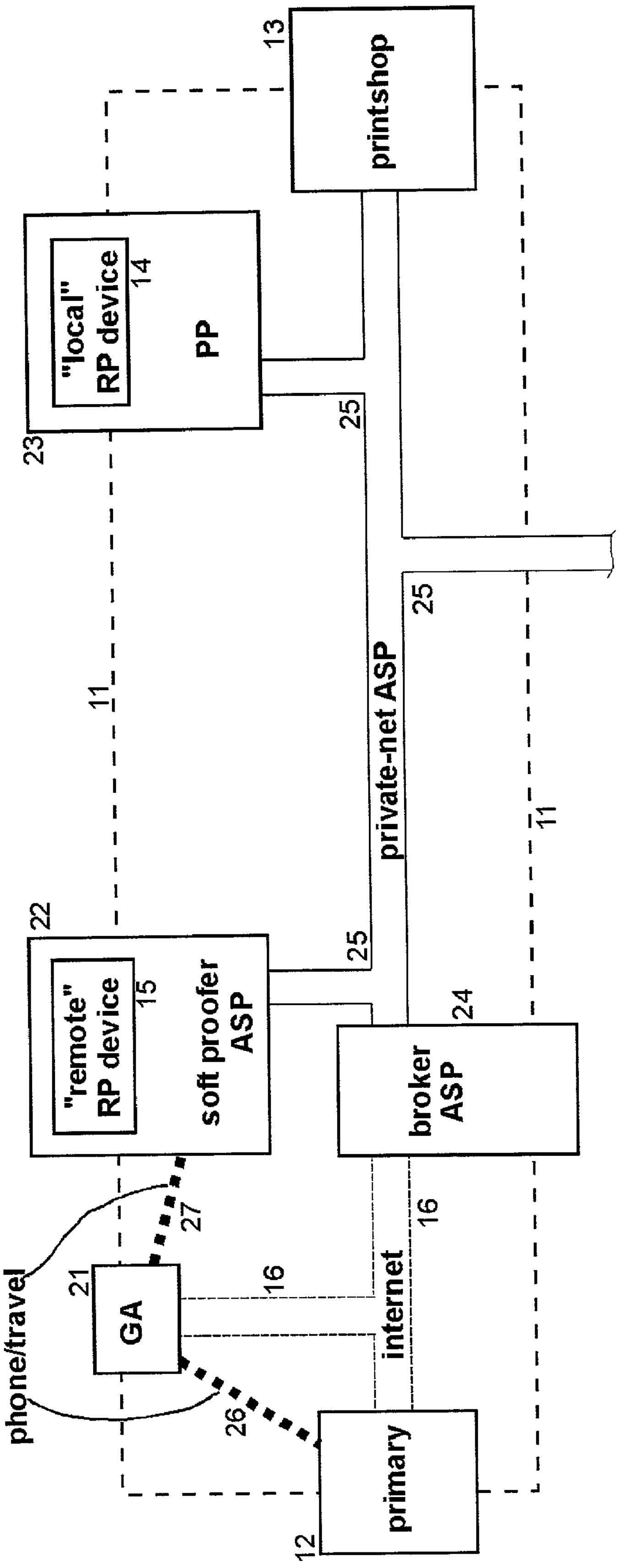
FIG. 1 is a diagram, highly schematic, of a representative hardware system according to preferred embodiments of the invention.

Preferred embodiments of the invention enable the several types of participants in the printing industry to use a service such as a remote hardcopy proofing service (RHCPS)—and in fact services of any of certain other ASP copartners, and any other vendors that are registered in the system—with only a reasonably minimal concern for the possibility of clientele lost to competitors as a direct result of participation in the service. Yet each client, customer, and in fact each participant at any level, is always free (subject to separate contractual constraints, of course) to change allegiances at will, provided only that the client exercises initiative to find a preferred vendor through means other than behavior of the copartnering ASPs.

For example the yellow pages phonebook, or a trade directory, can always be used to actively seek an alternative vendor for any of the services involved. None of the copartnering entities or other registered vendors can reasonably expect to prevent such efforts on the seeker's own initiative, unless the customer and vendor have entered into an exclusive service contract of some sort. What is, however, disfavored is subversion of the objectives of co-partners and vendors through seductions on the part of the copartnering application service providers themselves.

These benefits are produced for the participants by programming into the service infrastructure a capability to recognize which of the participating business entities it was that introduced each primary customer to each component, respectively, of the overall interlinked service. That customer is thereafter associated with that introducing entity, or array of introducing entities—unless the customer itself undertakes to revise the association.

In computer jargon, the customer and the introducing entity are associated simply as a "default". As those in the programming field know, the quoted word means that this association is the operating assumption, in the absence of contrary information—which can be entered into the system databases by one or more of the parties, perhaps using some other menu and dialog window.

This arrangement does not imply that the customer's ability to make such revisions should be kept a secret from the customer. In fact that way of operating would not be fair to service participants other than the initially introducing entity. To the contrary, in preferred embodiments of the invention the customer's option of reconfiguring the basic relationships is part of the terms of the RHCPS and is available to be read at some appropriate level in, for example, the "help" screens of the service.

For example, a particular printing house that signs on for use of the RHCPS should ordinarily be entitled to use it for any primary customer that elects to buy printing from that particular house—including one that wishes to transfer its business from some other printshop. To provide the primary customer less flexibility than that would be rather contrary to the general principle of free enterprise and possibly subject to legal sanction.

Ideally a proper balance is maintained between, on the one hand, preserving the customer's right to know that such options are available; and, on the other hand, undermining the copartners and other participating vendors by pushing such options onto the customer. In effect the system as thus configured implements basic traditional trade courtesies on the part of printers, ad agencies, graphic artists and ASPs alike—i.e. to refrain from rudely abusing a complementary enterprise in return for a kind referral by sending the customer off to some competitor of the referring enterprise.

In the classical scheme of things, if a customer expressed to the initial beneficiary of a referral an active discontent with services of the referring entity—then the initial beneficiary would be faced with a difficult professional and interpersonal task. This might call for balancing kind words for the referring entity with suggestions to the customer (based upon principled reasoning as to the substance of the situation rather than personalities) that perhaps, "for this type of project", a larger enterprise, or smaller one, or differently specializing one, might be more appropriate. (If done well, this behavior might in truth benefit even the initially referring entity, if in fact that entity and the customer were a poor match based upon size, specializations or the like; for the referring entity constantly might be expending extra resources in a hopeless effort to please a customer who represented only marginally profitable business.)

That sort of delicate weighing and discreet choice of wording is generally unavailable in the conventional electronic-commerce environment; hence the problem outlined in an earlier section of this document. Preferred embodiments of the invention therefore construct an alternative mechanism for striking a different kind of balance, which approximates the classical trade courtesies without demanding so much of the participating vendors. In this way the invention exploits an easily practiced technological solution to reintroduce and maintain a special kind of professional integrity within the e-commerce segment of the trade.

2. Network Environment

The technology itself while novel in application is relatively straightforward technologically, as suggested by the earlier discussion of integrating software peripherals into a major word-processing program. The present invention contemplates establishment and operation of an RHCPS 11 (FIG. 1) over two or more networks—one being the Internet 16, for those participants who are satisfied with that level of service; and another being at least one private network 25 such as that operated by the company called "Wam!net".

In general, transactions and services between particular customers, vendors and e-service entities may proceed partly by Internet and partly by private network, to the extent that those participants prefer; or may instead be entirely on the Internet or entirely on a private network. Users gain access to the most-local portion of the selected network by traditional phone dial-up, or by DSL-style or cable-modem connection, or by ports connected directly to high-speed optic-fiber or coaxial lines that are linked directly to the network backbone.

A primary customer 12 may itself initiate arrangements for connection and commerce with the RHCPS or other participant 13, 21-24 directly—or one of the other participants (the RHCPS, or other ASP 22, 24, 25, or a trade vendor) may offer to set up the customer's initial connections to get the customer started. As a practical matter, all or substantially all the relevant services involve interconnection of apparatuses, i.e. equipment, of the respective participants; these devices may range from a common personal computer for soft proofing to an extremely specialized prepress ("PP") facility 23, or inkjet proofing printer 14, 15; or to network equipment itself.

An underlying objective of preferred embodiments of the invention is to preserve the value of business-generating efforts by all and any participants, i.e. of entrepreneurial industriousness and goodwill. At the same time these embodiments preserve a maximum degree of utilization of available technology, for the benefit of all involved, i.e. for maximum interoperability of the several systems involved. As suggested earlier, the relatively open-structured but essentially coventuring relationship of entities that is established in preferred embodiments of the invention tends to deter less-salutary motivations, e.g. for piracy, parasitic behavior and the like.

Shown connected to the networks in FIG. 1 are examples of the several types of participants in preferred embodiments of the present invention. These typically include the principal participants in a basic graphic-arts transaction, namely the customer 12, printshop 13 and RHCPS 11.

In event those are the only participants, then a local proofing printer 14 may be housed at the printshop 13 itself rather than in a separate enterprise as illustrated; and a remote proofing printer 15 may be housed at the primary customer's facility 12 rather than elsewhere as also illustrated. Nevertheless both the local and remote printers are labeled as "RP" (remote proofing) devices because they preferably are both units in a product line of inkjet printers particularly designed and optimized for consistent and reliable closed-loop-color performance in an overall remote-proofing environment.

Ideally the two printers are essentially identical, and preferably Hewlett Packard products. The principal users 12, 13 can be connected entirely through the Internet 16, or entirely through a private-network ASP 25; or as suggested partway through one and partway through the other. In such a hybrid network configuration, the interface between the two nets is not necessarily at the facility of some other participant (as shown), but rather may instead at a terminal box or other facility maintained by, e.g., the network ASP.

Many other possible combinations of participants are possible and frequently encountered in operation of the RHCPS. The example illustrated includes a relatively full complement of such participants: a prepress house 23 associated with the printshop 13 and possibly providing the local proofing equipment 14; and a graphic arts ("GA") house 21 or ad agency etc. somewhat more closely associated with the customer 12.

The PP and GA enterprises may be computerized services, i.e. e-commerce ASPs, but in their most common forms they are instead conventional businesses. For example much or most of the communication and materials passing between the primary 12 and the GA 21 are commonly implemented by traditional methods 26—telephone, or courier, or actually going to see one another, or the like.

More commonly taking the form of ASPs are the other participants illustrated: a soft-proofing ASP 22, enhancing its services by maintaining a remote RP device 15 and serving also as a terminal for the RHCPS 11; a broker or middleman ASP 24, here also called a transactional ASP (transASP); and the private-network ASP 25. In the particular configuration shown, neither the primary 12 nor the GA 21 has a remote-proofing device; hence they depend on the soft-proof ASP 22 and perhaps typically use traditional methods 27, 26 in making arrangements for and in retrieving the hardcopy proof, carrying it to the primary 12, and giving approval.

Emphatically, these methods can be bypassed if the primary or GA, or both, prefer to invest in equipment 15 for receiving and viewing proofs in-house.

3. Components of Preferred Embodiments

For successful operation, it has proven helpful to provide certain distinct elements—listed below—in preferred embodiments of the invention. This should not, however, be mistaken as meaning that all these components are required:

- availability of a printer device able to do closed-loop remote hardcopy proofing (RHCP), including automatic return of a definitive report on color reproducibility—and preferably absolute accuracy—in perceptual or calorimetric terms, or both;
- emplacement of a hardware infrastructure for carrying data—including queries, approvals, exceptions and so on—among or between defined participants;
- establishment of a standardized document-content format which is widely available to industry participants—and which is amenable to streamlining for efficient and unambiguous specification of images to be proofed;
- parallel establishment of a standard job-definition format—also amenable to streamlined specification, but of overall commercial/industrial processing steps; and
- a workflow-management protocol or component that defines the participants, shapes and constrains all their interactions, and thereby integrates the above components to implement the RHCP objective.

In most-highly-preferred embodiments of the invention, the printer device is a Hewlett Packard product that has the above-mentioned RHCP functions built-in. The hardware infrastructure, for reasons already suggested, is ideally a hybrid of Internet and participating private networks—which latter can be operated by ASPs as noted earlier.

One of the network subelements is preferably an electronic "gateway" or file-server infrastructure operated by the Hewlett Packard Company or other manufacturer of the printer device. This subelement helps to ensure a proper interlinking of the printers, their updating with software upgrades from time to time, and overseeing of their color-calibration maintenance and basic operating integrity.

The document-content format preferably is a portable document file ("PDF") of the Adobe company—but with a stringently reduced parameter set, for streamlining, as will be exemplified in a later section of this document. The job-definition format is likewise a reduced-parameter version of the industry's job definition file ("JDF").

Modernly the PDF specification has branched into other standards definitions, based on PDF, and particularly including PDF/X-1 and PDF/X-3. These specifications go along the same general lines of restricting the types of data and parameters that can be used; and in fact one highly preferred embodiment of the invention now uses the PDF/X3 specification.

(a) Workflow protocol features—The "workflow management protocol", on which the present patent document particularly focuses, in turn preferably has key features:

(1) a delicately defined set of rules that interlink diverse participating entities and strike a careful balance among certain competing measures of fairness, loyalty, and autonomy—in an intuitively acceptable way;

(2) an interentity interface-sharing technique that implements those rules in a manner which, once again, represents a fine balance between discreet, decorous conduct of business and an open, nonsecretive regime;

(3) support of JDF-based workflow in the abstract;

(4) notification of job activity to relevant participants;

(5) logging of job activity; and (6) a user interface—preferably but not necessarily a graphical interface, e.g. based on extensible markup language (XML)—that is compatible with the interentity interface-sharing objective—while interacting with all interested users to expedite the entry, retrieval, modification and use of all the information in the system.

As to feature (1) in this list, the principles of loyalty and autonomy are intrinsically in tension with each other; in other words, they trend oppositely—and the principle of fairness is a kind of moderating influence that may keep them from tearing each other apart or destroying potentially beneficial business relationships. As to feature (2), analogously, discreet and decorous behavior trend in directions that often conflict with openness or nonsecretiveness.

In preferred embodiments, the workflow-management protocol is not complex so much as it is carefully contoured, at difficult points—so as to accomplish the desired balancing of the contrary-trending business and societal considerations that have been introduced here.

Features (3) through (5) in the list are more mechanistic. They essentially represent backbone chores that the procedures should accomplish. Feature (6), a programmed computer interface used directly by all or most participants in the system, is at once a medium of communication, an automatic implementer of the mechanistic tasks, and an enforcer of the rules and the technique.

(b) Proofing ASPs (or primary customers) and the work protocol—A service ASP that wishes to offer a remote-proofing service to its own customers can use the workflow-management component or protocol of the present invention to delegate the management of proof status, as will be explained shortly. In such a situation the ASP infrastructure can itself implement the following functions, or parts of them.

- the method for sharing a proof between the originator and the receiver or receivers, possibly using different models—for example, a mailbox for each user or a shared working site on the network
  - (The corresponding element in the classical environment, previously mentioned, is the printer's makeready room, with its job bins and sometimes an adjacent conference room.)
- the transport method and protocols for the proof files, for example provision of a high-bandwidth private network to connect users
  - (The classical analog of this element, also mentioned earlier, is a courier.)
- the method or methods for interaction between the final user and the interfaces provided according to the invention
  - (Here the earlier-noted classical analog is work of the prepress manager, or the business proprietor, or a salesman.)
- integration with other services provided by the ASP, such as digital-asset management
  - (This function corresponds to file cabinets, or a safe-deposit box, or a vault—for holding archival plates, negatives and artwork.)

The ASP, however, would delegate the management of the proof jobs to the workflow-management component (or protocol) of the present invention. As stated in an earlier section, this workflow- or proof-management function consists of knowing and changing (1) the status of the proofs, and (2) possible actions that can be performed on a proof job at any given moment.

The service ASP is therefore free to establish a system and protocol that are independent of the details of the "life cycle" of a proof. These elements of the ASP's operations need not be changed when proof-management details are changed.

The workflow-management protocol or component of the present invention provides an interface that is based on, but moves beyond, industry-standard hypertext transfer protocols (HTTP) and extensible markup language (XML), to provide three groups of functions:

- proof activity—The ASP uses these functions whenever an action is to be taken on a proof, as for example when a user uploads a proof document to the ASP service. The actions are used as input by the workflow-management component and may cause changes in the status of proofs.
- proof status queries—The ASP can perform queries on the status of a certain proof or a set of proofs. The workflow-management component provides replies, which the ASP can use to provide information to the primary customer.
- proof event notifications—These events are initiated by the workflow-management component itself, to notify the ASP and its client of changes in status of a proof job.

While these functions represent a relatively high degree of interaction between the ASP and the workflow-management component—as to details of a proofing project—that is true in large part because this first example discussed here is for a proofing-service ASP.

As indicated previously, upon logging on to the RHCPS the service ASP sees only its own projects—and, once the particular customer involved has been identified, sees only its own projects with that customer. This is normally true even if the same customer has projects with, for instance, other service ASPs.

In many cases such an ASP operates essentially on behalf of a primary customer. A generally comparable degree of close interaction occurs if the workflow-management protocol is operated by the primary's own technical people directly, rather than through the ASP.

As seen in the following subsections, however, the workflow-management component is also capable of interacting with other types of ASPs beneficially but much less intimately than described above.

(c) Transaction ASPs (or buyers) and the work protocol—A broker, agent, intermediary, middleman, matchmaker or other print-transaction ASP (transASP) can use the workflow-management component or protocol of the present invention in ways generally analogous to those described above. Such a transaction ASP, however, most commonly does not wish to set up full remote proofing capabilities in its environment.

The focus of a transASP is in fact the commercial aspects of the industry rather than the operational aspects. Accordingly the transASP more commonly prefers to use remote proofing services provided by service ASPs to supply operational functions for the transactional service.

In this case, most transASPs, using the workflow-management protocol or component of the present invention, do not care to know specific details of the remote proofing service operations provided by the service ASP. The transASP can use several different ASPs simultaneously for different clients or even for different projects of a common client.

A transASP that does not implement its own remote-proofing service most typically uses only the proof status query interface module (mentioned in the preceding subsection), to occasionally consult information about proof status. The transaction ASP usually does not want to see the proof, or its approval, or any other related activity unless the transaction is in danger of failing.

At that point, however, the transaction ASP—if a participant in the RHCPS—at its own facilities can log on to the service. The transaction ASP can then quickly determine whether and exactly when proof material was transmitted to the proofer, when and how a proof was returned, what response was made upon inspection of the proof by the authorized party, and thereby generally just when, how and why the process may have broken down.

Concerned for the satisfaction of its client, upon which a commission ordinarily depends, the transaction ASP can promptly and efficiently learn what might be done to put the transaction back on track to completion. To accomplish this, as in the other situations described in this document, the transaction ASP will not have to search through many entries pertaining either to its competitors, or to transactions that happen to use no transaction ASP at all, or to transactions with the same printer but other customers of the same ASP, or perhaps even to transactions which the same customer may have placed with a different transaction ASP.

Rather, the transaction ASP simply need identify its own customer. The ASP then sees only relevant projects, i.e. its own projects with that customer.

A similar degree of arm's-length interaction with the workflow-management component of the present invention may be appropriate for, e.g., the business manager or financial officer of a primary customer using the RHCPS of the present invention—where the primary customer's technical people are operating the protocol directly as mentioned at the end of the last subsection.

(d) Transport ASPs (or IT managers, or couriers) and the work protocol—Yet another kind and degree of interaction arises between the workflow-management component of the present invention and a different entity entrusted with transmission of proofing materials for use in proofing, or with return delivery of a proof for viewing. This sort of interaction is ordinarily limited to information about the transmission or delivery itself, a function that usually arises only when some aspect of those events is not fully automatic.

For instance, if the primary customer or a service ASP has elected to use the services of a transport ASP (private network operator) for such transmissions and deliveries, ordinarily the transport ASP in such workflow is transparent—and also essentially content neutral. The transmitting entity logs on to the network in a generally conventional (and usually automatic) way, and sends; the receiving entity logs on likewise and receives.

Ordinarily there is no need to otherwise contact or communicate with the transport ASP. If, however, deliveries fail because the connection drops out or is noisy during transmission—or if the sender believes that transmission was complete but the recipient does not have the file—then they can query the transport ASP.

In preferred embodiments of the invention, if the transport ASP is an active coventurer in the RHCPS, then that ASP can supplement its usual procedures for checking into such situations. Specifically, and very advantageously, at its own facilities the ASP can log on to the RHCPS interface to inspect technical data about the transmission.

Where there has actually been any passage of data to the private net, the transport ASP can see log-ins by the sender, associated with traceable information about the transmission to see what happened next. This level of interaction with the service is comparable to the contact which occurs if the sender is in a large firm with its own "information-technology" (computer) department, and the sender contacts that department to investigate a failed transmission.

Another example of the same degree of contact is the relatively unlikely instance of a buyer, prepress service etc. that actually uses a courier service to complete proof delivery through the last leg of a delivery chain, to a primary customer who is not on-line at all. In that case the entity which logs on to determine status may be the courier service.

In these various situations, as in the earlier sections and subsections of this document related to interactions with the workflow-management component of the RHCPS, what the courier, or IT department, or transport ASP sees tabulated is only its own relevant tasks with relevant parties. This is ordinarily the case even if those parties are engaged in other projects using other couriers, or other transport ASPs, respectively.

(e) Advantages of the workflow-management component of the RHCPS—The service thus promotes and enhances cooperative coexistence and complementary operations by separate (as opposed to vertically integrated) small and large printshops, ASPs, primary customers, and incidental service firms such as manual couriers. While the primary customers and indeed all of the participants are at liberty to realign themselves with other participants, the RHCPS does not encourage them to do so.

If a printshop wishes to use the RHCPS to transmit data for proofs, and actually create proofs, for customers, the printshop can do so without concern that the customer—in the actual process of checking projects with that printshop—will see the names of competing printshops. If the customer were directly led by the RHCPS to see those competitors, the printshop might be disposed to make other remote-proofing arrangements.

On the other hand, if a customer on its own initiative wishes to search the RHCPS for participating printshops, the customer is able to do so. All the same can be said of ASPs and incidental services that has been said of printshops.

In this way the operating rules of the service promote—but do not enforce—loyalty within the trade. Participants in promoting their own services, whether by direct one-to-one marketing contacts or by media advertising, are at liberty to advertise that they can provide remote hardcopy printing through the RHCPS.

This protocol thus tends to mitigate and sometimes resolve the previously outlined difficult problems within the industry. In this way the service benefits the economy in general and the several different kinds of participants in particular.

Further, the workflow-management component is advantageously centralized for use by plural different remote proofing services. In this situation the protocols can be adapted to take advantage of the operating characteristics of specific proofing printers. To consider a case in pertinent point, when a printer is manufactured to perform remote closed-loop color operations, the service can be programmed to facilitate such operations.

More generally the service can be refined or enhanced internally without requiring any change by participants. The latter simply are free to benefit from whatever additional services or features the RHCPS brings on line—as for instance to support new proof-printer features.

By virtue of sharing a common job model, or workflow-management protocol, different remote-proofing services can be interoperable. Proofs created by a user in one service can be used by users in other services.

If a proofing service chooses to provide its own user interface to its users, each of those users can operate with that particular distinctive interface—without needing to know details of features in a counterpart service. Yet plural counterpart proofing services using the centralized RHCPS can communicate with each other through the RHCPS's master interface, sharing and trading excess capacity, overflow work, jobs requiring specialized capabilities, etc.—for the benefit of all.

The RHCPS also has the benefit of naturally giving users of every type only the information those users require or want. For instance a transASP—perhaps using the workflow-management component simply to obtain a proof-status report—need not know details of the remote proofing services being used.

4. User Interface

This section takes up the element identified as (6) in subsection 3(a) above. A journeyman programmer of ordinary skill can straightforwardly create this interface.

Its craftsmanly execution is key to success, since most of the advantages discussed above depend upon implementation of the stated principles by the user interface itself. For purposes of definiteness the following presentation will show and discuss a graphical user interface ("GUI"), but as noted elsewhere in this document a much less resource-demanding user interface can be used instead. An overall benefit of the invention is that the objectives and principles are easily but directly embedded in a DOS/Unix-style interface or in a GUI as preferred.

Once that is done, those objectives and principles become in essence self-fulfilling as the users collectively operate the system from that interface through their respective computers. Here are examples for several different cases:

(a) Primary customer direct to printshop—Suppose that a primary customer uses no intermediary ASP and has sent materials for a printing job to a printing house directly, and the customer itself has a proofing press at its own facility. When that printshop has the proofing file ready, the shop personnel log onto the RHCPS.

Figure 2:
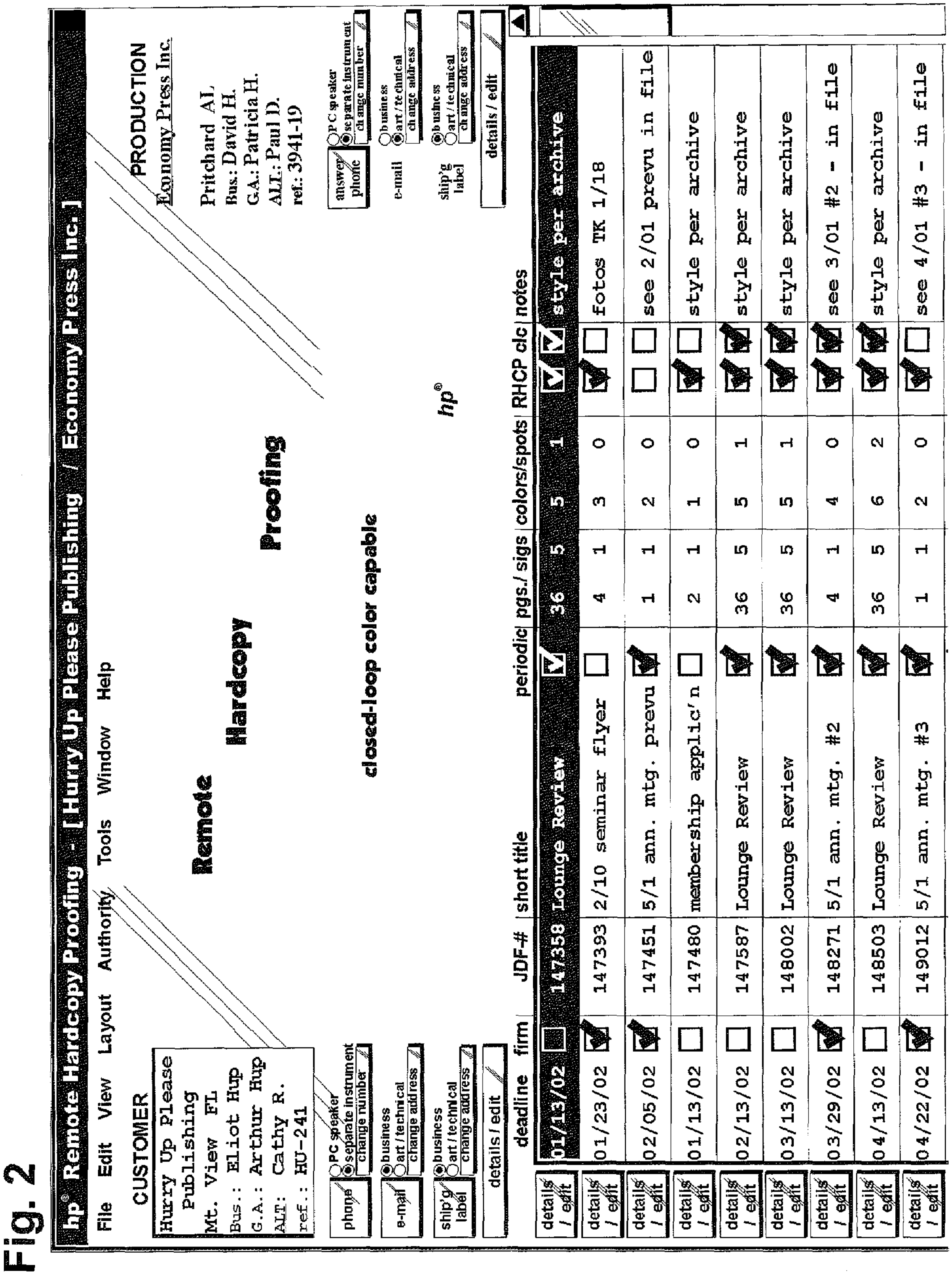
FIG. 2 is a picture of a graphical user interface (GUI) for a printshop using the remote hardcopy proofing service (RHCPS), in the case of a direct customer-to-printshop relationship—and particularly where the customer is the first RHCPS customer of that shop (or where the shop operator has already selected the customer from among plural customers)
Figure 3:
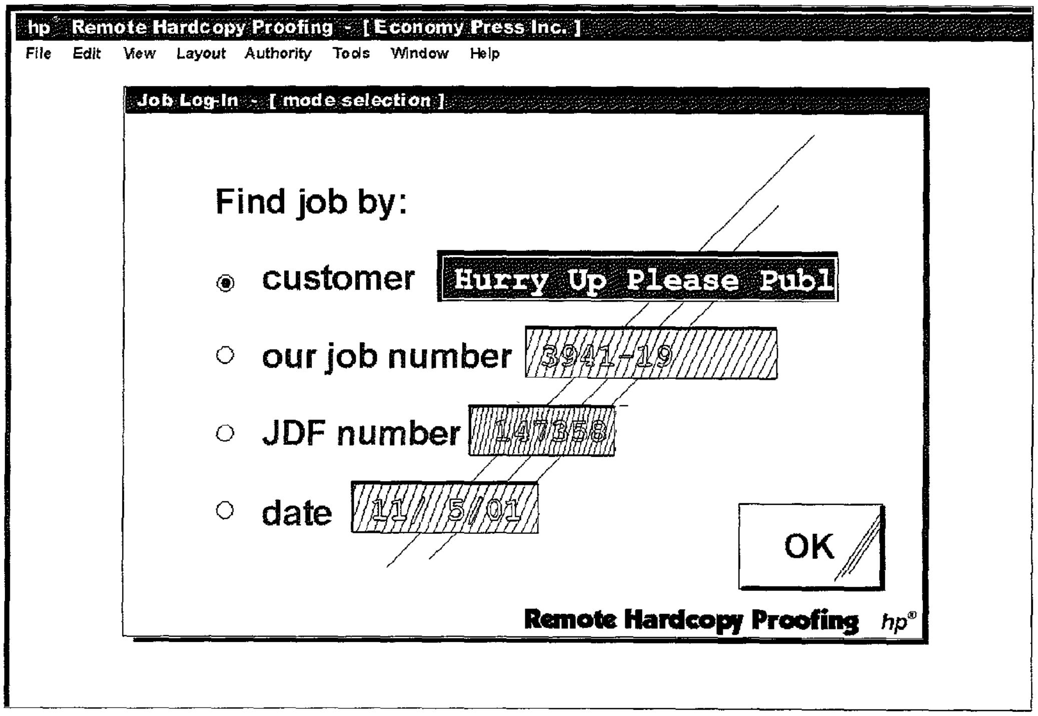
FIG. 3 is a picture of a related interface screen for choosing a job-selection log-in mode, where the customer is not the first RHCPS customer for the shop—or for proceeding directly by customer, job-ticket number, JDF, or date, if the system designers prefer to include such parameters (and default values) in this mode-selection screen.
Figure 4:
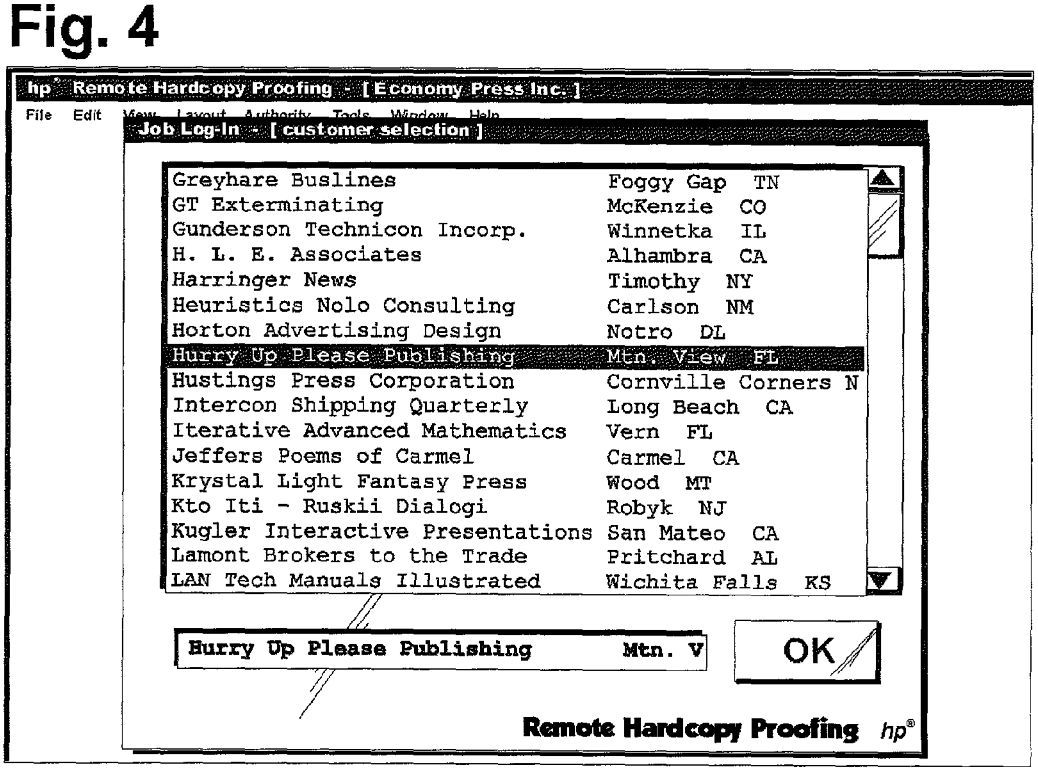
FIG. 4 is a picture of an interface screen resulting from the above-described choice of mode, and displaying a list of customers.

If this is the shop's first-ever RHCPS customer (direct or indirect), then the RHCPS interface simply displays the name of that customer and a list of all that customer's jobs (FIG. 2); otherwise, the shop's operator looks on the screen for the direct customer, either:

- searching by name in a list of established customers (moving from the screen of FIG. 3, solely for selection of finding-by-customer mode; to that of FIG. 4 for actual entry of initials for, and/or scrolling to, a particular customer); or
- manually typing in the direct customer's name in a data-entry field (FIG. 3).

In the first, mode-selection screen, the specific default entries (the entries last used) are grayed out for the mode options next to inactive radio buttons. In the option next to the active button (here "customer"), the default entry appears in reverse characters on a dark field, as shown—so that an operator who wishes to return to that entry can do so simply by clicking "OK" or pressing "Enter" on the keyboard. If instead the operator types anything in that field, the reverse-character default entry disappears and the operator's entry appears in normal (not reverse) characters.

Searching in a list (the first option noted above) is often better, to avoid using a nonstandard or nonpreferred form of the customer's name; nevertheless the second, type-in option may be preferred by fast typists, and can be used even if the customer is an established customer of the shop. In that event, however, the system ordinarily completes the customer's name based upon the operator's entry of just the first few letters—as is nowadays familiar in the address-book functions of e-mail handling programs and the like.

In either case the RHCPS interface responds with a listing (FIG. 2) of all of that customer's projects—and also, at the top, information about the customer and the printshop itself. This upper part of the display indicates by headings and also by font distinctions which data are for the customer and which for the printshop. To further keep these differences very clear, the printshop data (at right) may be displayed as an integral part of the virtual control panel pictured on the screen, while the customer data (at left) may instead appear within a data subwindow as shown.

The displayed listing includes several key parameters of the current project, for ready reference—but not all of the parameters for that project. Such a fuller tabulation would typically occupy a large fraction of the screen for just one project, and would contain many pieces of data interesting only to prepress technicians at the printshop, or proofing technicians at the proofing facility. A full or categorized partial tabulation for any project of the current customer is available to the operator upon operating a related control in the RHCPS interface—such as the buttons marked "details/edit" in the bottom half of FIG. 2, at left of the individual job entries.

Much of the displayed data may be in the database of the RHCPS. Certain other data, however, available in the fuller tabulation—or even in the abbreviated summary (FIG. 2)—may instead reside in the computers of the printshop itself or of the primary customer.

Those data are called up by links into the shop's or customer's own site. The customer's reference number ("HU-241") in the example may be such a value, which changes as the operator moves the dark-background selection bar vertically through the ten entries visible in the list, or operates the scroll bar to move other entries into view, or both.

Up-to-date information for reaching the customer by phone, e-mail, or physical shipment may also be picked up by link into the customer's site, for use by the shop in quickly contacting the customer—as seen from the cluster of controls under the heading "CUSTOMER" at left. Replacing such data, however, with information for specific contact personnel at the customer's facilities is possible too, and represented by the "change" buttons in the same region of the screen.

Figure 12:
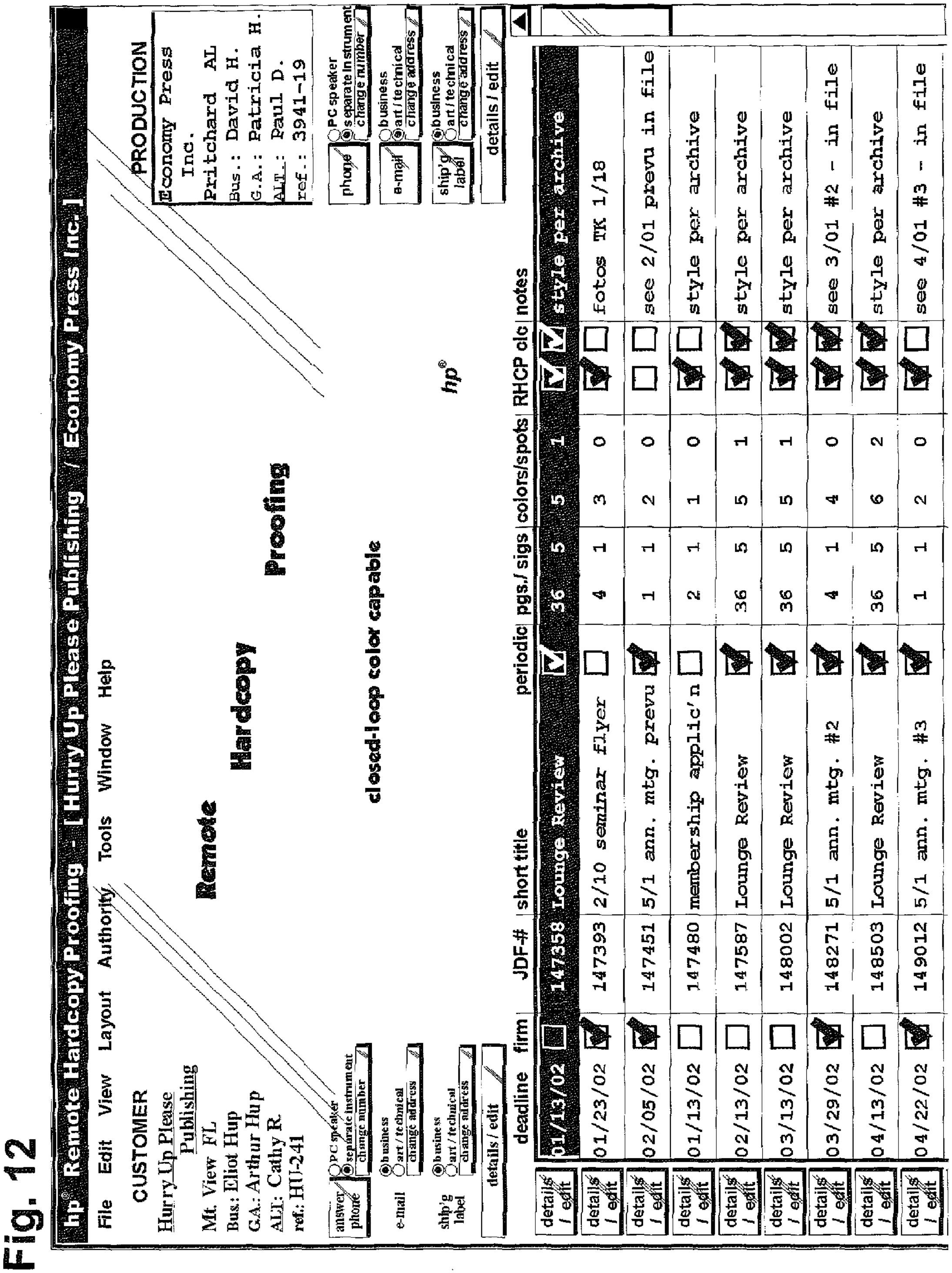
FIG. 12 is a picture of the GUI screen, analogous to that of FIG. 2 and for the same case of a direct customer-to-shop relationship, but displaying the job list as the customer (rather than the printshop) sees it upon log-in through the FIG. 11 screen.

(Analogous "change" controls at the right end of the screen are for actually revising the printshop's own site, as telephone and mail contact data change. These are available to the customer by links to the printshop site in the GUI [FIG. 12] as seen by the customer.)

The operator at the shop next scans the listing for the project whose proofing file is ready. The customer or the printshop may already have entered the project at hand into the RHCPS system; if not, the operator at the shop clicks the "File" menu item at top left, to obtain a generally conventional drop-down menu (not shown) that includes an entry "New" for creating a new entry for the project. Creation of a new job entry typically requires initial entry of some basic facts about the job.

Figure 5:
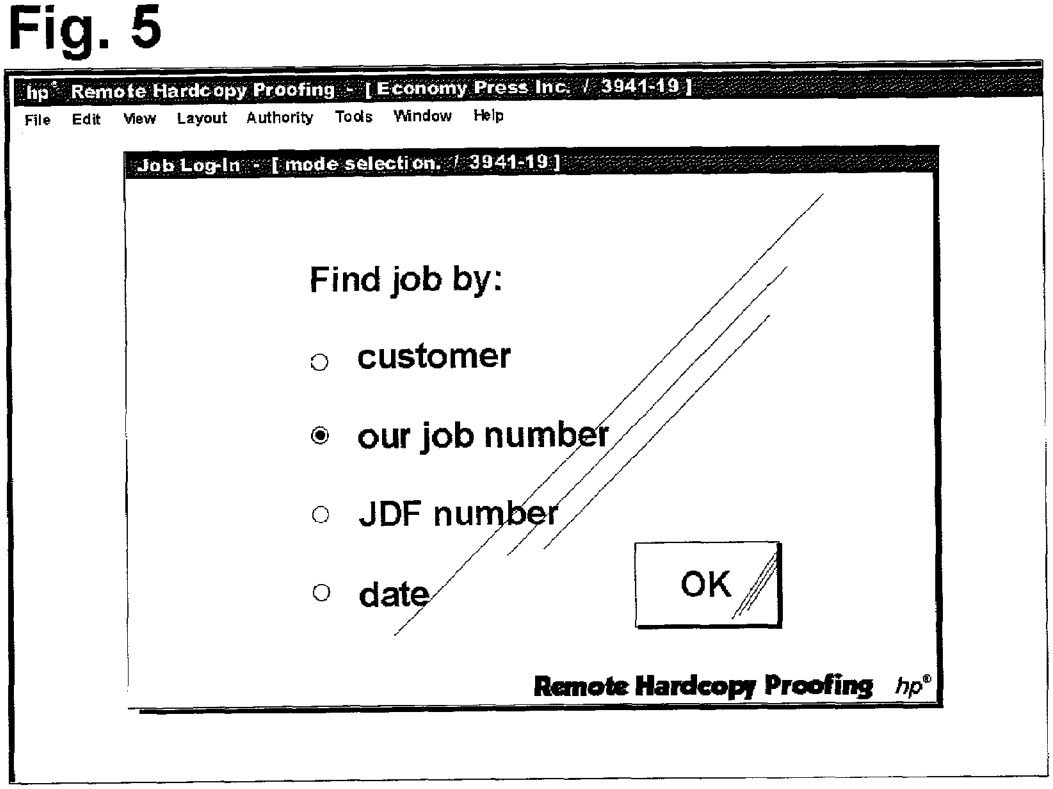
FIG. 5 is an alternative screen like FIG. 3 but without the default parameter-entry fields.
Figure 6:
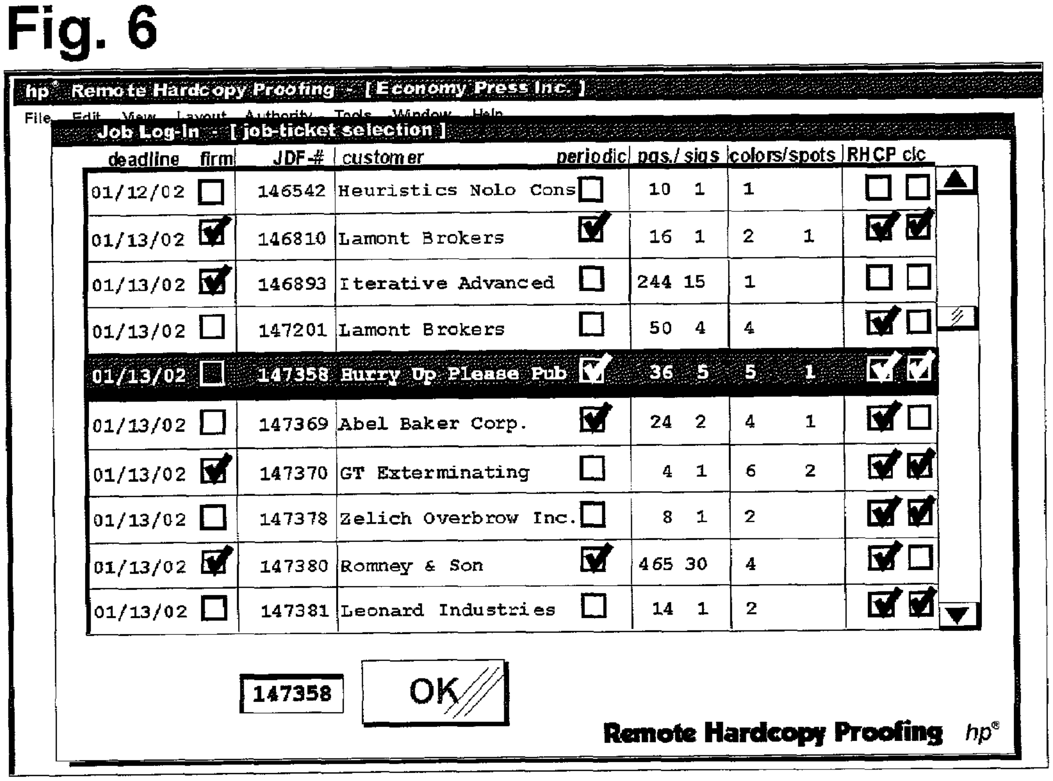
FIG. 6 is a screen that appears—if the operator selects the JDF job-ticket entry mode in FIG. 3 or 5, but in FIG. 3 fills in no JDF number—for presentation of the data field for log-in by JDF job-ticket number.

There is another entirely different way for the shop operator to get to the job at hand, within the RHCPS system—namely, to type-in the printing house's own internal job-ticket number, which the operator knows. This can be done by entering the number directly into FIG. 3—or, in event it is preferred by the system designer not to include that data-entry block in the mode-selection screen—then instead moving from FIG. 5, for selection of job-number finding mode, to FIG. 6 for scrolling to the specified number.

(Throughout almost all of this document, the phrase "job ticket" refers to a strictly standardized document 9 and computer file known as "JDF" or "job definition format". At this particular point in the discussion, however, particularly with reference to the illustrations mentioned above, two different kinds of job tickets are under discussion at the same time: here [1] the phrase "job ticket" without more refers to the printshop's conventional internal job ticket, whereas [2] "JDF" refers to the strictly standardized document with its computer file. The JDF is the only kind of job ticket whose use is fully integrated into the RHCPS—but for purposes of meshing with the internal systems of many and probably most printing houses, it is necessary to deal, in the same breath, with the simple, traditional paper job ticket, and its nomenclature "job ticket". Ideally, where the printshop's internal procedures can stand the change, those procedures are revised so that the JDF is the only job ticket used for any job that is in the RHCPS, and thus the JDF number is the only job-ticket number for those jobs.)

An operator may know the job-ticket number because, for instance, the operator is holding a paper job ticket in hand. Alternatively a colleague may have just finished the proofing-file preparation and asked the operator to take the project to the next stage.

As will be seen, the job-ticket number may be known to the RHCPS interface intrinsically through association with the service's own JDF entries; or may be picked up from the shop's site when needed. The operator, however, alternatively can search by (FIG. 3) JDF number or date. (The system can be configured to use the date of entry into the system, or instead the deadline date.)

Figure 13A:
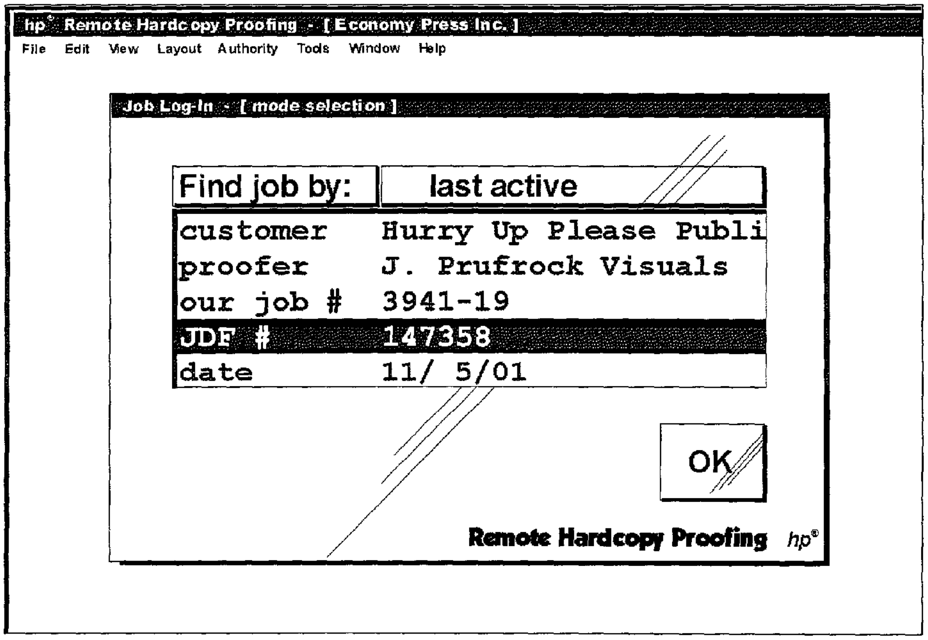
FIG. 13 is a set of three views of a log-in GUI dialog like FIG. 3 in that it is for use at the printing house, and for job selection—but for the case of a proofing ASP added to the parties in the relationship—and particularly showing three exemplary link precursors (i.e., reflecting knowledge of an ASP's being involved in at least one of the printshop's jobs): in the "A" view, displaying the log-in choices within data fields; in the "B" view, displaying them as an integral part of the GUI itself, with radio buttons or check-boxes; and in the "C" view showing the choices in an even more structurally integrated way, with labeled click-buttons.
Figure 13B:
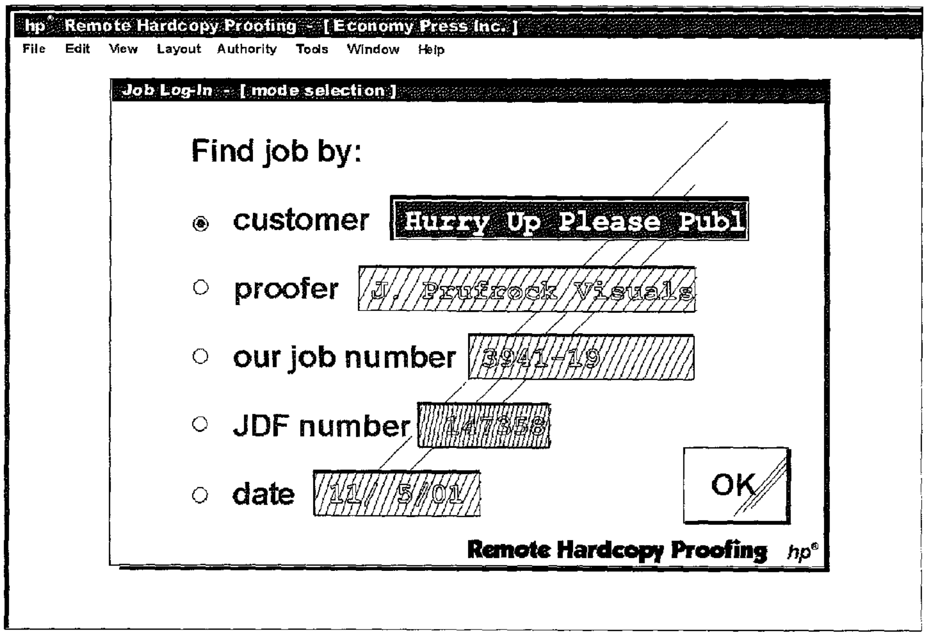

For preferred embodiments of the invention the parameters displayed in the mode-selection screen (FIG. 3) are themselves determined by the commercial environment surrounding the job. If the printshop does business with parties other than primary customers, then presumably the shop operator may find it easier to search for some jobs by the names of those other parties—brokers, proofers, network couriers etc. In such a printshop advantageously the list of possible search modes in the mode-selection screen includes additional choices (e.g. FIG. 13B).

Figure 7:
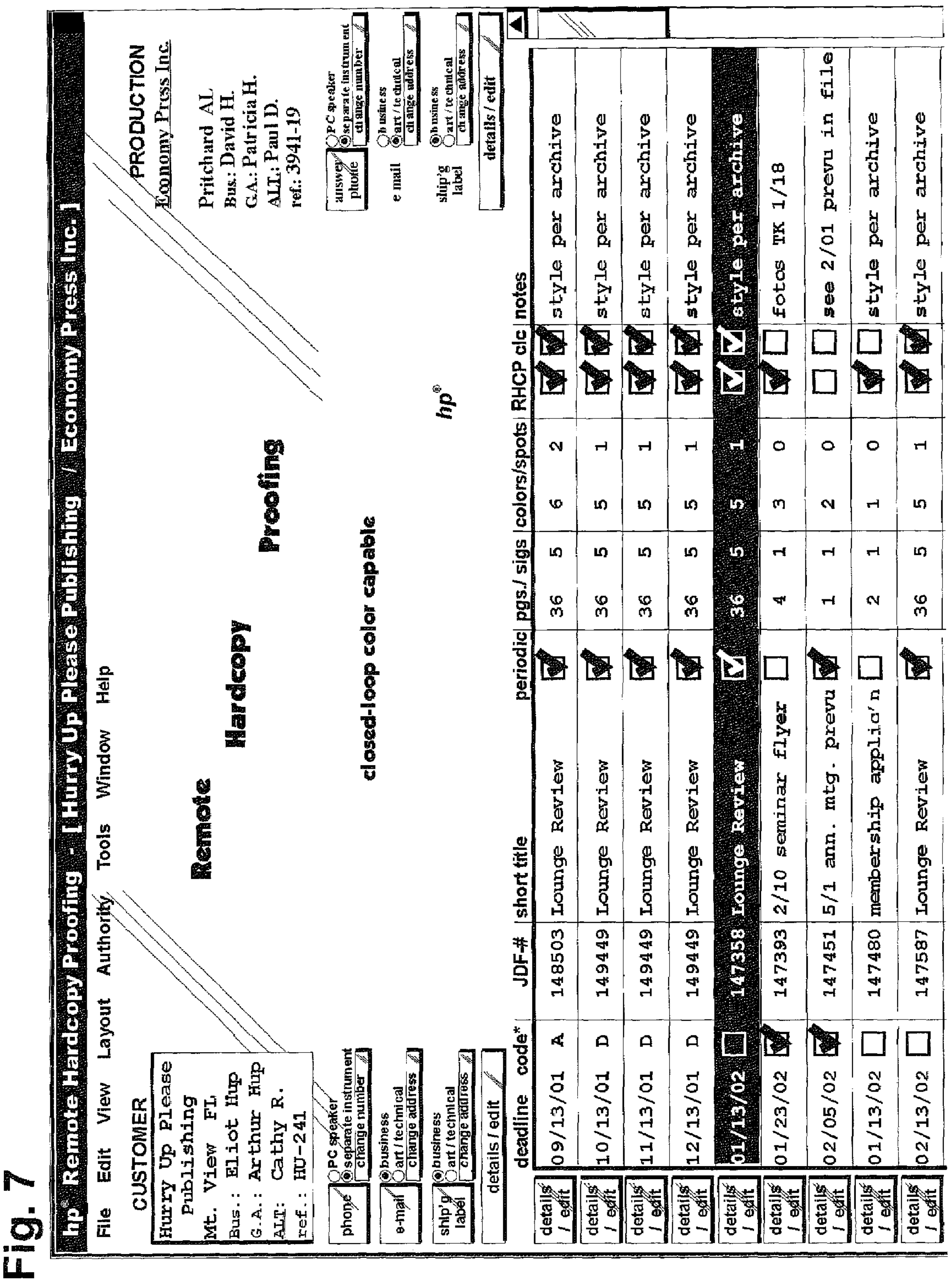
FIG. 7 is a screen like FIG. 2, but including inactive jobs.

If desired for comparative or other purposes, the operator at the shop may elect to display not only current, open projects but also earlier, now-closed jobs of the subject customer (FIG. 7). More commonly, to focus quickly on needed information for a task at hand, the operator elects to exclude those from the displayed list—when the operator's chore is simply to send a current proof to the customer. If preferred, the designers may also provide the operator yet another display alternative, namely that of listing closed jobs only (not shown).

Once the shop's operator has an entry on-screen for the project, the operator verifies that this entry includes the already prepared proofing file. Then the operator may click on an icon or button (advantageously in the "details/edit" screen, not shown) to transmit that file through (for the present example) the Internet—including necessary color characterizations based on the production printer and any custom inking etc. that will be used.

Figure 8:
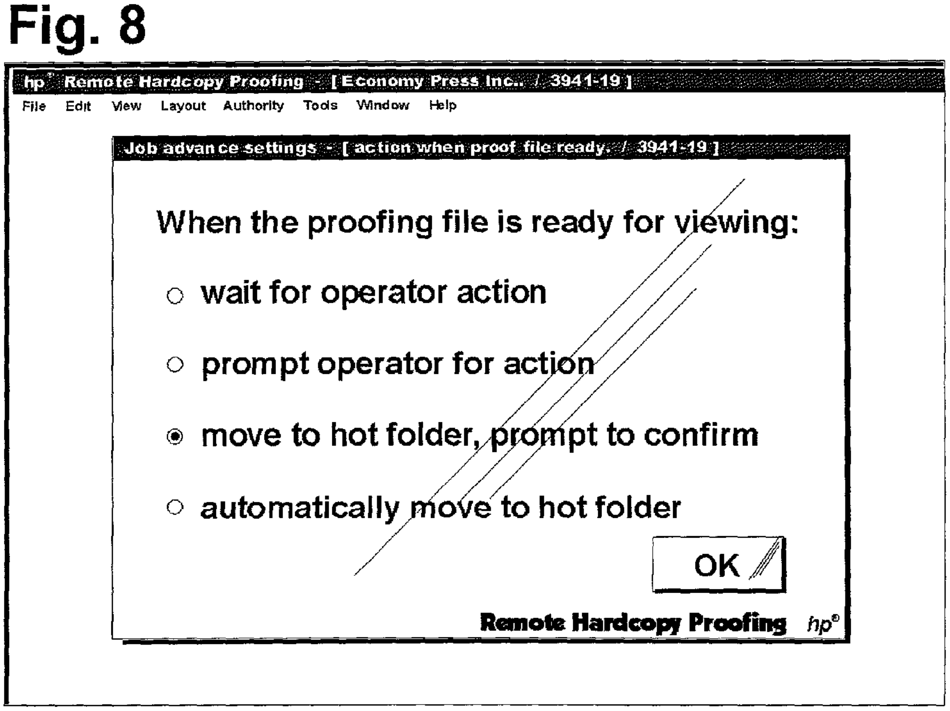
FIG. 8 is a GUI screen showing setup for semiautomatic progression of a job from proofing-file preparation to transmission, nominally using a hot folder.
Figure 9:
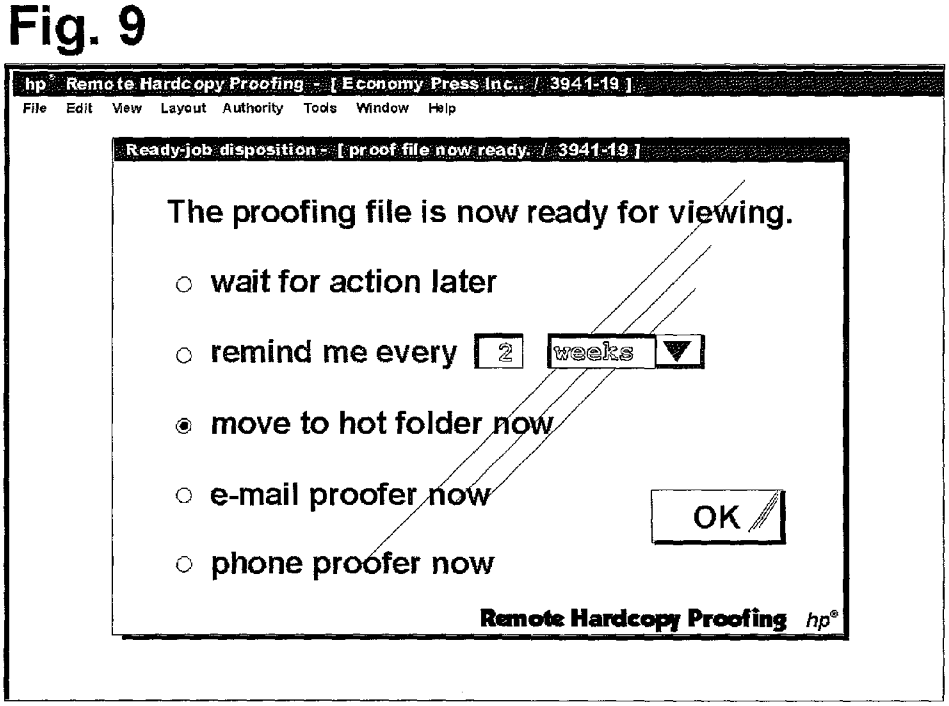
FIG. 9 is a GUI screen for an operator's use in manual movement of the file into a hot folder.
Figure 10:
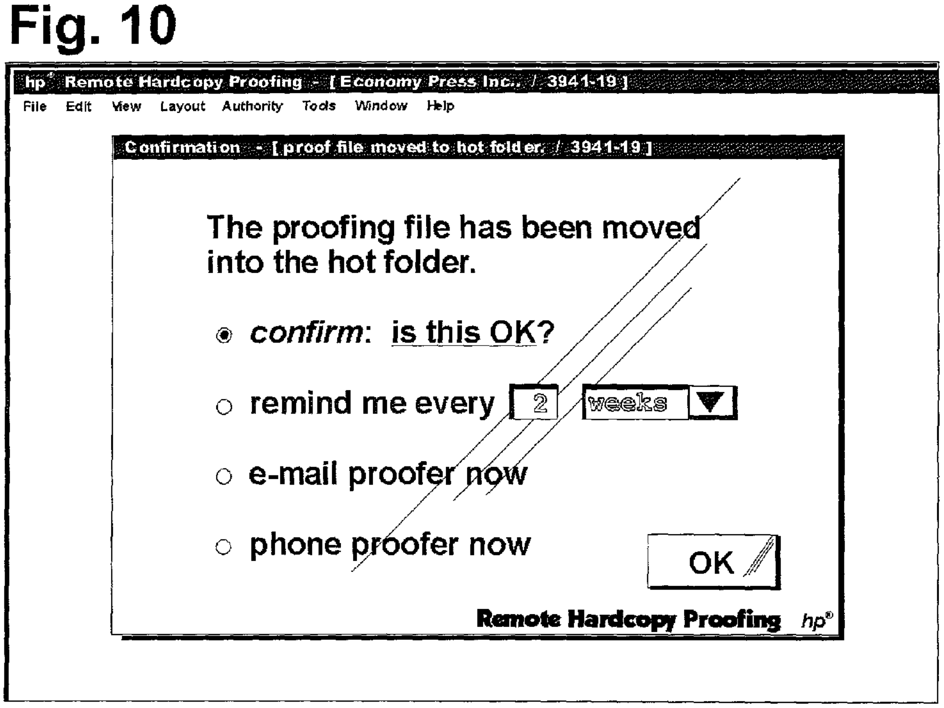
FIG. 10 is a screen like FIG. 9, but for the operator's use in only confirming automatic movement into the hot folder.

A related way for the proof to be expedited along its path is for the proof-generating equipment (FIG. 8), or operator (FIG. 9), to place the file in a so-called "hot folder"—a known phenomenon in the remote-proofing field, and in other related computer fields (e.g. FAXing software) as well. This can be an entirely automatic operation triggered by completion of the preceding step, or can be a drag-and-drop operation performed by the operator; or can be both of these, e.g. with an operator confirming (FIG. 10) the step initiated by completion of the previous equipment operation. (For this last-mentioned case if desired the system designers can include another choice, namely "Remove from hot folder"—with suitable new status commands on the same or a following screen.)

The system is programmed to monitor the hot folder and send whatever file is found in it. The transmission path is preset when the arrangements between the customer and printshop are established at the outset, with other parameters of the job.

At the customer's facility the file may be received automatically or on demand. Depending on the specific Internet access provisions (e.g. DSL line or 56 k modem) in use—and operating options or settings selected—at the customer's facility, the customer's RHCPS terminal (1) may simply acquire the proofing file, or (2) may acquire only a notification that the proofing file is available for downloading, or (3) may acquire nothing unless an operator of the customer's staff logs on to the RHCPS system, via the 'Net, and checks for incoming documents.

In some of these cases, if the customer patronizes more than one printing shop the customer's operator may be called upon to locate the job that corresponds to the incoming proof—a procedure analogous to that described above for the printshop operator in finding an entry in the system for the then-outgoing proof. If this step is required, the customer's operator eventually notes from the RHCPS interface a list of printing houses which that particular customer uses.

Figure 11:
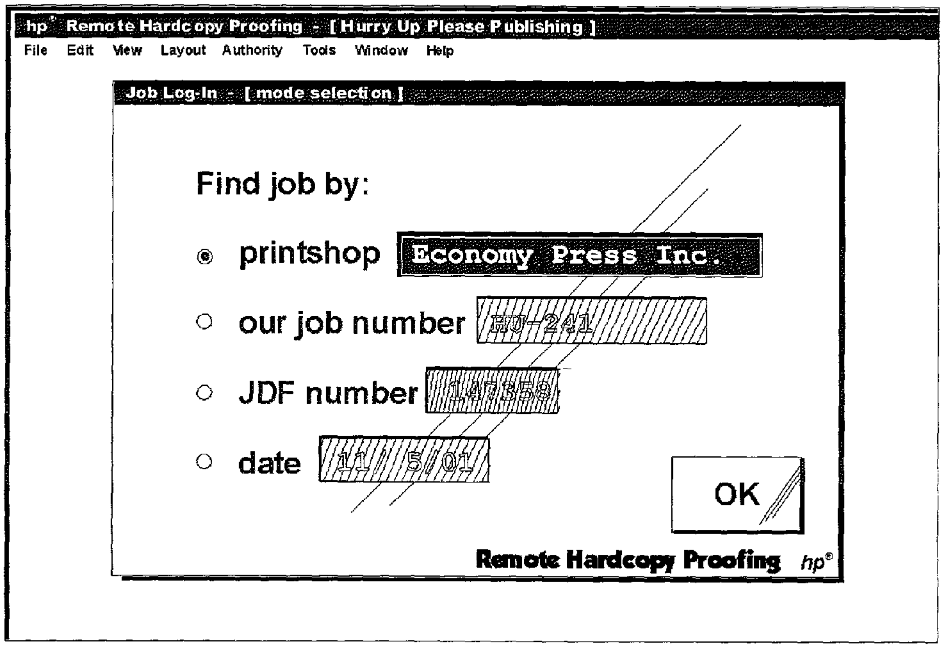
FIG. 11 is a picture like FIG. 3 for the same case but for use by the customer, at the customer's facility, rather than for use by the shop.

If the customer uses more than one printshop, then, in a procedure like that already pursued at the printshop, the customer selects or types-in the name of the shop (FIG. 11). As the RHCPS design variants at this point are directly analogous to those previously described at length for the printshop operator, pictures of the corresponding screen views that follow are omitted here.

If the customer uses only one printer then the system simply bypasses the printshop-selection step. In any event the RHCPS interface displays (FIG. 12) all the customer's jobs with the particular identified printing shop. (From this it will be understood that the customer's operator can log on to the system to see whether any proof file is waiting, even when no such file is waiting—and naturally will find that there is no proof to be printed just then.)

This operator selects, from the displayed list, a desired job that has a proofing file waiting—and by operations at the GUI (advantageously through the associated "details/edit" screen, not shown) queues that job to the proofing printer device. For fullest realization of the RHCPS objectives, that printer device is one of the model line which provides closed-loop color functions—particularly including the ability to print, read and interpret a color-calibration test pattern.

Alternatively the proofing printer device too may operate on a hot-folder principle. In this case any proofing file that is downloaded, even automatically, from an authorized entity—as in this exemplary case the printing house—proceeds to the printer device, preferably, or at least to the printer-device queue.

The printer device may also have the capability to scan and interpret color data for particular selected regions of the image area within an actual proof to be printed, as distinguished from a calibration pattern. These two kinds of information have their own respective advantages for various kinds of printing jobs and situations.

A key characteristic of preferred embodiments of the RHCPS is that the proofing printer device automatically transmits back to the printshop, in a different location from the printer device—i.e. not only provides to the proofing operator at the customer's own facility—a report of the pseudocolorimetry operations just described. Thus all parties to the core technical transaction which constitutes "showing proof" can satisfy themselves that what the customer is seeing is truly representative of what the final product (not yet produced) will be—or, in the alternative, can know for themselves in just what ways the proof appearance diverges from a truly representative image.

If the customer finds that what the proof shows is not acceptable—in particular in terms of color—then the customer may simply send back a notification to that effect, through the RHCPS user interface as before; or may instead, or in addition, communicate with the printshop by phone, e-mail etc. to help pinpoint the objection. The parties usually consult the closed-loop-color technical data to determine whether perhaps the problem may actually be only one of inaccuracy in rendering at the proof press.

If not, then the printshop usually tries to correct the color in the data file from which it intends to print; and iterates the proofing and review process until the customer is satisfied with the representation of the final product-to-be. Advantageously the operator initiates all of these detailed steps by using controls in one of the "edit/details" screens (not shown), where all of the relevant image technical data are assembled and directly seen—and where there is no question which image or which job is under consideration.

As before, the data in such screens are assembled by links into both participants' sites as well as the RHCPS database—particularly including the site that is remote from the user at each end of the proofing respectively. Preferred embodiments of the invention thus make the most of both the business and the technical aspects of linking from the RHCPS user interface into the vendor's site, and possibly the vendor's user interface. As will be seen, however, these interlinkings are particularly striking and beneficial for transactions involving one or more additional participants.

The foregoing chronology has been made rather complete as to not only the contribution of the GUI to the communication process but also several details of the interaction between the customer and the shop—so that it can be seen clearly how the GUI fits into or in some ways simulates parts of the classical interaction between these parties. This level of detail has been presented here because this example is perhaps the simplest commercial situation which the RHCPS implements. Many of these details are the same in the more-complex commercial situations described below, and so will be omitted from descriptions of those situations, which now follow.

(b) Primary customer via a proofing ASP, to the printshop—This case encompasses several variants or subcases. The customer may use the proofing ASP for only some jobs, or for all; the customer may use only one such ASP exclusively—or may use one for certain jobs and one or more other such ASPs for other jobs.

The customer may use the ASP to make all the arrangements with a printshop; or instead may use the ASP only for soft proofing and nothing else. Still again, the customer may use the service ASP as an intermediary to the RHCPS, for all the functions of the RHCPS. (Although a customer in purest principle needs no intermediary to the RHCPS, this last option may be beneficial to a customer that is not adept in the workings of the printing industry and seeks a more-gentle buffer to the production people.)

The customer may use other types of ASPs for some projects, or for all; or may never use other types of ASPs. The customer may either use or elect not to use traditional outside consultants or service entities such as graphic artists, advertising agencies, and couriers.

To consider fully and separately each of the possible combinations of these several arrangements would be bewildering, and also unnecessary as the basic principles are straightforwardly extended from a description of just one or two ASPs. Therefore, with the basic operation in mind as described in subsection (a) above, only the more-significant departures from that basic operation are noted here.

The user interface established by the RHCPS has a link to that established by the proofing ASP—and thereby to data on the ASP's site (i.e. computer or computers). There may be a semantic question whether the link is to (1) the ASP's interface, or (2) the ASP's site, or (3) the ASP's computer system. To avoid debates over any such question, for purposes of this document those three concepts shall be considered synonymous.

In preferred embodiments of the invention the link is not merely a common hyperlink that leads (when "clicked") to the ASP's site, but rather is a graphical modification of the RHCPS interface itself, which selectively incorporates certain data, and graphical elements if desired, and related functions of the ASP into operation of the remote hardcopy service's GUI.

The first manifestation of expanded participation when an ASP is involved appears when the printshop's or customer's operator wishes to locate data for a job at hand. Once again it is necessary to begin by deciding how to search—and now there is another option not encountered before, namely to search by proofing ASP (rather than by customer, job number etc.).

Behind this option is a difference in the character and number of links from the RHCPS site to sites of the customer, printing house, and ASP. In accordance with preferred embodiments of the invention, links to an ASP are now incorporated where before only the RHCPS, customer and printshop were interlinked.

Figure 13C:
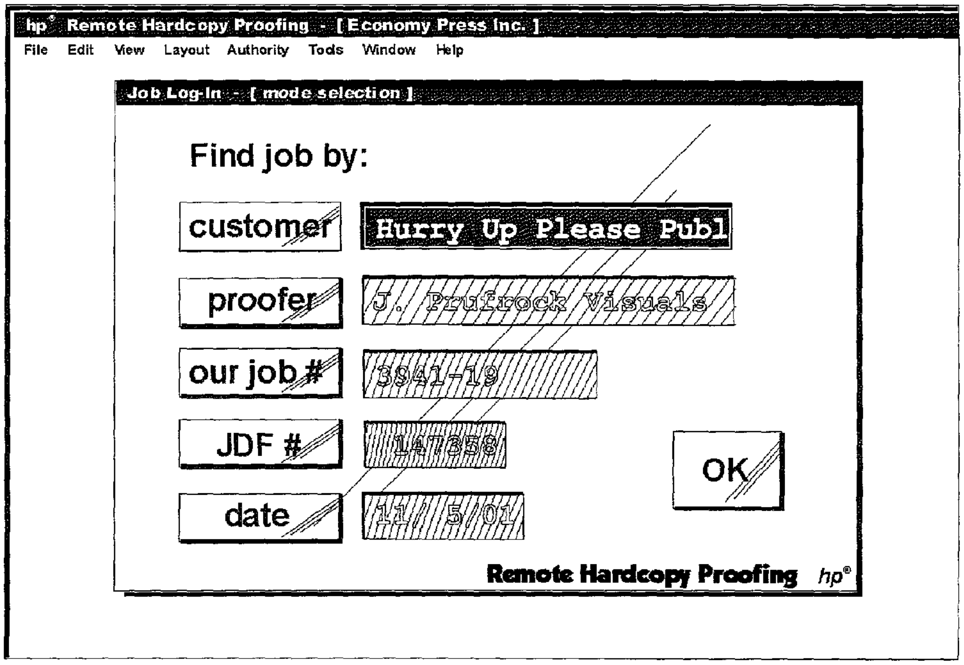
Figure 14A:
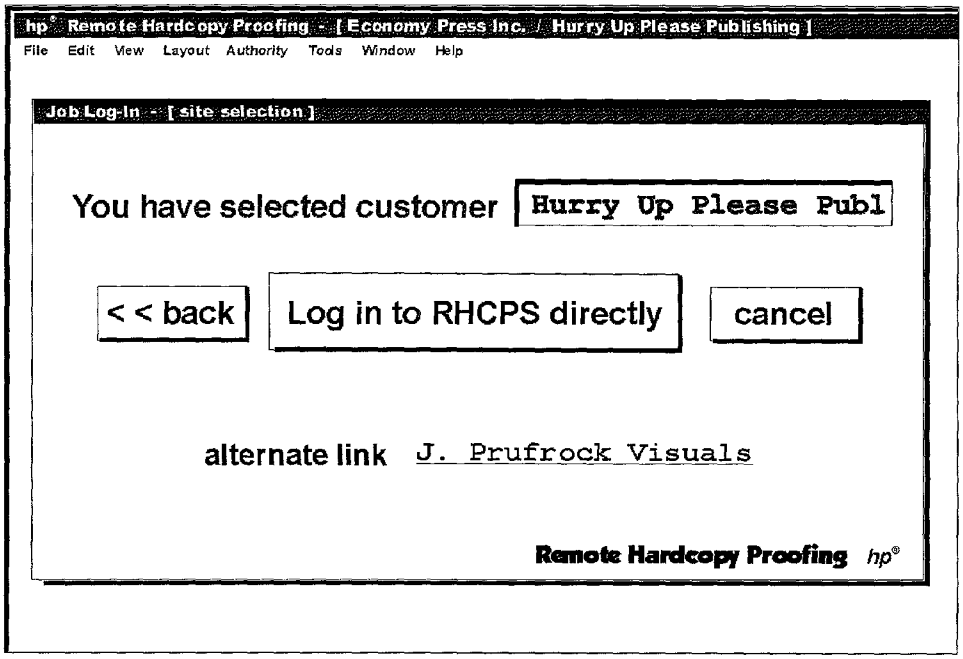
FIG. 14 is a set of four examples of a screen that may follow after job selection, i.e. once it is known whether an ASP is involved in the particular job selected—the operator can connect into the system through the ASP (rather than directly) if preferred, and this can be indicated by clicking, as in the "A" view, on a minimal kind of link (an ordinary URL-style hyperlink) from the printshop to the ASP site; or as in the "B" view, using an intermediate level of link (displaying the choices within data fields); or as in the "C" view, using a still higher level of link (displaying the log-in choices as an integral part of the GUI itself—with radio buttons or check-boxes); or as in the "D" view, showing another exemplary link form that is more highly preferred, a maximal level of link integration (displaying the log-in choices as an even more structurally integrated part of the GUI—with labeled click-buttons)
Figure 14B:
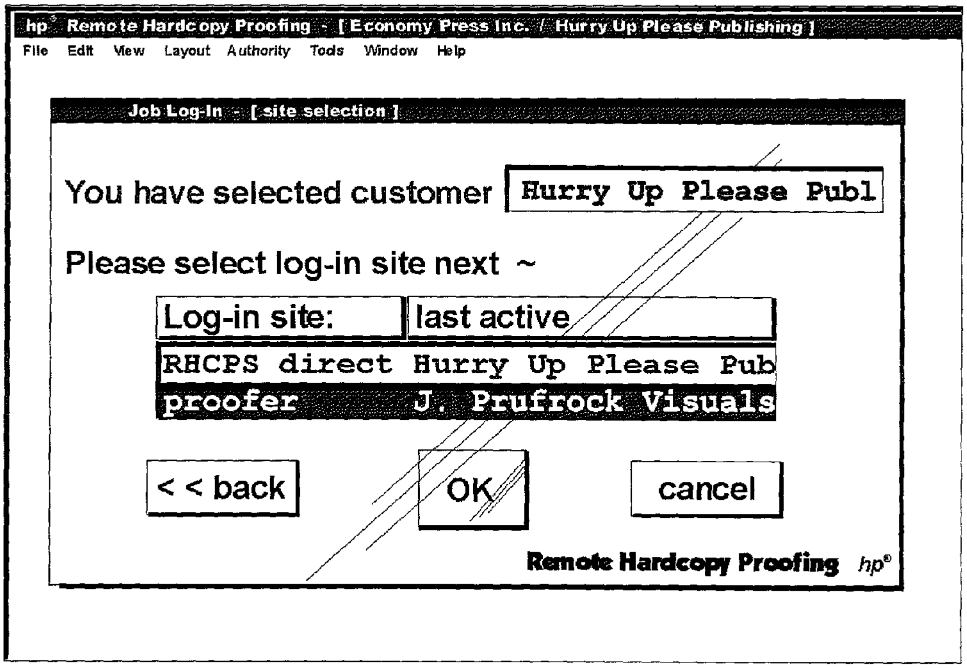
Figure 14C:
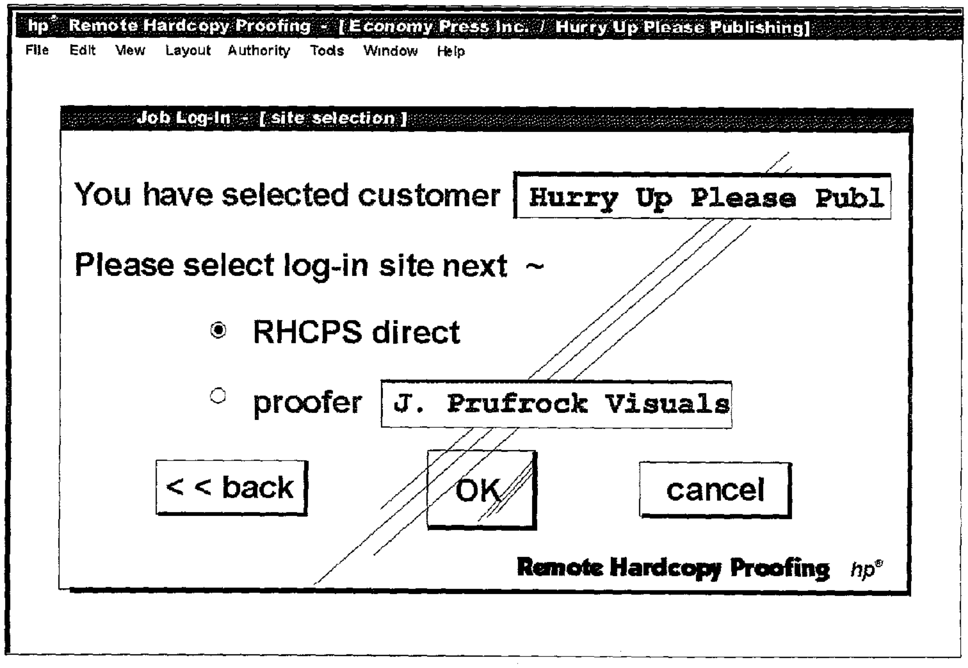
Figure 14D:
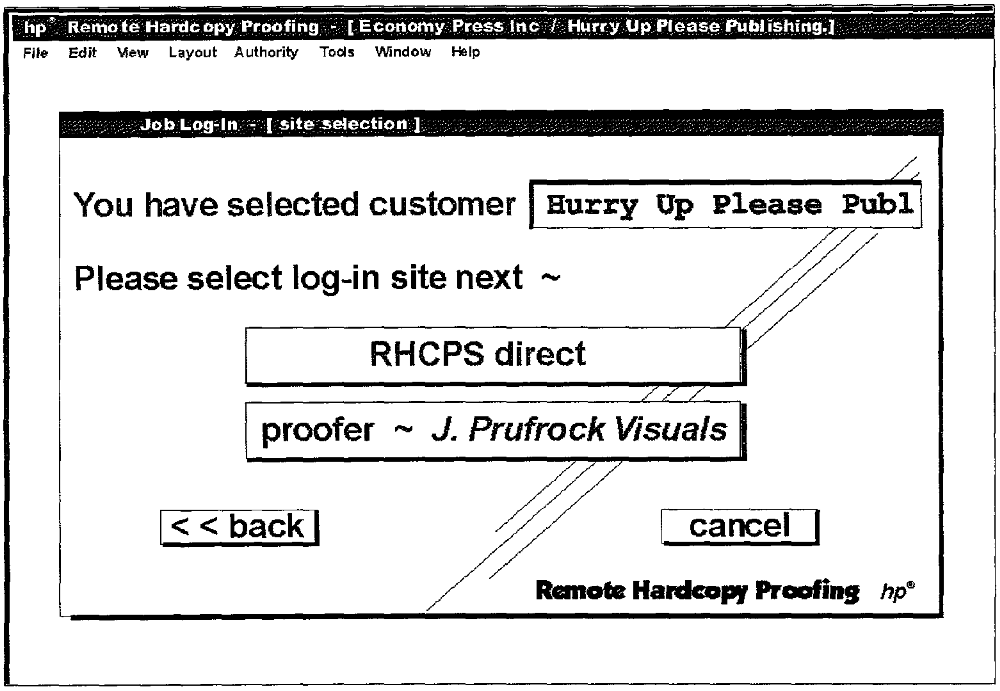
Figure 15:
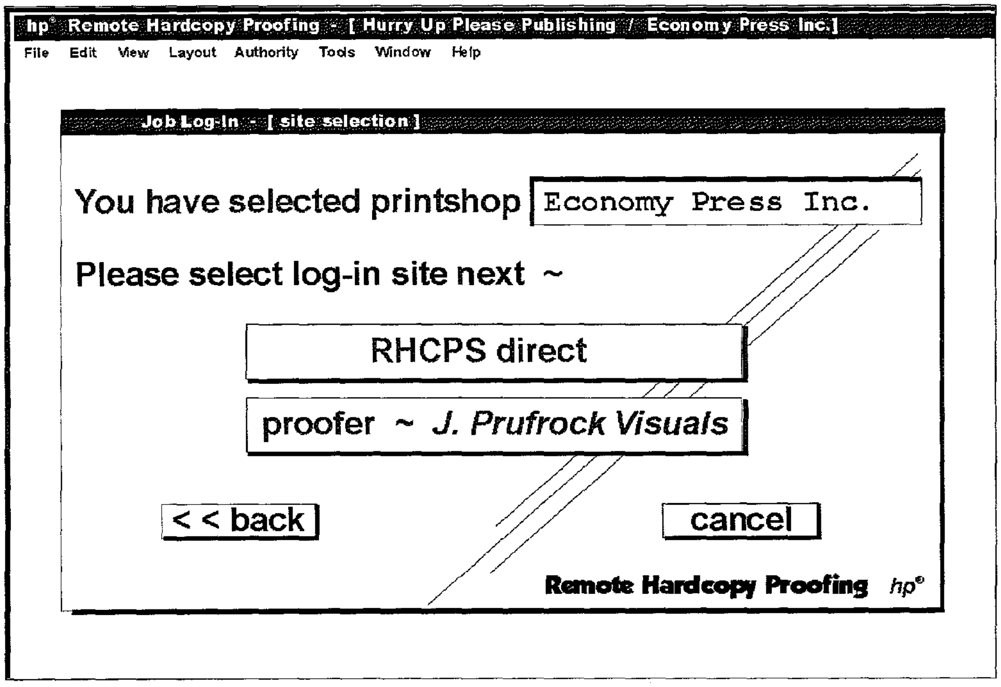
FIG. 15 is a picture like FIG. 14D, but for the GUI seen by the primary customer rather than operators at the printing house.

The degree of apparent integration into the structure of the GUI is advantageously chosen by the system designers. The selection of job-search mode may give the different modes the appearance of data, presented in data windows (FIG. 13A); or the appearance of a part of the virtual control panel flat labeling, selected by marking within radio buttons (FIG. 13B); or the appearance of a part of the virtual controls, selected by clicking virtual raised pushbuttons (FIG. 13C). Similar and other choices are made with regard to the degree of integration suggested in screens (FIGS. 14A through 15) for selecting customer, printshop or ASP, after mode selection is complete.

It will be understood that in reality all of these modes are equally structural—namely, not structural at all but only a matter of different graphics. The different graphics styles nevertheless are important in that they convey to operators of the system some conceptualization of the business relationships among the RHCPS operator, the ASP and even the customer.

Where an ordinary Worldwide-Web URL notation is used for a link (FIG. 14A), most Web-wise users will receive a connotation of little or no proprietary connection between parties. It suggests little more than a courtesy referral. A data-window presentation (FIG. 14B) may instead possibly suggest that the parties' relationship is in the nature of arm's-length service by the RHCPS to the other participants:

the RHCPS recognizes the parties but treats their data, their identities, and even their functions as essentially fungible.

A radio-button or check-box presentation (FIG. 14C), with the parties' identities and even their types (e.g. "proofer") appearing as part of flat-panel labeling, probably connotes strongly to many GUI users that the parties have at least some sort of mutual cooperative agreement. Presenting the identities or even their types at the faces of virtual raised pushbuttons (FIGS. 14D and 15) can suggest to observant users that the parties may be engaged in a copartnering or coventuring form of enterprise.

Thus—now extending the customer/printshop example of subsection (a) above—when either the customer's or the printshop's operator brings up the opposite party's listing of transactions, a reference to the service ASP may appear in addition (FIGS. 16 through 17A), or instead. The specific situations, and the specific ways, in which this interception of transactions by the ASP, or interjection of the ASP into the printshop/customer workflow, depends intimately upon the specifics of the relationship between the customer and ASP.

For example if the ASP is handling all proofing details for the client, then when the printshop's proofing file is ready—and the shop personnel log onto the RHCPS to transmit the file—what will be displayed may at first be an identification not of the primary customer but rather of the service ASP. In the same transaction some functions unrelated to proofing as such may instead bypass the ASP and go directly to the primary, provided that the customer or ASP has set up the account that way for the particular job. In that case, if the printshop attempts to brings up the ASP to arrange e.g. delivery, then the GUI can reroute the shop staff to the customer directly.

Figure 16:
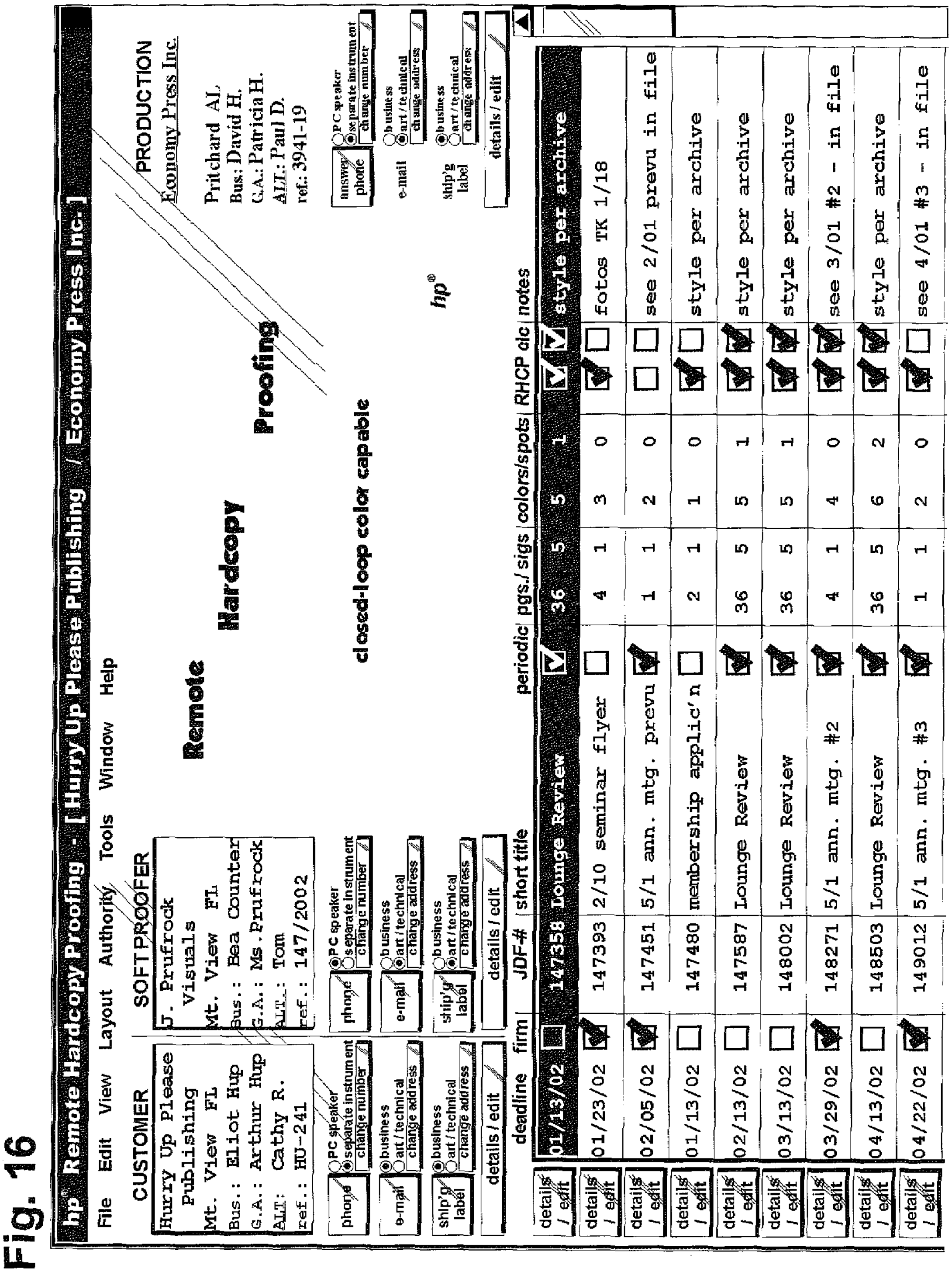
FIG. 16 is a picture like FIG. 2—which is to say, for use by an operator at the production house—but for the FIGS. 13 and 14 case of a proofing ASP included in the parties, together with the customer and printing shop.

Examples of these sorts of shielding or diversion of contacts will be presented shortly in connection with broker-ASP arrangements. As to the proofing ASP under discussion here, however, no such guarded presentation appears. Thus FIG. 16 shows to the printshop operator, in an evenhanded way, all the information needed to contact the primary or the ASP.

This interface leaves it to an operator's preknowledge of the participants, or otherwise to that operator's experience, intelligence and best instincts, to select the appropriate party for each kind of contact. Such selection may be e.g. technical people for technical questions, business people for business questions, proofer for matters relating to proofing, and so forth.

Figure 17:
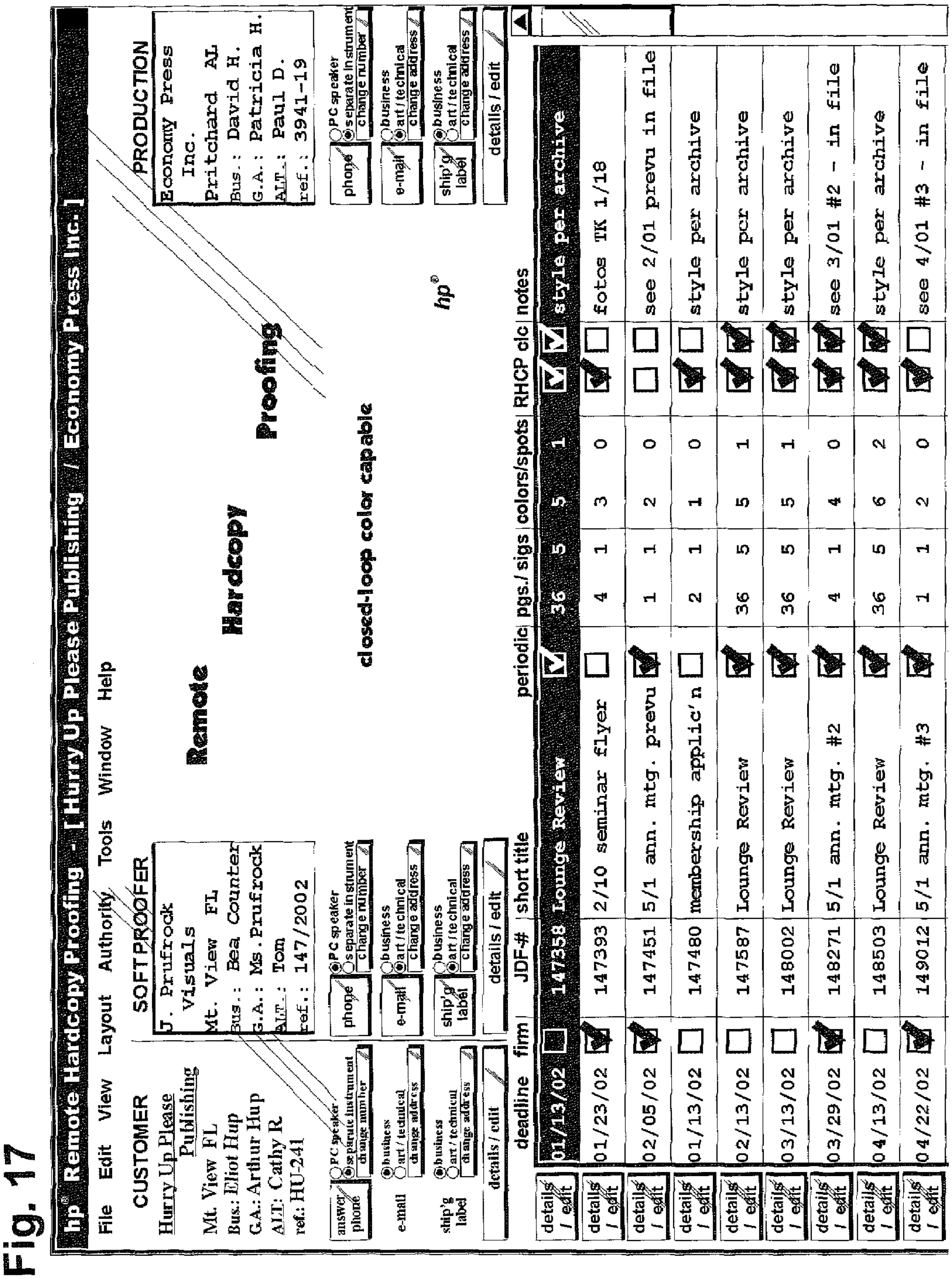
FIG. 17 is a GUI data-display picture like FIG. 16, but for use by the customer rather than the printshop.
Figure 17A:
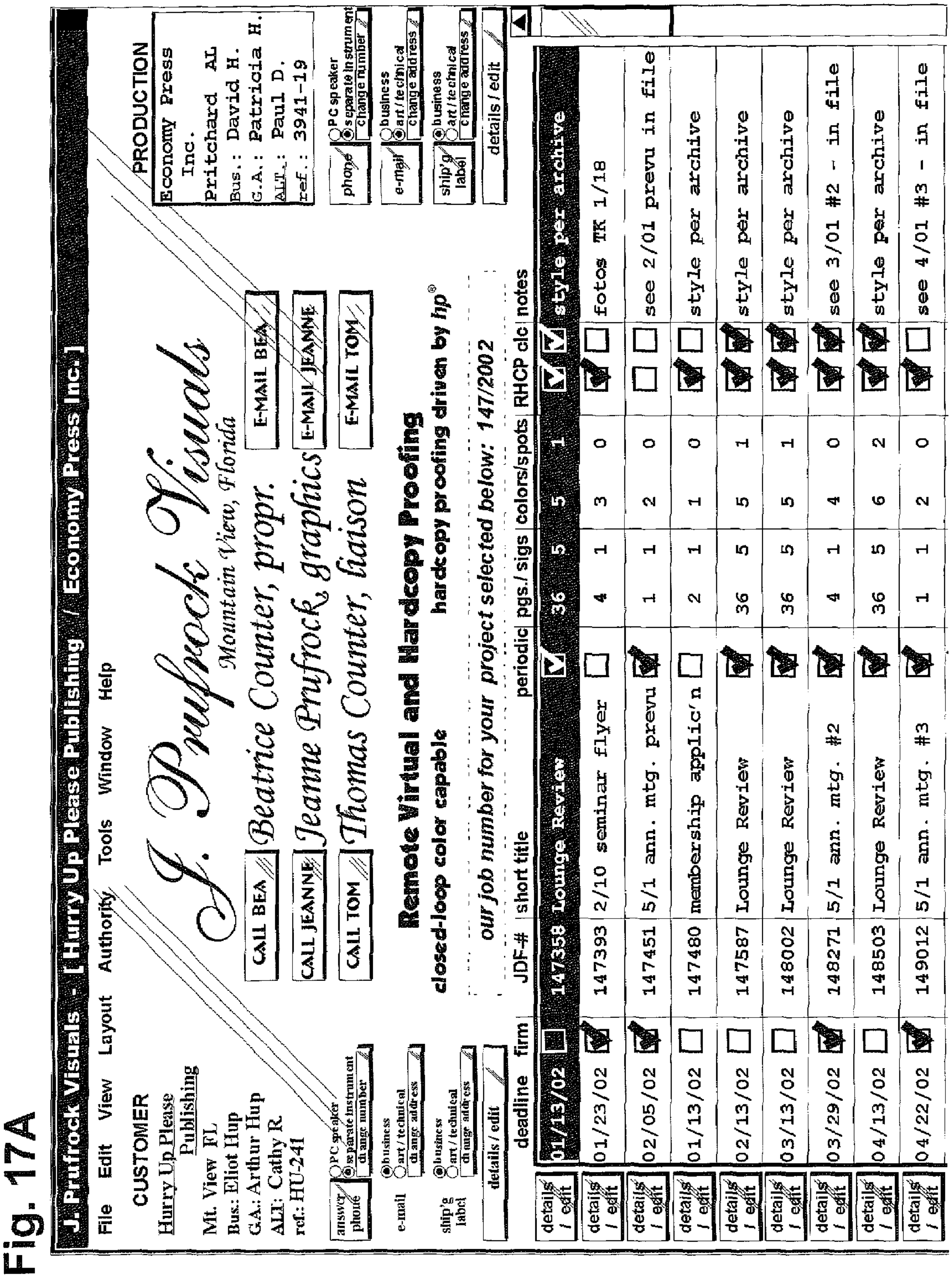
FIG. 17A is an alternative to FIG. 17, a display that may be provided if one of the vendors—here the proofing ASP—has been principally responsible for RHCPS arrangements with the primary customer and wishes to link the customer to that vendor's own GUI rather than the standard RHCPS interface (the vendor's interface in the example being a hybrid with the standard RHCPS interface)

FIG. 17 conversely shows the customer all the information all that is needed to contact the printshop or the proofer. An interesting example of a hybrid setup appears in the alternative form of FIG. 17A: here the RHCPS has linked the customer through to the proofer's site including custom graphics that encourage the primary to contact the proofer rather than the printing house—but do not actively constrain the primary to do so. The data portions of the interface are strictly drawn from the standard RHCPS setup.

For showing proof, the GUI as seen at the printshop too may lead the shop staff to transmit to the proofing ASP—whether the particular proof is to be a soft/virtual proof for viewing on-screen, or a hardcopy proof. (Here, however, the ASP has perhaps wisely chosen not to approach the shop operator with a conspicuously marketing-oriented style, rather hewing to a just-business-between-tradesmen sort of presentation.) The proofing ASP, most commonly close to the primary customer geographically, is then responsible for contacting the customer to arrange for actual viewing of the proof.

In the hardcopy case, that contact generally entails arranging a physical movement of printed document to customer, or of the customer to the ASP's facility. The ASP operators can take the opportunity to check the proof themselves, preliminarily, if they in fact see part of their function as providing the "buffer" suggested earlier.

In this case the ASP may choose to advise the primary how best to deal with irregularities in the proof—what the options and associated cost/benefit relationships are, etc. Alternatively the ASP may instead undertake, on its own responsibility, to reject or even to accept the proof, if that reasonably appears to be within the scope of the understanding between primary and ASP.

(Such understanding is probably best reduced to writing, but such writing may be conveyed and approved through the same electronic systems as other portions of the communications. In any event, such contractual specifics are outside the scope of this document.)

Figure 18:
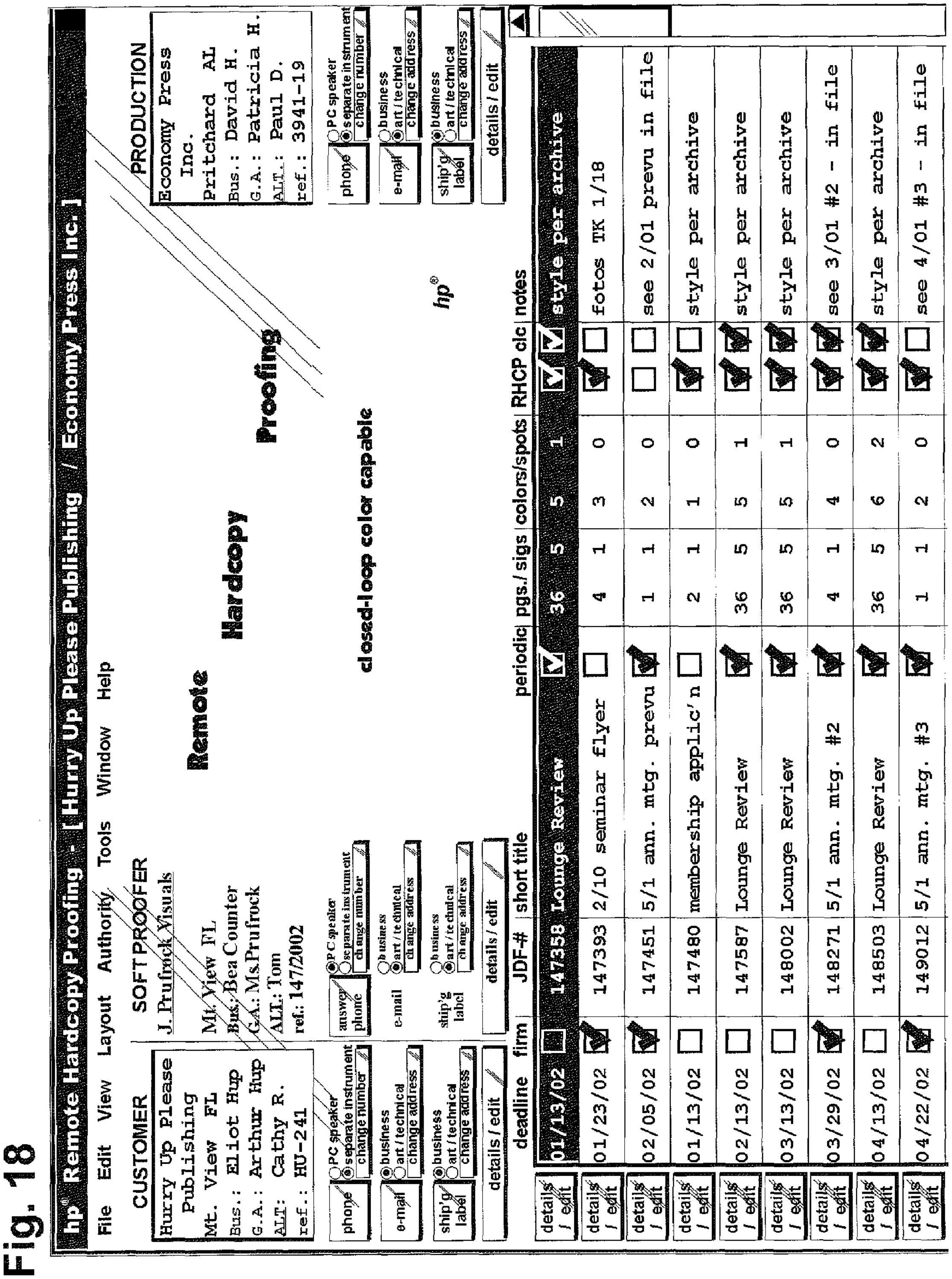
FIG. 18 is a GUI data-display picture like FIGS. 16 and 17 but for use by the proofing ASP rather than the customer or shop.
Figure 19:
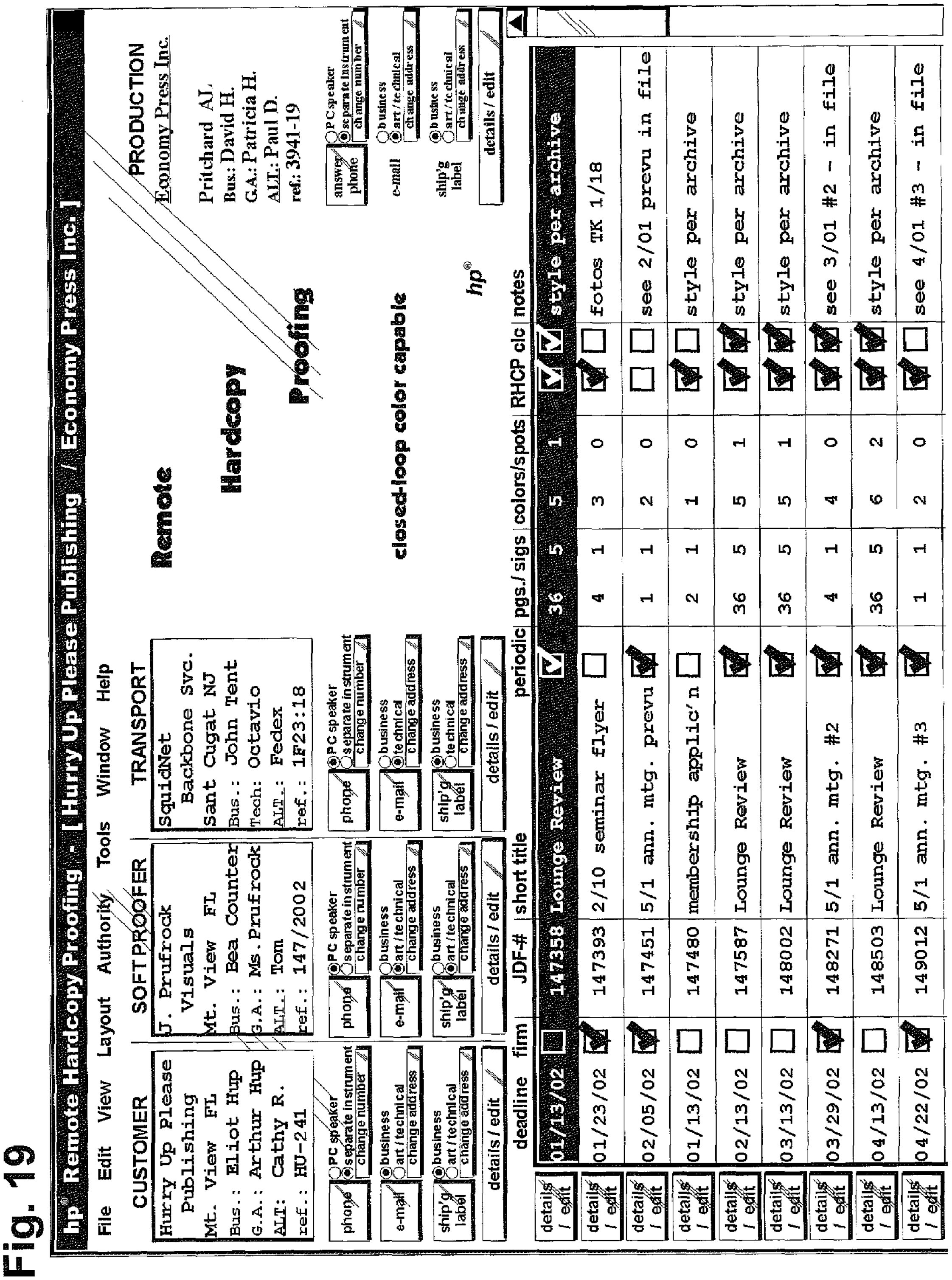
FIG. 19 is a picture like FIGS. 2 and 16 (i.e., once again for use by an operator at the printing house), but for the case of a private-network ASP added to at least the first two of the three parties assumed in FIG. 16.
Figure 20:
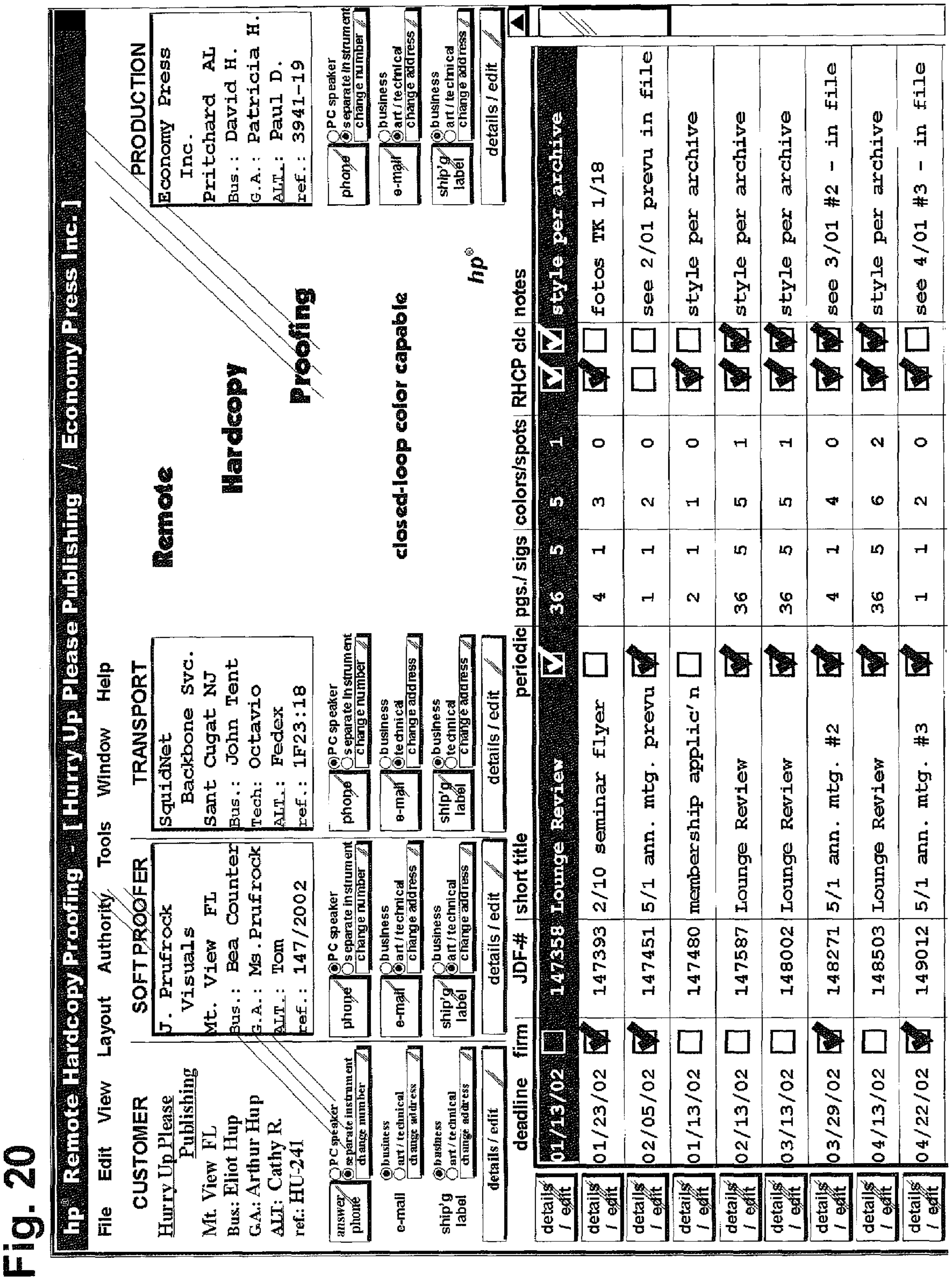
FIG. 20 is a picture like FIG. 19, but once again for the customer.
Figure 21:
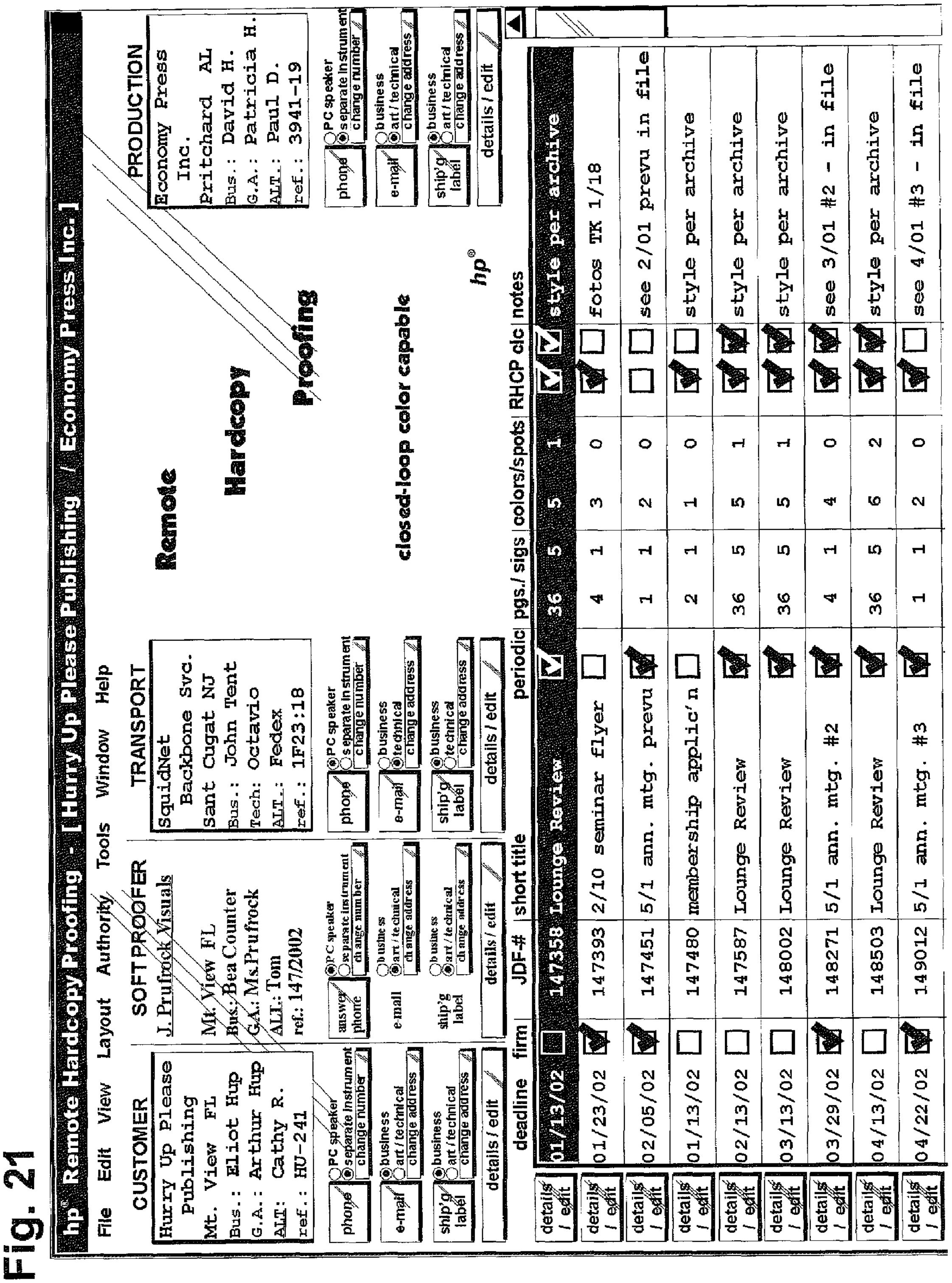
FIG. 21 is a picture like FIGS. 19 and 20, but again for the proofing ASP if participating.
Figure 22:
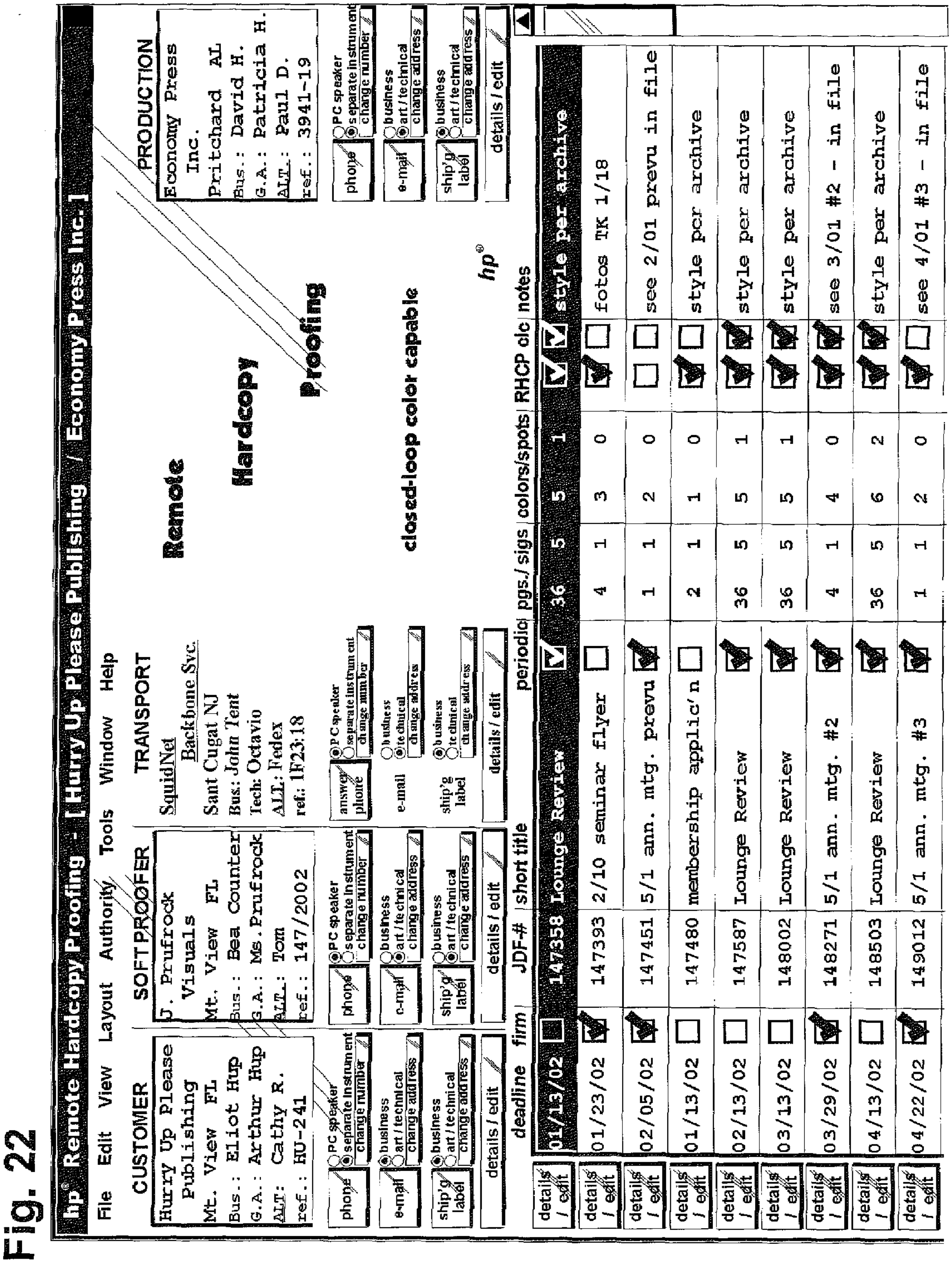
FIG. 22 is a picture like FIGS. 19 through 21, but now for the network ASP.
Figure 23:
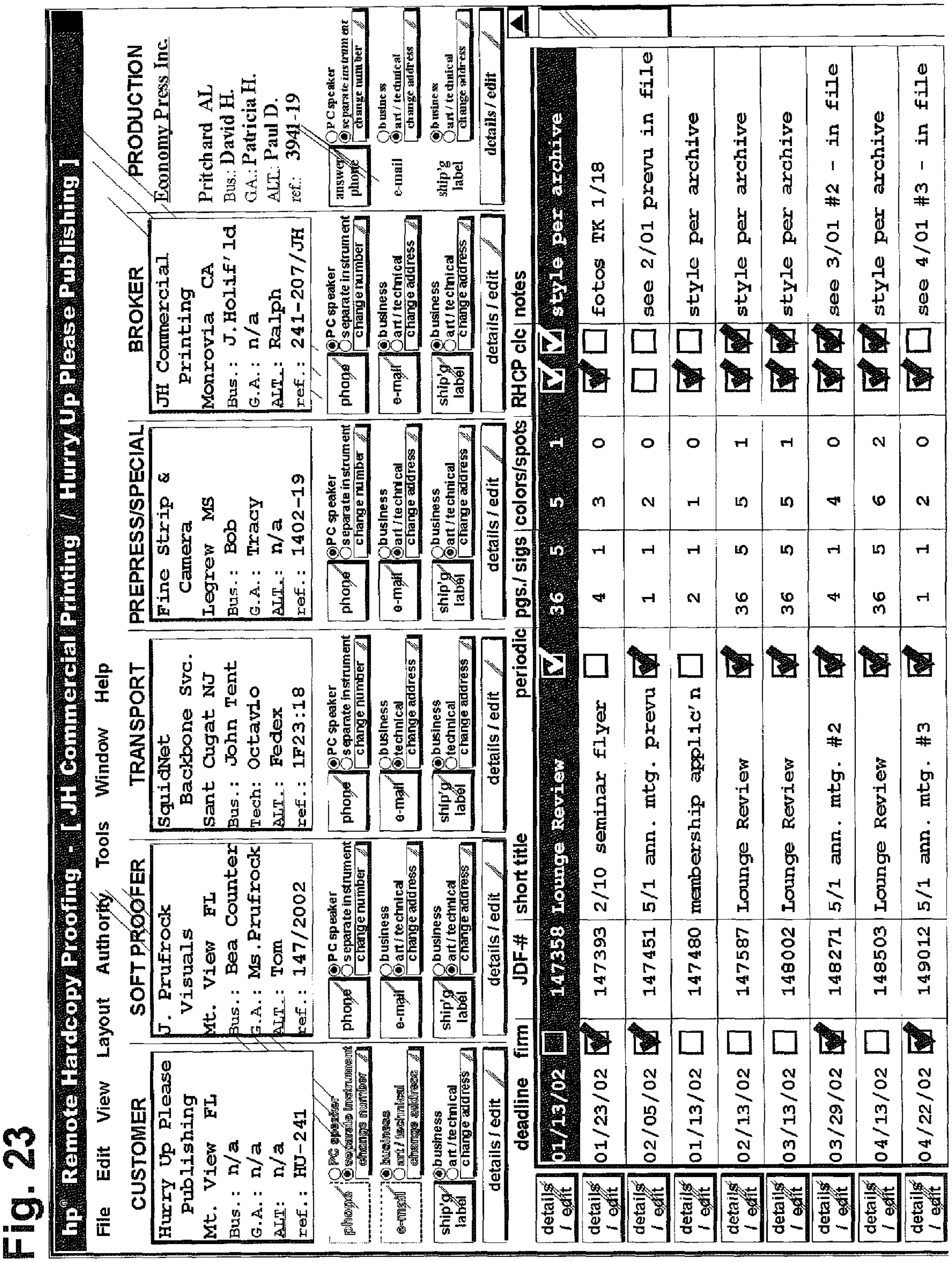
FIG. 23 is a picture like FIG. 19 (i.e. for use at the printshop), but for the case of a middleman or transaction ASP added to at least the first two of the parties assumed in FIG. 19—and also incorporating yet another party such as an outside prepress house, supplementing the efforts of the final offset shop (any other type of specialty service may be substituted where there is room in the GUI, or by adding a horizontal scroll bar for further participants)
Figure 24:
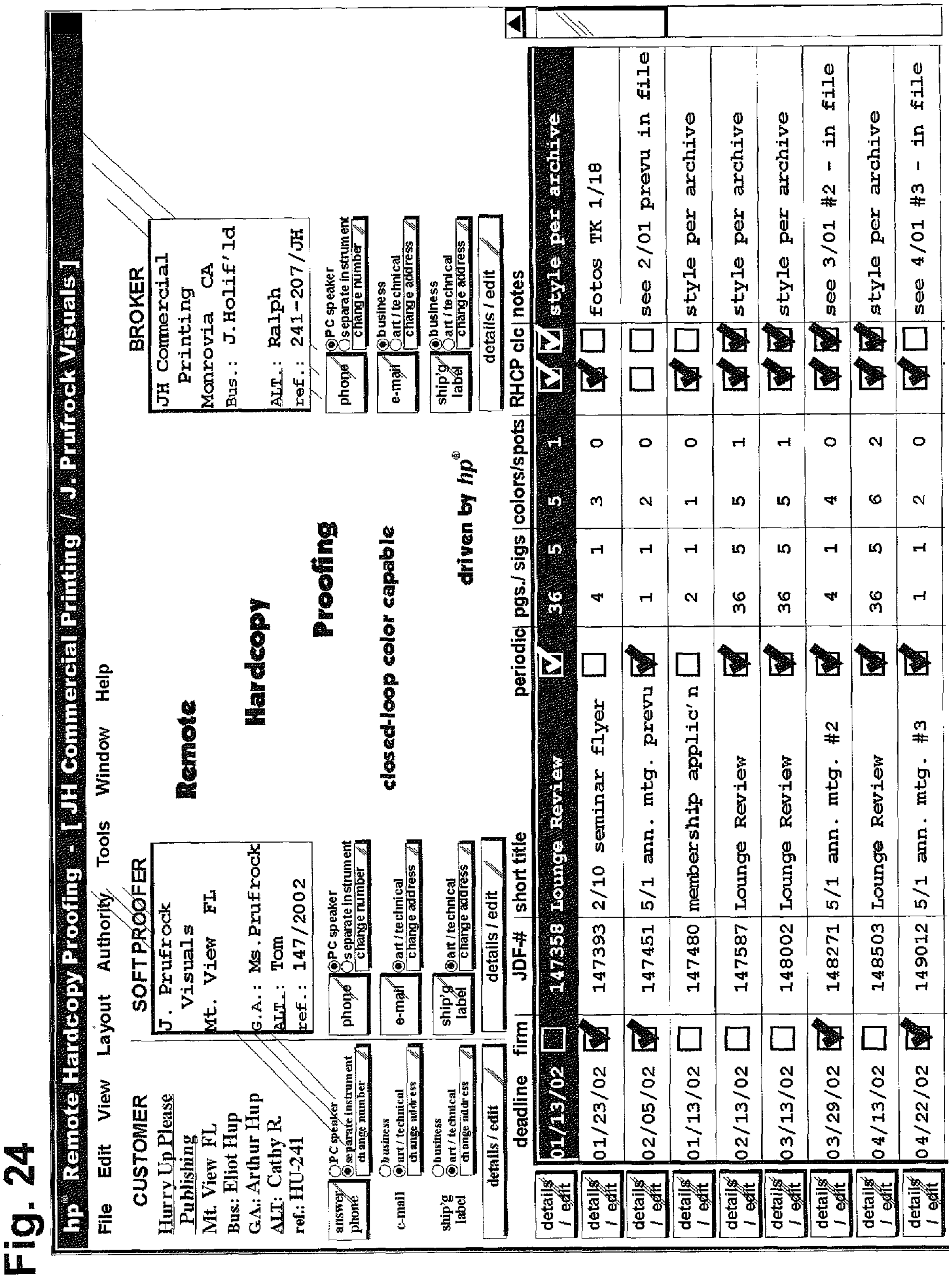
FIG. 24 is a picture like FIG. 23, but for use by the customer rather than the printing house.
Figure 26:
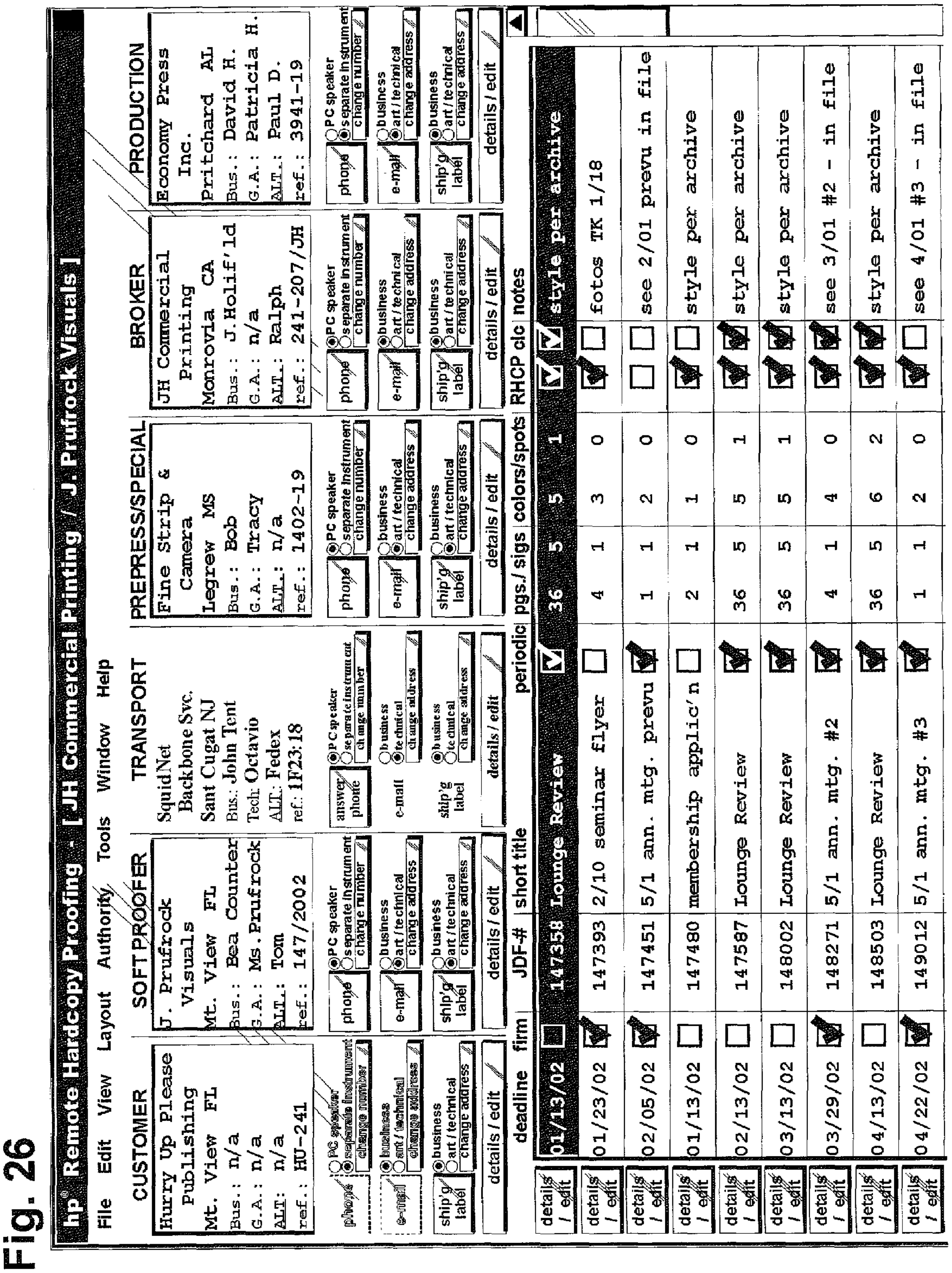
FIG. 26 is a picture like FIGS. 23 through 25, but for use by the network ASP if participating.

FIG. 18, the view as seen by the proofer's operator, reverts to fully standardized form. These four views thus represent a relatively low-key, open and trusting set of relationships, and this is one very popular business style in the trade.

As these views suggest, if the ASP elects to use the RHCPS service for part of its communications with the primary customer, then the primary can either be set up to see the RHCPS interface or—if one exists—the ASP's own interface. If the arrangement is the former, i.e. if the customer is to see the RHCPS interface, then in effect the ASP and the customer are operating in parallel; they both see some of the same lists and data from the RHCPS.

On the RHCPS interface as seen on the customer's computer, however, what appears is the ASP in addition to the printshop—or instead of the printshop—again depending upon the arrangements made. In either event, the customer will see only its own jobs, not other customers' jobs, with the ASP and/or the printshop.

What appears on the ASP's computer (FIG. 18) in this case is either (1) the customer and the customer's jobs, if the ASP operator elects to call them up that way, or (2) the printshop and the customer's jobs, if the ASP operator elects that approach. The same group of jobs is displayed in either event, provided that the ASP in fact elects to see that customer's jobs (as distinguished from checking on all its jobs with the same printshop).

If instead the customer is set up to see the ASP's user interface rather than the RHCPS's, then in preferred embodiments of the invention the customer will see its same jobs at the printshop—but only those being handled by this particular ASP. Those data are passed through by the ASP's interface to the customer, but not necessarily with identification of the printshop.

The latter issue is determined by the setup of the ASP's own interface, which in turn is configured based upon the ASP's preferred way of doing business. Some will operate on the philosophy that openness is an ideal basis for dealing with customers; others on the philosophy that the customer will sooner or later decide to eliminate the middleman and should not be tempted.

Thus as noted earlier the RHCPS workflow-management component of the present invention accommodates many different business and interpersonal styles, and in many ways encourages divergent healthy forms of competition. What it does not do, in the example under discussion, is either force the ASP to be open when there is concern that this will lead to loss of business; or conversely force the ASP to be guarded when the ASP's philosophy is open—or when there is concern that, for instance, the customer will eventually perceive the guardedness and change vendors as a result.

The workflow-management protocol is extremely flexible and versatile. In particular the ASP is at liberty to follow the guarded philosophy with one customer—as for instance a customer who is regarded as volatile, or overly price conscious—but simultaneously to follow the open philosophy with another customer, as for instance one who seems inclined toward vendor loyalty, or toward interpersonal criteria in selecting or maintaining vendors, or perhaps simply one who is too sophisticated to be kept in the dark. The RHCPS interface options are set up as a tool whereby the ASP can implement its own philosophies as convolved with its assessment of individual customers.

Although the array of these several variants may seem complex in discussion, as will be understood indication of the selections is very straightforward in terms of user-interface options. Once so entered, the RHCPS system continues to implement the agreed-upon arrangements unless and until others are substituted.

(c) Primary customer via a network ASP to the proof ASP or printshop, or both—The variants of this case, in comparison with those taken up in the preceding section, represent both a different function and another level of complexity. Functional contributions of a network or "transport" ASP to completion of projects that entail remote proofing is qualitatively different from those of the proofing ASP considered in subsection (b) above; yet as will be seen the RHCPS workflow-management component readily accommodates the transport function as well as the proofing function.

As to complexity, the involvement of a network/transport ASP is not necessarily simply a substitute for the proofing ASP arrangements discussed above, but can instead be an overlay on the several variants of the proofing ASP. In other words, the commercial relationships are not limited to being linear or three cornered at most, but can involve four and five parties to the same transaction.

In fact the feasibility of using so many different specializing enterprises for the same job is strongly and distinctly enhanced, not obstructed, by preferred embodiments of the present invention. The workflow-managing module helps greatly in keeping all the participants in step, informed, and ready to make their contributions at the right times without tripping over one another—as they might if all the arrangements had to be made by, for instance, FAXes and telephone calls.

First as to the different function, again positing the basic situation of a printshop that has a proofing file ready for transmission, suppose first that there is a network ASP involved but no proofing ASP. The printshop then seeks to provide the file to the primary customer.

The network ASP may be engaged either by the printshop or by the customer. Furthermore, if it is the shop that elects to use the private network it may do so either for all customers or for just the particular customer in question—or even for just certain jobs, or certain jobs of that customer.

Conversely if it is the customer's election to use a network ASP, that may be for all printing work, or only for jobs with the particular printshop, or only for just certain jobs, or certain jobs with that printshop. In any event, when the printing-house operator is ready to send the proof to the customer, as with the proofing ASP the operator can log onto the RHCPS interface and locate the job either by customer or by ASP (in this case, probably the ASP whose function is involved, namely the network provider).

Also if preferred, the operator can identify the job by searching with some internal indicator (job ticket number, for instance) which the operator happens to know—just as in the linear or two-party case. Here as before, once the operator has called up the job on the remote-proofing interface the correct contact is invoked inherently by those same keystrokes. (Other options mentioned earlier, including a hot folder, are equally applicable here.)

The system, in other words, is ordinarily preconfigured, when the job is first set up, to transmit in some particular way specified at the outset as between the customer and the shop. Thus if a network ASP is to be used, then when the operator instructs the system to proceed with the transmission it is most commonly ready to do so by routing the file through that designated network. Most typically the necessary connections for the transmission are preset for that network.

All of these choices are directly analogous to those illustrated earlier. Accordingly the illustrations (FIGS. 3 through 6, 11, and 13A through 15) presented in the preceding subsections for job search shall be considered to illustrate the present subject matter as well—the differences in screen appearance being only a matter of inserting a different participant type and identity, manifesting the involvement of links to a different sort of participant.

At the other end of the transmission, in this relatively simple case of printshop and primary customer working through a private network, from the perspective of the customer's operator the scene is again rather simple. As before, that operator can receive, or watch for, or look up, its pending jobs by printshop, or by network ASP (unless that information is inhibited by arrangements with the printing house, as will be explained shortly)—or once again by an RHCPS JDF job ticket number, or simply by the customer's own internal reference number for the project, or a relevant date.

In any of these events the customer operator is drawn quickly to the incoming proofing file. An alternative arrangement, as mentioned in an earlier example, is along the model of a hot folder that sets up the job to run on the customer's proofing printer upon receipt, without necessarily involving any operator action.

This subsection focuses upon participation of the network ASP, and positive benefits flow from the present invention in this regard as well. More specifically, when any question arises about the transmission, not only the primary-customer and the printing-house operators but also an network-ASP technician readily gain access to all the identical particulars of the transmission.

This means that precisely the data seen by the two operators about the transmission, as initiated from the printing house and into the ASP's own equipment, can be seen by the ASP technician. Usually the net-ASP's screen display is augmented with additional technical data developed at the point of launching the file into the network.

In the absence of this RHCPS workflow control, the scene is instead one that is nowadays very familiar. An upset user telephones a harried technician, trying to describe something relatively nebulous that happened sometime earlier in the day, or perhaps the previous day.

When instead two or all three concerned parties can quickly be looking at the same data, at the same time, the results are salutary in several ways. This commonality of information among three parties to a troubleshooting conference contributes greatly to a valuable calming sense of orderliness and confidence, as well as to speediest possible actual resolution of any flaw in the transmission. This collaborative model is strikingly different from an all-too-common scenario of the computer era—two vendors each telling a primary customer to check with the other vendor.

These technological benefits, however, to a certain extent are transcended by commercial advantages introduced earlier. Thus for example the printing-house operator may be concerned that in conversation with the customer the network ASP may give away too much information about competing printshops that also happen to use the net ASP; and in this case the workflow-management service can be configured to minimize contact between customer and ASP.

Even in attempting to resolve a transmission-failure situation it is not strictly necessary to convene all three of the operators. Rather, if the printshop has a policy of minimizing exposure of customers to use of the network ASP then ordinarily the problem can be promptly resolved between the shop and the ASP.

In such a situation the printshop elects to take on a slightly greater part of the burden of resolving the matter, in return for maintaining its more-guarded stance as to its supporting net ASP. Even the use of the private network itself can be made particularly inconspicuous if that network serves primarily a leg of the connections which is between the printshop and the Internet.

If desired, the RHCPS interface as seen at a customer's facility can be made to see only the printshop identification, and not the network ASP's at all. The net-ASP activities in effect then become a part of the printshop services.

Of course the customer is always free to inquire separately into the full character of the RHCPS or of the net ASP. In that event the customer can if desired establish, or reestablish as the case may be, a fuller control of its own commerce.

Now secondly, as stated at the beginning of this subsection (c) it is possible that the participants are not only three—the customer, shop, and net ASP—but also a proofing ASP such as discussed in the previous subsection (b). Representative forms of the user interface for these four-cornered situations appear in FIGS. 19 through 22—here too the basic model being one that is relatively open, yet with room for fine adjustments. In this case once again the RHCPS workflow manager seamlessly integrates all these elements, sending the file to the right party (whether customer or proofing ASP, or both) and through the prearranged network.

In this environment any failure of smooth operations would ordinarily—that is, in the absence of the RHCPS workflow component—be a source of major abrasion. It is a well-known irritant, in the computer age, that every participant seems to suggest some other participant as the root source of any failure. The greater the number of parties involved, the more frustrating and even exasperating this phenomenon can be.

The RHCPS, however, instead enables efficient resolution of service interruptions on a participative basis, in even a four- or five-cornered transaction, where the participants are operating in a relatively open understanding about the relationships among the several services. At the same time preferred embodiments of the RHCPS can accommodate other forms of understanding—e.g. they may permit some of the vendors involved to shoulder some added fraction of effort required to keep operations running smoothly, in return for the ability to partly isolate customers from other operators in the trade.

Although the desire to work openly or guardedly has been discussed above in relation to printshops, other parties may wish to exercise such options. Preferences of this sort may be felt by ASPs and even by customers—for reasons of simply wishing to control their own costs, or business confidences, or operating image; or whatever personal reasons may arise.

In these ways the RHCPS resolves many of the business tensions discussed in the "BACKGROUND" section of this document. It thereby promotes and enhances competition of an economically healthy kind, and minimizes the problems set forth in that earlier section.

(d) Primary customer via a transaction ASP to other parties—Here too, this transASP may be in a relatively simple direct business relation between the primary and the printshop, with no other ASPs involved; or this ASP's relationship may be only one of several. That is, in addition to the middleman ASP there may also be any of the previously described relationships with ASPs for proofing or for data transmission, or both.

The general principles for preferred embodiments of the invention here, however, are analogous to those discussed above. In view of the relatively extensive earlier discussions, these general principles are only summarized here: the RHCPS interface, as before preferably though not necessarily a graphical type, gives each user log-in options custom-established for that specific user—and based upon several factors.

Factors include (1) all entities that are party to the particular transaction of interest; and (2) preferences of the entity that initiates the RHCPS arrangements for the particular transaction—sometimes subject to understandings with some other entity or entities, as noted earlier. In particular, usually log-in and other operating options are set up as a so-called "default" (in the computer-jargon sense, not the financial sense).

The default settings are usually subject to override by the user or users who are—or who are positioned in the chain of commerce relatively closer to—the primary customer. Although the primary customer, and those in position to act on the primary's behalf, thus most commonly have authority to override the default arrangements, the full extent of such options may not always be clear to parties that have them.

Of all the parties that may purposely leave such options incompletely explained, transaction or broker ASPs are perhaps the most prominent. This may be a natural and understandable result of the nature of such businesses, in view of the following considerations.

As most transASPs do not participate directly in physical creation of the final product, the primary economic reward for their activity cannot be linked to any esthetic or mechanical function. Rather they provide convenience, and familiarity with trade practice, and ideally sound guidance of the primary customer to a printing house and other vendors that are optimum for the nature of the project.

These functions—although real, and potentially of extremely great value—are hard to quantify, and may be difficult for some primary customers to appreciate at all. Vulnerability to diversion of clientele therefore may be greatest for the transASP, of all the participants in these transactions.

Representative versions of a GUI for broker-ASP situations appear in FIGS. 23 through 27. In the example here, only the broker (transASP) has full view (FIG. 27) of all details and data.

At the opposite extreme is the sharply restricted visibility of the primary customer, who in this example sees (FIG. 24) only two ASPs—the broker and the proofer. The proofer's business contact line in the upper, data-window screen section is removed entirely—obscuring absence of the contact's name—as are the "business" radio-button legends for both e-mail and shipping label. Additional screen titles within the frame appear automatically, adjusting to the absence of information in two columns—which as shown can be kept in their usual positions if desired to minimize confusion between different participating operators.

Between these two poles of relative visibility are some intermediate information-access levels. Thus in the print-shop operator's screen (FIG. 23) the names of all contacts at the primary customer's facility are unlisted, the phone and e-mail controls for contacting that facility are grayed out, and the GUI reveals only the customer's project reference number, and address data for a mailing label—so that finished magazines can be shipped to the customer.

A like level of information access is accorded to the network ASP (FIG. 26), who it is presumed may have to ship some piece of network equipment to the primary customer, or even service such an item at that customer's facility. Contours of information access are formed in yet another way for the proofing ASP (FIG. 25), who is enabled to consult with the primary customer's artistic or technical people—but not with management: the proscribed contact's name is unlisted in the "CUSTOMER" column, and the phone and e-mail "business" options are grayed out.

This example is constructed to include another ASP, in the column headed "PREPRESS/SPECIAL"—e.g. a trade pre-press house, or other special-purpose vendor. (In the event that both a prepress firm and another special vendor are present, either condensed [narrow] fonts can be used to permit displaying all participants within the width of the screen or as noted earlier suitable horizontal-scroll capability can be provided for the upper portion of the screen.)

The prepress house is functionally closest to the printshop and proofer. Prepress therefore might logically receive e.g. access to both those entities—plus the same need-to-know customer artistic/technical access as the proofer.

As shown, the system primarily directs the customer to the broker ASP, who in effect becomes symbolic of the customer's overall project or projects. From the customer's perspective, in effect the sole vendor involved is the broker.

In the most-highly preferred embodiments of the invention, as noted earlier the primary customer has the option of overriding all such arrangements. This option is enabled—but not encouraged, and certainly never pushed on the customer—by making available to the primary customer information about the option.

The information is ideally included in an RHCPS user interface seen by the primary customer. This can be done in the form of an external link to the contractual terms of the RHCPS, which include the information about the option; or in the form of an internal "help" screen that includes the terms.

In implementing either of these arrangements, careful attention must be given to the wording and graphics used in leading to and presenting the customer's override option. It is a sensitive point and best worked out among specialists in law, marketing, customer relations, and professional editing.

The extent to which the link and terms are conspicuous, in the RHCPS user interface, is important. The basic mechanics may encompass use of the "Help" menu item that appears in the many tabulation screens shown in the accompanying drawings.

As one presentational technique, words such as "RHCPS contract terms" simply may be included in the drop-down submenu that appears when that main menu item is clicked. This may seem overly conspicuous, but it should be borne in mind that the terms themselves are typically lengthy, including many more clauses than just the user-override option that is under discussion here.

Figure 28:
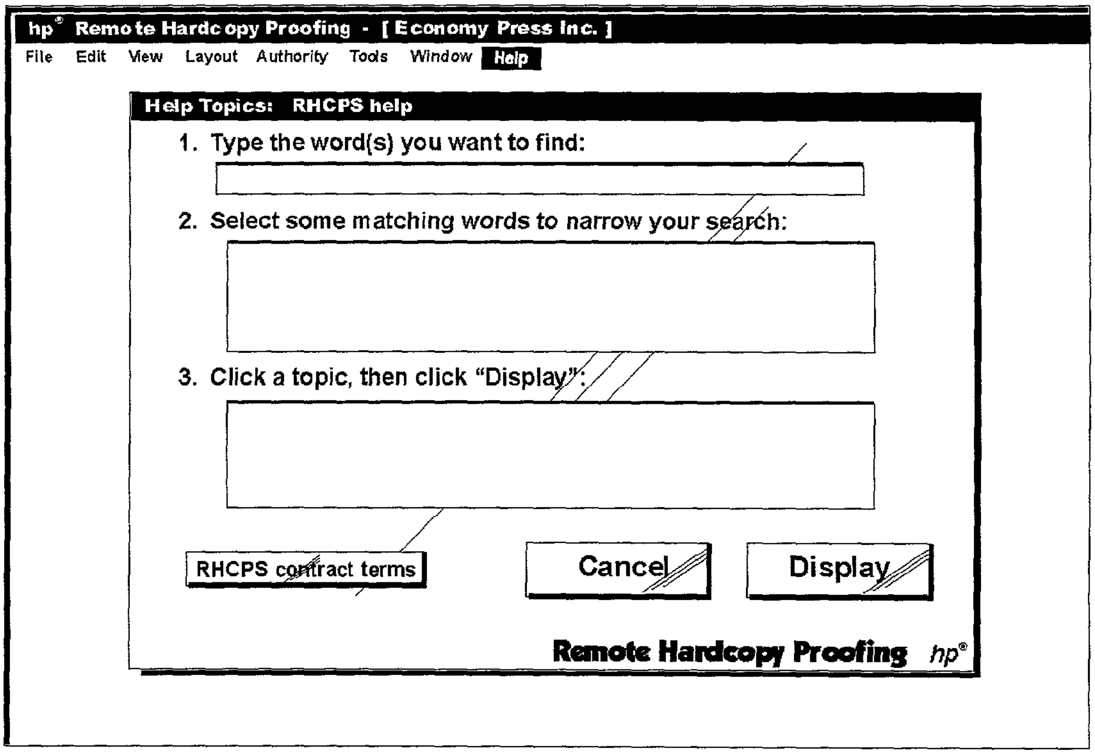
FIG. 28 is a picture of a GUI screen like the others, but for general inquiries to the system.

Another technique is to respond to a user's click on the "Help" item in the main menu by opening an intermediate selection dialog box (not shown) that contains a button or link to invoke the contract terms (instead of moving along to the main help screens). Alternatively such a button or link can be incorporated directly into a main help screen itself (FIG. 28). Depending on the layout and wording in such an intermediate help dialog or main help screen, the impact of the contract-terms availability may be either strengthened or weakened, relative to putting it into the help menu as first suggested above.

In either event, the placement of the override option within the terms, and the nature of the wording used as a title for it, are extremely variable. This variability still leaves room for further fine tuning of the content and tone of the presentation.

5. Integration with a Soft-Proofing A.S.P.

To facilitate some aspects of the invention, advantageously some features are implemented within printer-device systems, and complementary features appear in the remote soft-proofing ASP. Although these implementations may not be strictly necessary, the result is an optimization of the invention that also optimizes integration between the remote soft-proofing ASP and the remote hardcopy proofing service.

The new printer-device systems will be characterized here as "remote-proof enabled" or "RP-enabled". They include a printing device with front-end software.

These features make it realistic for users to trust the integrated service, basically by ensuring output consistency of hardcopy proofs—i.e., by providing for consistent printing (same contents, layout, color etc.) on any remote-proof printer of the line. The features also facilitate the remote-proofing workflow.

(a) PDF plus JDF as a basis for workflow—To ensure output consistency, it is very helpful to provide that:

- all the information required to correctly print a proof is included in the data sent from the proof originator to the proof receiver; and
- the setups used both on the originating and receiving printers to print the proofs are consistent.

These requirements are achieved by using a combination of PDF (Adobe "portable document file") and JDF ("Job Definition File") to carry all the required information, as follows.

- Contents of the proof itself are carried in the PDF. This file preferably meets very strict requirements in terms of the information included—i.e., for ideal results it includes all the color, relevant information, fonts and images.
- The JDF job ticket stores all the information on how the proof has to be printed to ensure a consistent output. It can also store the information on status of the remote proofing workflow for the specific proof.

The RP-enabled printer systems include the tools required to create the PDF and JDF parts of a remote proof. These tools are fully integrated into the front-end software (for example in a raster image processor that is in or associated with the printer), so that a user can easily create a proof to be sent to a remote user—and not only send it but also print it in the user's local printer.

On the receiver side, before printing a remote proof some checking is performed. This ensures that the proof data meet the requirements to ensure output consistency.

(b) Managed and calibrated color system—Use of the automatic color calibration and the color-management features in the printer ensures that the color behavior of RP-enabled printers is consistent. This means that any proof which contains the correct color information can be printed consistently, in terms of color, in any RP-enabled printer or at least any such printer of the product line.

Both the automatic color calibration and color-management features are implemented by interaction of the printer device and the front-end software.

(c) Proof checking and feedback—The RP-enabled printer systems has the ability to check for successful and correct printing of a hardcopy proof, and its quality as well. This information can be made available to the user who printed the proof, and also sent back through the RHCPS to the proof originator (e.g. the user who originated the proof) so that the originator can know when the proof was printed and what the quality of that proof was.

Thus the entire RHCPS operates on a closed-loop basis. In this way the system is made very trustable, thus resolving one of the major inadequacies of the art.

The proof-checking functionality advantageously uses the same hardware in the printer that is used in automatic color calibration. The entire procedure (proof checking and status feedback) is integrated into the front-end software so that it can be triggered automatically—and can be transparent to the user, depending on the settings of the RHCPS or the proof itself, or both.

(d) Obligations imposed on the remote soft-proofing ASP—To enable the RHCPS to make full use of the RP-enabling features integrated into the printer system, several provisions should be made by the soft-proof ASP:

- support PDF-plus-JDF workflow—The soft-proof ASP should be able to transfer the proof data from the sender to the receiver. Ideally the ASP should also use the JDF job ticket to store essentially all information related to its own services—for example the originator and intended receiver(s), and the status of the proof—so that the JDF ticket is the only job ticket used.
- integration of the proof-generating tools and the soft-proof ASP—As described above, proof-generating tools are integrated into the printer front-end software. There should be some way to pass proof data, once generated, to the soft-proofing ASP. For this purpose the ASP can provide a hot folder (discussed earlier) or equivalent arrangement.
- integration of the proof-consuming tools and the soft-proof ASP—When proofing data are received through the soft-proofing ASP, the data should be passed to the printer front end for processing and printing. Again, this calls for a hot folder or other feature—most typically a feature of the user interface, graphical or otherwise.
- support status feedback—The printer front end triggers automatic checking of the proof, once printed, and generation of information on the printing result. There should be a way to send this information from the front end to the soft-proof ASP so that it can be forwarded to the proof originator.
- support user-collaboration features—The ASP should make provision for the proof receiver to add comments, i.e. annotations, and preferably to approve the proof in writing after having printed it. All such information should be accessible to the proof originator.

These may be considered basic obligations of the ASP, although people skilled in this field will appreciate that a reduced level of functionality and service may yet be obtained in the absence of some such provisions. In addition to these basic features, some additional provisions improve workflow and usability:

- proof data checking—To ensure output consistency, ideally a check is always performed at the receiver side before the proof is printed. To save time and bandwidth, however, it is useful that either the ASP or RHCPS itself—depending on the circumstances—also prevalidate the data before downloading by the receiver.
- hosting proof-generation tools by the ASP—Since the RP-enabled printer systems integrate the tools for generating correct proofing data, any user with such a printer can generate remote proofs. In some cases, however, it is also useful to have the ability to run those tools on the ASP's system—thereby enabling collaboration by ASP subscribers who have no such printer.
- integration of soft and hardcopy proofing—Some soft-proofing ASPs may themselves use a commercial service, such as RealTimeProof™ service, for soft proofing. That service allows soft proofing of several types of files.
  - In order to integrate it with the RHCPS, the soft-proofing application (i.e. the ASP) should be able to:
    - (i) send data to the RHCPS that satisfies the obligations outlined above (PDF-plus-JDF, containing all the color characterization, fonts, and so on); and
    - (ii) process RHCPS proofs and use the embedded color-characterization data (color profiles in the PDF file, etc.)

The first of these can be accomplished by integrating into the ASP software at least a part of the proof-generation tools of the present invention, e.g. a software kernel.

(e) Integration between the ASP and RHCPS—The present invention encompasses a service that can be offered by a sponsoring company—to consider an example in point, the Hewlett Packard Company. The service is made available, possibly for a fee, to users who register their RP-enabled printer systems in that sponsor's customer-registration system.

The RHCPS is a basic service that itself provides remote hardcopy proofing only. A user desiring other services than that—e.g. high-bandwidth transmission, file storage (so-called "digital asset management") or soft proofing—should engage one or more ASPs to obtain those services.

To facilitate an upgrade path to such ASP services, as well as interaction between customers of the RHCPS and ASP respectively, preferably these features are included:

- As indicated at some length in previous sections of this document, the RHCPS customer database is able to identify the users who have decided to be customers of, e.g., a soft-proofing ASP. Proofs sent to or from one of these users through the RHCPS are redirected to the ASP, through the agency of the many interface features previously detailed.
- The database also advantageously enables each user to search for other registered users, of any type, including both potential vendors and customers—except for registrants who elect privacy, i.e. elect to opt out of such tabulation.
- The RHCPS and the soft-proofing ASP each allow specifying, as a proof receiver, a user that is on the other service. For example, a remote-proof originator who is using a soft-proof ASP can specify that the receiver is using the RHCPS—and in this case the proof is forwarded from the ASP to the RHCPS.

Accordingly a protocol is included for forwarding proofs between the two services. This protocol is advantageously bidirectional so that that receiving service can return to the originator various kinds of information such as error data, closed-loop proofing feedback. The protocol is a standard one and can be used to expand the integration—between the two companies, to include other services of theirs—and also to encompass ASPs of other types as discussed earlier.

All such integration can be accomplished through the Internet or by more-direct backbone connection as preferred. Generally integration is facilitated thus:

The RHCPS maintains a full user database for all participating ASPs as well as its own.

A data field flags each respective ASP's subset of these users. These can overlap, since customers are at liberty to engage multiple ASPs of different types and even of the same type for different jobs.

The RHCPS tests that data field on receipt of a proof for transmission to a user.

These arrangements are regarded as nominally reciprocal—each ASP is expected, though not required, to do the same.

Both exclusive and nonexclusive forms of these arrangements are encompassed within the invention as defined in certain of the appended claims, and may be regarded as species of the invention. Exclusivity is thus a matter of business preference and business arrangements between the participants.

In these ways, as earlier pointed out, the RHCPS expands the capabilities of the soft-proofing ASP—which already has a useful service. The RHCPS does not obsolete that service, which continues to be particularly viable for highest speed, for concept proofing, and for preliminary proofing. Thus the RHCPS of the present invention does not compete with so much as mutually complement the soft-proofing ASP.

6. Integration with a Transaction A.S.P.

As described earlier, a transaction or buyer ASP focuses on management of a job, and order data—and the integration of order processing and status tracking with various functions managed by a printshop. Typically this type of ASP provides very little support (representatively perhaps just an FTP server) to the sharing of content files between a buyer and a printer, or digital asset management. It usually imposes no restriction on the contents shared, and provides no tool for proof generation or related functions.

One representative transASP offers customized and branded websites for both buyers and printers, with ongoing management and support. The firm does not have a general standard website design.

This sort of enterprise concerns itself with management of the electronic commerce between buyer and printer, particularly job specification and status tracking. Such operation is well complemented by the RHCPS of the present invention or, alternatively, by another service ASP such as a soft proofer or private network.

The transASP sets up websites for both the buyer and printer, and directs the two to each other through a protocol. Thereafter the ASP continues as a sort of arm's-length printing broker or facilitator.

(a) Workflow—Integration of a transASP with an RHCPS, according to the present invention, produces workflow generally as described below.

When creating a project, the buyer specifies (by a computer-interface checkbox or the like) that remote proofing should be used on the project or at least certain components. If the buyer is using the printer's site to specify the job, the remote-proofing proof type appears only if the printer has remote-proofing capabilities.

The converse is also true: if the buyer is using the buyer's own site to specify the job, the "remote proofing" option will only appear if the buyer has remote-proofing capabilities. The main difference is that, in this case, the remote proofing capabilities of the printer could be used as selection criteria. That is, only printers that can generate remote proofs would be able to bid for that job when an RFQ is promulgated.

In any case, there is preferably a link from the corresponding transASP page to a page served by the RHCPS sponsor, describing the RHCPS. This link is a particularly nonintrusive way to promote the RHCPS concept, provided that it is offered in a low-key manner—and at a strategically situated point in the process, where the user is likely to be amenable to education on basics of such a service.

The RFQ, bidding and ordering process otherwise proceeds as in any other project of the transASP.

When the printer generates the proof(s) for the job, or contracted component of it, the transASP accesses the RHCPS (or a soft-proof ASP) to send those proofs to the buyer. The RHCPS has all necessary information to establish that this particular user (e.g., the printer) is also using the particular transASP.

Accordingly, before sending the proof the RHCPS offers the possibility of linking it to an order (or order component) of the specified transASP. This function is readily implemented in the form of a checkbox—one that may appear to linked parties, depending on what setup has been put in place.

For example, when a printshop operator—using the RHCPS interface—enters the intended receiver of a proof, a window appears with all the open projects in that printshop operator's transASP website (assuming that the printer has one) corresponding to that buyer, i.e. the proof receiver. The printshop operator can then select a project (or component) as the one to which the proof being sent is linked.

Alternatively, the remote proofing process can be launched directly from the transASP web page for the job. Through a web link, the user directly accesses the RHCPS page to create the proof, with all the information about sender, receiver and link to the transASP project already filled in.

The remote-proofing workflow is managed by the RHCPS as a regular remote proof (upload, download, then print, approval, etc.). The only difference is that, when there is a change in the proof status, the data about the new status is sent to the transASP system for use in updating the project status.

Printers or buyers, or both, can consult the remote-proof status through the transASP website or RHCPS. As will now be clear, in accordance with the invention the two are crosslinked—in other words, from the transASP site, when accessing the proofing status of a project, the user should be able to access the RHCPS page for that proof; and vice versa.

Workflow is very similar if the entree to the RHCPS is through a different sort of provider—e.g. a soft-proof or network ASP.

(b) Interface—The following interfaces are defined. Parallels to the arrangements for the soft-proof ASP should now be recognized.

- an interface for retrieving information on open projects for a certain pair of users—printer and buyer
  - (Implementation calls for a well-defined way of mapping users between the RHCPS user space and the transASP user space.)
- a programmatic interface to allow the creation of remote-proofing jobs and filling-in part of the information
  - (This is a user-operational facility for "programming in" new jobs, actually data entry.)
- a method for linking proofs with transASP projects or components—i.e. a job (or component) identifier that can be stored in the proof job ticket and vice versa;
- an interface for retrieving information on status of a certain proofing job, so that it can be displayed in the transASP's site
  - (This interface should support two kinds of operating modes: synchronous, i.e. status queries about a certain proof; and event-trapping, i.e. automatic update whenever status of a certain proof job changes.)

Some transASPs, as well as the other ASP types, may have a tendency to respond to marketplace pressures by expanding their services beyond the original and natural areas of interest—and perhaps talent—of their operators. The present invention can relieve them of that, fostering competition without redundancy (in particular wasteful, inefficient redundancy).

(c) Additional transASP features—Advantageously the user sees some new elements in the transASP website. One of these is a new RHCPS proof type added to the prepress parameters in the project or component description, preferably with links from that page to descriptions of the RHCPS.

Also preferably added is a new display area within the previous project-status tabulations—to display remote-proofing status of the various components. This area displays summarized status and log-in information for the proofs, and provides links for access to the proof itself and its more-detailed status in the RHCPS.

(d) Additional RHCPS features—Conversely, for an RHCPS user who creates and uploads a proof into the system, if the user is also a transASP user, the RHCPS opens a window showing all the user's open projects—with that transASP—corresponding to the intended.

The RHCPS window showing proof status also provides a link to the transASP website page that has data on the related transASP project. If a proof relates to a transASP project, the project or component identifier is stored in the job ticket.

7. Content and Transaction Standardization Formats

Because the number of parameters to be brought under control as between different printing systems is high, this topic is potentially encyclopedic. Comprehensive presentation of all those variables, however, would be of little service to a person of ordinary skill in the art, because this part of the RHCPS operation simply comes down to a massive technological-bookkeeping problem.

On the other hand, since that problem is rather open-ended and does involve many variables it is one that can leave the person of ordinary skill groping for a solid place to begin. To avoid any need for extensive trial and error, there follows below a presentation of a preferred accounting methodology, together with selected examples, providing a clear picture of the approach adopted by the present inventors.

(a) Data subdivision, standard formatting, and restriction—The fundamental orientation begins with use of two industry-standard formats for, respectively, document appearance and processing information. Here "appearance" encompasses color, layout, and content—which in turn means all the graphic objects (text, images, graphics) with their correct respective fonts and dimensions.

Processing information includes printing conditions and settings—the printer model and all parameters peculiar to that model, the printing-medium type, resolution for each image, and the print quality (and printmode). The appearance and processing data are complementary: to perform remote proofing, both are required.

While appearance information is carried in a special form of the industry-standard Adobe® Portable Document File ("PDF"), the processing information is held in a job ticket—for which the standard Job Definition Format ("JDF") is used. Thus the JDF job ticket is part of the data exchange, but is a separate entity from the appearance information.

This division of the data greatly facilitates any needed proof retargeting, i.e. changing printer-setting characteristics to use a different printer model or medium. Retargeting should be performed at the proof originator site, as suggested in the previously mentioned Jodra patent document; however, the JDF should be configured to accommodate information relevant to different printer models, so that the system in the originating site need not be told the specific printer model that will be used in the receiver's site.

Key to the most highly preferred embodiments of the invention is use of these standard formats with, in essence, reduced parameter sets—that is to say, with:

- entries in many standard fields prohibited or ignored, and
- only limited ranges or discrete values, of the respective variables, permitted or accepted in certain other standard fields.

For several reasons this has been found greatly preferable to creating a custom format with only the desired fields present.

(b) Additional nomenclature—The PDF and JDF together constitute the data exchange or "proofing file". Some workers in the industry have come to instead call this computer-readable file simply the "proof"—but in the present text and appended claims the more traditional usage is followed, i.e. the word "proof" refers to the hardcopy document or on-screen computer image that is directly visible to the human eye.

In a specific implementation of the RHCPS, a particular entity may have the ability to act as an originator or a receiver; however, it is convenient for the specification to view them as separate entities. A routing service such as a network ASP may add information to enable or facilitate transmission from an originator to a receiver, but any such changes must be transparent to the requirements of the data exchange—in other words, data both into and out from the routing service should comply with all rules established for the exchange.

To avoid ambiguity the terms "local" and "remote" sometimes require a point of reference. For present purposes "local" usually refers to the location of the generator of a proofing file; hence unless otherwise specified or suggested by context a "local proof" is one printed (or viewed on-screen) in the same location where its proofing file is generated; and a "local proofing file" is a proofing document generated in a local system and susceptible to transmission through the RHCPS to a receiver.

Correspondingly unless otherwise specified "remote" refers to the location of the receiver, and a "remote proofing file" is one that has been received through the RHCPS by the entity "remote" from the originator (the "local" entity). A hardcopy proof physically printed at that remote location is accordingly a "remote proof"; hence the phrases "remote proofing", "remote hardcopy proofing service" etc.

(c) Proof types—It is important that the RHCPS be able to handle not only single-page proofs but also signature proofs (sometimes called "imposition proofs"). Although consistent, accurate remote hardcopy color proofing of page modules is extremely useful and valuable in itself, the power of the invention is greatly expanded by incorporation of signature-proofing capability.

Accordingly the proofing data contain (in the PDF) information on the contents of each page, and (in the JDF) layout information describing the signature scheme to be used in printing the document on a press. In preferred embodiments of the invention, the proof generator can produce two types of proofs: page, and signature.

The difference between them is not in the proofing data, but rather in how the layout information is used by the recipient's proofing device when printing the proof:

- For page proofs the device may use the layout information to print the proof, but is not required to do so. If the proofing device cannot print the signature(s) as described in the layout, it is not required to so inform the user.
- For signature proofs the proofing device must use the layout information to print the proof. If the proofing device cannot print the signature(s) as described in the layout (due, most commonly, to media-size limitations) it must inform the user and provide different options for printing the proof or canceling it. The specific user interface is device dependent.

For example, suppose that an originating entity creates a proofing file for an eight-A4-page document, describing an eight-up signature that will be used in the press. If those proofing data are sent to an A3-size proofer, the behavior may depend on the type of proof requested:

- If a page proof was requested, the proofer can print four A3 sheets, each containing two of the original document pages. To group the document pages, the device may use the information in the layout data to ensure that the two A4 pages printed in each sheet are adjacent in the signature; or it may use any other algorithm—such as printing pages in the order in which they appear in the assembled document.
- If a signature proof was requested, the proofer issues a warning informing the user that it cannot print the signature because that would exceed the maximum page size of the device. It may offer the user several options, such as dividing the signature (tiling), scaling down the whole form proof or reverting to a page proof.

(d) PDF/Proof contents—To ensure that the output proof can be printed consistently in different devices it is helpful to strictly define the characteristics of the file. PDF is a very powerful, general-purpose format, whose features and functionality are far more versatile than the RHCPS can use; hence many of these features and functionality are restricted. In this document a file that complies with these requirements is sometimes called a "PDF/Proof file".

Compliance with PDF/Proof restrictions does not ensure output hardcopy consistency. A receiver must process the data in a specific way to achieve it.

Thus a conforming PDF/Proof file is a PDF in which are found those features necessary for the exchange of proofing data and to enable output consistency at any receiving entity. Receiving entities must ensure output consistency for files conforming to PDF/Proof constraints.

In the embodiment now preferred, a PDF/Proof file must be a valid PDF 1.3 file, as described in the "PDF Reference Manual/Version 1.3". Thus any requirement of PDF 1.3 or higher is also a requirement of PDF/Proof but is not further mentioned or repeated below.

Although nonprinting-related PDF constructs—such as annotations and thumbnails—might be present in a PDF/Proof file, they are ignored by the remote-proofing entities and consequently are not included in this discussion of the file format. (It can make sense to use these features if it is desired to use other PDF standard tools in the workflow.) In particular, specification of the PDF/Proof format contemplates only the objects in the pages tree, catalog, and file information dictionaries in a PDF.

Advantageously there are two versions of PDF/Proof, defined relative to a raster image processor ("RIP") that is currently used in the preferred printing systems to prepare images for the printing engine:

- "PDF/Proof-Image" supports only "postRIPped" remote-proofing workflow.
- "PDF/Proof-Object" supports both "postRIPped" and "preRIPped" remote-proofing workflow. As these relationships suggest, PDF/Proof-Image is a subset of PDF/Proof-Object; i.e. any file that complies with PDF/Proof-Image also complies with PDF/Proof-Image.

The presentation of exemplary PDF/Proof restrictions will begin now with "PDF/Proof-Image".

All the components of the proof contents are contained in the body of a single PDF/Proof-Image file. It is not permitted to present only as an embedded file any component required to process the proof contents.

To help see how to implement the general rules, following are only just a few examples of several dozen constraints that make up a PDF/Proof-Image specification. This part of the present document assumes familiarity with parameter and field names (such as "DefaultForPrinting", "OutputIntent", "ExtGState", "MediaBox", etc.) defined in the PDF 1.3 specification.

As a consequence of the contents-in-body requirement last stated above, streams cannot reference external files. That is to say, the F, FFilter and FDecodeParams entries in a stream dictionary cannot be used.

As examples of constraints to contents, each page can contain only image objects; they can be either external images (so-called "image "XObjects") or inline images. The only commands allowed in a page "Contents" stream are:

- q, Q: save and restore the graphics state;
- cm: modify the current transformation matrix;
- Do: include an external object (so-called "XObject")—and images are the only XObject types allowed;
- BI, ID, EI: inline images As examples of constraints to bounding boxes, each page object must include a MediaBox and TrimBox; MediaBox may be included by the object-oriented programming concept known as "inheritance". A CropBox or BleedBox, or both, may also be included in the page. If the BleedBox is present, the TrimBox will not extend beyond the BleedBox boundaries. If the CropBox is present, the TrimBox will not extend beyond the boundaries of the CropBox.

As examples of constraints to color, the only color spaces allowed are DeviceCMYK and DeviceGray; all the images (either inlined in the contents stream of pages or in an image XObject) must be in DeviceCMYK, DeviceGray or Indexed color space. If Indexed color is used, the base color space should be DeviceGray or DeviceCMYK.

Still as to PDF/Proof-Image constraints—as examples of restrictions on Identification, a PDF/Proof-Image file is so identified using the HWEP_PDFProofVersion key in the Info dictionary; the type of a HWEP_PDFProofVersion key is string, and its value is (HWEPProofImage0.1).

Turning now to PDF/Proof-Object constraints, a PDF/Proof-Object file must meet additional requirements, on top of the requirements described in the "*PDF Reference Manual, Version*1.3". As examples of data-structure restrictions, all components of the proof contents must be contained in the body of a single PDF/Proof-Object file—and this refers to all the PDF resources (as described under "Resource Dictionaries" in the previously mentioned *PDF Manual*) used in the file including all fonts, font metrics, font encodings, full resolution images, ICC profiles etc.; and print elements must be included in the file.

As examples of content restrictions, operators not allowed in the Contents stream for a page are PS (PostScript code embedded in page contents); BX, EX (compatibility operators); and in general any operator not described in the *PDF Manual*. Images cannot have the OPI entry in the image dictionary set. If the Alternates entry in the dictionary is set, none of the alternate images can have the DefaultForPrinting entry set to true; that is, the base image is the one that must be used for printing the proof.

As examples of constraints to bounding boxes, the same rules apply as stated above for PDF/Proof-Image. As examples of constraints to color, a color rendering intent must be specified for the contents for all pages; rendering intent can be specified in the ExtGState resource or in the Image dictionary for images. Color space and Identification restrictions are generally as stated above for PDF/Proof-Image.

(e) JDF contents—As suggested in earlier discussion, a JDF job ticket is required to ensure that the front end of the remote printing system processes the proofing file with the correct settings, compatible with those used when printing the proof on the local file, in order to ensure output consistency. Specification of the "JDF Job Ticket" requirements for remote proofing are based on the "*JDF Specification Release* 1.0", with a few variant details (names and permitted values of some elements in the resource elements).

That specification covers two areas: processes allowed in the remote-proofing JDF job ticket, and resources (and their syntax) required for those processes. The specification does not cover other areas in that job ticket, such as customer-related information, or audit. Although such information may appear in the job ticket it is not required—for purposes of this invention—that originating entities generate it or receiving entities process it.

The RHCPS is an implementation of the JDF proofing process and inherits the characteristics of that process. Extensions are added to support the specifics of the remote-proofing use case and thermal-inkjet printing technology. Also, due to limitations on printing devices and to simplify implementation, just as for the PDF some restrictions are desired on possible values and characteristics. The JDF job ticket should have one node (the root node) specifying the Proofing process.

For examples of constraints as to resources, if the ColorantControl, ColorPool, or ColorSpaceConversionParams resources are present in the proofing-input resources they are ignored in the proofing file; the color space used (press CMYK) has to be fully defined using an ICC profile. The Layout resource is required if the ProofType field in the ProofingParams resource is set to Imposition (i.e. signature).

As to constraints concerning media, since the JDF job ticket is generated without knowing on which device or devices the hardcopy proof will be printed, this resource is only a hint. Behavior when the media available on the proofing device fail to match the requirements in this resource is device dependent. As examples of constraints on interpretation of each of the fields in the Media resource, Dimension is not required but if present describes the minimum printing-medium dimension required to print the proof. If the proof type is set to Imposition, this is the size of the signature; if it is instead set to Color, this is the size of the largest page in the document.

As examples of constraints to the ProofingParams resource, ProofType is required and describes the type of proof requested. ColorConceptual or Contone is used for page proofs and Imposition of signature proofs. Halftone proof types are not supported. Several parameters that are just ignored if present include ImageViewingStrategy, DisplayTraps, and ProoferProfile.

The document RunList describes the document that is to be proofed and includes a link to the document contents file. In the initial version of the RHCPS that is the current most highly preferred embodiment, proofing is restricted to documents contained in a single PDF/Proof file. In consequence there are some restrictions on the characteristics of the document RunList.

For example Npages, if defined, should be set to the total number of pages in the document; and Run can only contain one RunElement. Examples of constraints on the RunElement include these: if EndOfDoc or DynamicInput is present, the field contents are ignored. The RunElement can contain only one RunSeparation.

Yet further limits in turn apply to RunSeparation, including its LayoutElement, and still further constraints apply to contents of the LayoutElement. RunList "marks" are not supported in the present version of the RHCPS. If a proof must include printing marks, they should be included in the page descriptions in the proofing file.

For local proofs, the two components of the proofing data are packaged using the MIME File Packaging method described in Appendix A of the "*JDF Specification Release* 1.0". References to external files are allowed neither in the job ticket nor the document contents.

For remote proofs, the two components can be packaged using the same MIME method. It is also possible that the job ticket contains only a URL specifying the location of the document contents portion of the proof data. Constraints on URL type can be helpful.

Again, the foregoing specification details are only examples of some dozens of such restrictions actually used. From the considerable length of this merely exemplary presentation it will be clear why the full set is not detailed here. Those presented are intended to convey a clearer understanding of the reduced-parameter-set approach to use of industry-standard PDF and JDF formats.

The above disclosure is intended as merely exemplary, and not to limit the scope of the invention—which is to be determined by reference to the appended claims.

What is claimed is:

1. A remote proofing computer system for use by a user; said system comprising:

a closed-loop-color remote hardcopy proofing service (RHCPS) that is one or more devices distinct from and remote from the user, except that the RHCPS provides an RHCPS user interface for viewing by the user, and having data about a printing job to be hardcopy-proofed; and a graphic-arts application service provider (ASP) that is one or more devices distinct from and remote from both the RHCPS and the user, and that provides a remotely accessible ASP FTP site or website having data about its service;

whereby the RHCPS, ASP and user are at least three distinct and mutually remote entities;

wherein the RHCPS interface comprises a graphical and operational RHCPS link to the ASP data when an RHCPS user chooses to be also a user of the ASP.

2. The system of claim 1, wherein:

the closed-loop-color RHCPS is based on a printer device that prints and reads a calibration pattern, and that returns a calibration report to a user who is in a different location from the printer device.

3. The system of claim 1, wherein:

the RHCPS link to the ASP data appears only if the ASP is an established copartner with the RHCPS.

4. The system of claim 1, wherein:

for each user, the link to the ASP data comprises a visible tabulation of that user's graphic-arts jobs with the ASP.

5. The system of claim 4, wherein:

the RHCPS maintains data linking each RHCPS user to each ASP which has such a remotely accessible FTP site or website, and with which that user is registered.

6. The system of claim 5, wherein:

for each user, the RHCPS interface link to the ASP data appears only for an ASP with which that user is registered.

7. The system of claim 6, wherein:

for each particular job that a user has associated with an ASP, the RHCPS automatically routes proof reports and related details to the user through that ASP rather than to the user directly, unless the user specifically instructs the RHCPS to the contrary.

8. The system of claim 1, wherein:

the ASP's FTP site or website comprises a user interface with said data about the ASP services.

9. The system of claim 8, wherein:

the ASP interface comprises a link to the RHCPS interface when an ASP user is also an RHCPS user.

10. The system of claim 9, wherein:

in the ASP interface, the link to the RHCPS interface appears only if the RHCPS is an established copartner with the ASP.

11. The system of claim 10, wherein:

for each user, the ASP interface link to the RHCPS interface comprises a visible tabulation of that user's jobs that are subject to remote hardcopy proofing.

12. The system of claim 11, wherein:

the tabulation comprises an active remote-hardcopy-proofing (RHCP) dialog window for addition or modification of that user's own RHCP jobs.

13. The system of claim 11, wherein:

the ASP maintains data linking that ASP's users to the RHCPS.

14. The system of claim 13, wherein:

for each user, the RHCPS interface link to the ASP data appears only for an ASP with which that user is registered.

15. The system of claim 14, wherein:

for each particular job that a user has associated with the RHCPS, the ASP automatically routes proofing jobs from the user to the RHCPS rather than to another proofing entity, unless the user specifically instructs the ASP to the contrary.

16. The system of claim 1, wherein the RHCPS user interface and the ASP's FTP site or website are for operation by any user selected from the group consisting of:

a primary customer, including but not limited to a publisher, printing customer, or printing client;

a buyer representing a primary customer;

a graphic artist;

a printing broker; and a user that is any hybrid of two or more of the preceding four user types.

17. The system of claim 1, wherein the ASP is selected from the group consisting of:

a printing-brokerage ASP;

a soft-proofing ASP;

a private-network ASP; and an ASP that is any hybrid of two or more of the preceding three ASP types.

18. The system of claim 17, wherein:

the RHCPS link to the ASP data also comprises access to further service of the ASP other than RHCPS procedures.

19. The system of claim 18, wherein said further service comprises:

if the ASP is a printing-brokerage ASP or hybrid thereof, service relating particularly to transactional matters;

if the ASP is a soft-proofing ASP or hybrid thereof, service relating particularly to generation, checking or approval of a soft proof; and if the ASP is a private-network ASP or hybrid thereof, service relating particularly to data transmission or storage.

20. The system of claim 17, wherein:

if an RHCPS user is not an established user of any particular ASP, of any one type of said three ASP types or a hybrid thereof, the RHCPS interface comprises an RHCPS link to data of all ASPs which are established copartners with the RHCPS.

21. The system of claim 17, wherein:

if an RHCPS user is not an established user of any particular ASP, of any one type of said three ASP types or a hybrid thereof, the RHCPS interface comprises an RHCPS link to data of all ASPs of that one type or hybrid, which are established copartners with the RHCPS.

22. The remote proofing computer system of claim 1, wherein:

said ASP is distinct from the RHCPS.

23. A computerized remote proofing method for use by a user; said method comprising the steps of:

operation, by such a user, of a closed-loop-color remote hardcopy proofing service (RHCPS) user interface, to gain access to data about a printing job to be hardcopy-proofed; said RHCPS being one or more devices that are both remote and distinct from the user except that the RHCPS provides the interface for viewing by the user; and granting, by a graphic-arts application service provider (ASP), of access to data about the ASP's service, if the RHCPS user chooses to be also a user of the ASP; said ASP being one or more devices that are both remote and distinct from the RHCPS;

said granting being in response to the user's activation of a graphical and operational link, within the RHCPS interface, to a user interface of the ASP;

whereby the RHCPS, ASP and user are at least three distinct and mutually remote entities.

24. The method of claim 23, wherein:

the operating step comprises actions supporting preparation of a remote closed-loop-color hardcopy proof, by a printer device that prints and reads a calibration pattern and returns a calibration report to an entity in a different location from the printer device.

25. The method of claim 23, wherein:

the granting step occurs only if the ASP is an established copartner with the RHCPS.

26. The method of claim 23, wherein:

the granting step comprises presenting to the user a visible tabulation of that user's graphic-arts jobs with the ASP.

27. The method of claim 26, wherein:

the presenting step comprises opening an active graphic-arts dialog window for the user's addition or modification of that user's own graphic-arts jobs.

28. The method of claim 27, wherein:

the opening step comprises permitting the user to delete that user's own graphic-arts jobs, by means of the dialog window.

29. The method of claim 26, further comprising the step of:

maintenance, by the RHCPS, of data linking each RHCPS user to each ASP with which that user is registered.

30. The method of claim 29, further comprising for each particular job that a user has associated with a particular ASP:

automatic routing, by the RHCPS, of proof reports and related details to the user through that ASP rather than to the user directly, unless the user specifically instructs the RHCPS to the contrary.

31. The method of claim 23, wherein:

the operation step comprises control of the user interface to interact with an RHCPS that corresponds to the interface; and the ASP that performs the granting step is distinct from the RHCPS.

32. A computerized remote proofing method for use by a user; said method comprising the steps of:

operation, by a user, of a graphic-arts application service provider (ASP) user interface, to gain access to data about the ASP's service;

said user being both remote and distinct from the ASP;

granting, by a closed-loop-color remote hardcopy proofing service (RHCPS), of access to data about the RHCPS; said RHCPS being one or more devices that are remote and distinct from the ASP:

said granting being in response to the user's activation of an operational link, within the ASP user interface, to a user interface of the RHCPS, if the ASP user chooses to be also a user of the RHCPS;

whereby the RHCPS, ASP and user are at least three distinct and mutually remote entities.

33. The method of claim 32, wherein:

the granting step occurs only if the RHCPS is an established copartner with the ASP.

34. The method of claim 33, wherein:

for each user, the granting step comprises displaying a visible tabulation of that user's jobs that are subject to remote hardcopy proofing.

35. The method of claim 34, wherein:

the displaying step comprises opening an active remote-hardcopy-proofing (RHCP) dialog window for addition or modification of that user's own RHCP jobs.

36. The method of claim 35, wherein:

the opening step comprises enabling the user to delete that user's own RHCP jobs.

37. The method of claim 34, further comprising the step of:

maintaining, by the ASP, data linking each ASP user to the RHCPS.

38. The method of claim 37, wherein:

for each user, the granting step occurs only for an ASP with which that user is registered.

39. The method of claim 38, further comprising, for each particular job that a user has associated with the RHCPS, the step of:

automatically routing, by the ASP, of proofing jobs from the user to the RHCPS rather than to another proofing entity, unless the user specifically instructs the ASP to the contrary.

40. The method of claim 32, wherein the user interfaces are for operation by any user selected from the group consisting of:

a primary customer, including but not limited to a publisher, printing customer, or printing client;

a buyer representing a primary customer;

a graphic artist;

a printing broker; and a user that is any hybrid of two or more of the preceding four user types.

41. The method of claim 32, wherein the ASP is selected from the group consisting of:

a printing-brokerage ASP;

a soft-proofing ASP;

a private-network ASP; and an ASP that is any hybrid of two or more of the preceding three ASP types.

42. The method of claim 32, wherein:

the operation step comprises control of the user interface to interact with an ASP that corresponds to the interface; and the RHCPS that performs the granting step is distinct from the ASP.

43. A method of operating a closed-loop color remote hardcopy proofing service (RHCPS); said method comprising the steps of:

making available a computerized, network-based RHCPS operated through at least one user interface;

for each project of the RHCPS, establishing functioning computerized relationships among the RHCPS and entities that include at least a primary customer and a printshop, the customer and printshop both being remote and distinct from the RHCPS;

wherein the customer chooses whether to use the RHCPS or not, and whether to use any particular printshop or not, and whether to use any other possible entities or not;

enabling the RHCPS or any of said entities to initiate a project and thereby define default operating conditions that determine which of said entities sees, in the at least one user interface, each other one of the entities respectively; and regardless of which of the RHCPS or said entities initiates the project and defines the default relationships, reserving to at least one of said entities an option of redefining operating conditions to override the default conditions.

44. The method of claim 43, wherein:

said at least one of said entities comprises the primary customer.

45. The method of claim 44, further comprising the step of:

making available to the primary customer information about the option.

46. The method of claim 45, wherein:

the making-available step comprises including in an RHCPS user interface seen by the primary customer a link to terms of the RHCPS, which include the information about the option.

47. The method of claim 43:

wherein said at least one of said entities is the primary customer; and further comprising the step of making available to the primary customer information about the option.

48. The method of claim 43, wherein:

the reserving step comprises enabling the primary customer to redefine which of the entities the primary customer can see;

whereby the method stimulates competition while tending to deter redundancy, among enterprises in the printing industry.

49. The method of claim 43, wherein the entities further comprise at least one other type of enterprise selected from the group consisting of:

a buyer representing a primary customer;

a graphic artist;

a printing broker;

a soft-proofing service;

a private-network service; and an enterprise that is any hybrid of two or more of the preceding five types.

50. A method of operating a closed-loop color remote hardcopy proofing service (RHCPS) that stimulates competition while tending to deter redundancy, among enterprises in the printing industry; said method comprising the steps of:

making available a computerized, network-based RHCPS operated through at least one user interface;

for each project of the RHCPS, establishing functioning computerized relationships among the RHCPS and entities that include at least a primary customer and a printshop;

enabling any of the entities to initiate a project and thereby define default operating conditions that determine which of the entities sees, in the at least one user interface, each other of the entities respectively;

regardless of which of the entities initiates the project and defines the default relationships, reserving to the primary customer an option of redefining operating conditions to override the default conditions; and making available to the primary customer information about the option, by including the information in the at least one user interface or in separate communications to the primary customer;

wherein the method stimulates competition while tending to deter redundancy.

51. A computerized remote proofing method comprising the steps of:

operation, by a user, of a closed-loop-color remote hardcopy proofing service (RHCPS) user interface, to gain access to data about a printing job to be hardcopy-proofed; and granting, by a graphic-arts application service provider (ASP), of access to data about the ASP's service;

said granting being in response to the user's activation of a link, within the RHCPS interface, to a user interface of the ASP; wherein:

the RHCPS user is also a user of the ASP wherein:

the operation step comprises control of the user interface to interact with an RHCPS that corresponds to the interface; and the ASP that performs the granting step is a separate business entity from the RHCPS.

52. A computerized remote proofing method comprising the steps of:

operation, by a user, of a graphic-arts application service provider (ASP) user interface, to gain access to data about the ASP's service;

granting, by a closed-loop-color remote hardcopy proofing service (RHCPS), of access to data about the RHCPS;

said granting being in response to the user's activation of a link, within the ASP interface, to a user interface of the RHCPS; wherein:

the ASP user is also a user of the RHCPS;

the operation step comprises control of the user interface to interact with an RHCPS that corresponds to the interface; and the ASP that performs the granting step is a separate business entity from the RHCPS.

* * * * *

UNITED STATES PATENT AND TRADEMARK OFFICE

CERTIFICATE OF CORRECTION

PATENT NO. : 7,327,481 B2
APPLICATION NO. : 10/124667
DATED : February 5, 2008
INVENTOR(S) : Alberto Such et al.

It is certified that error appears in the above-identified patent and that said Letters Patent is hereby corrected as shown below:

In column 16, line 63, after “participating;” delete “and”.

In column 20, line 7, delete “calorimetric” and insert -- colorimetric --, therefor.

In column 27, line 4, after “document” delete “9”.

In column 51, line 58, in Claim 32, delete “ASP:” and insert -- ASP; --, therefor.

Signed and Sealed this

Nineteenth Day of August, 2008

Jon W. Dudas

JON W. DUDAS
*Director of the United States Patent and Trademark Office*